United States Patent [19]
Kinjo et al.

[11] Patent Number: 5,742,456
[45] Date of Patent: Apr. 21, 1998

[54] MAGNETIC RECORDING/REPRODUCING APPARATUS WITH A POSITIONING MECHANISM FOR A TAPE GUIDE DRUM

[76] Inventors: Hisao Kinjo, 13-11, Makigahara, Asahi-ku, Yokohama; Hiromichi Hirayama, 1322-24, Shimo Kurata-cho, Totsuka-ku, Yokohama; Ryo Nishima, 55-502, Sawatari, Kanagawa-ku, Yokohama; Morio Miwa, 3-8-207, Nagataminamidai, Minami-ku, Yokohama; Masao Mimata, 4-18-13, Seya, Seya-ku, Yokohama; Makoto Suzuki, 1-25-23, Shin Koyasu, Kanagawa-ku, Yokohama, all of Japan

[21] Appl. No.: 608,368

[22] Filed: Feb. 28, 1996

[30] Foreign Application Priority Data

Feb. 28, 1995 [JP] Japan ................... 7-066861

[51] Int. Cl.$^6$ ................ G11B 5/588; G11B 15/61
[52] U.S. Cl. ..................... 360/109; 360/130.24
[58] Field of Search ................ 360/109, 130.24, 360/130.23, 107

[56] References Cited

U.S. PATENT DOCUMENTS

| | | | |
|---|---|---|---|
| 4,703,370 | 10/1987 | Inoue et al. | 360/109 |
| 5,067,035 | 11/1991 | Kudelski et al. | 360/85 |
| 5,675,458 | 10/1997 | Kinjo et al. | 360/109 |

FOREIGN PATENT DOCUMENTS

| | | | |
|---|---|---|---|
| 61-158633 | 10/1986 | Japan . | |
| 61-273713 | 12/1986 | Japan | 360/130.24 |
| 63-34126 | 9/1988 | Japan . | |
| 6208701 | 7/1994 | Japan . | |
| 6318351 | 11/1994 | Japan . | |
| 7244903 | 9/1995 | Japan . | |

Primary Examiner—Stuart S. Levy
Assistant Examiner—Kevin M. Watkins

[57] ABSTRACT

A magnetic recording/reproducing apparatus with a drum positioning mechanism is provided. The drum positioning mechanism performs track correction to rotate a tape guide drum about a given axis of rotation according to a travel speed of a magnetic tape to orient a head path of magnetic heads at a given angle relative to a lead member which guides movement of a lower edge of the magnetic tape wrapped about the tape guide drum so that the head path coincides with tracks recorded on the magnetic tape correctly. The drum positioning mechanism also performs lead correction to rotate the lead member through a given angle relative to a drum base to eliminate a shift of the lower edge of the magnetic tape from the lead caused by the track correction so that the lower edge of the magnetic tape follows the lead completely. The magnetic recording/reproducing apparatus may also be employed in a recording mode. In the recording mode, the head path is oriented by the track correction at a preselected angle to the lower edge of the magnetic tape.

13 Claims, 35 Drawing Sheets

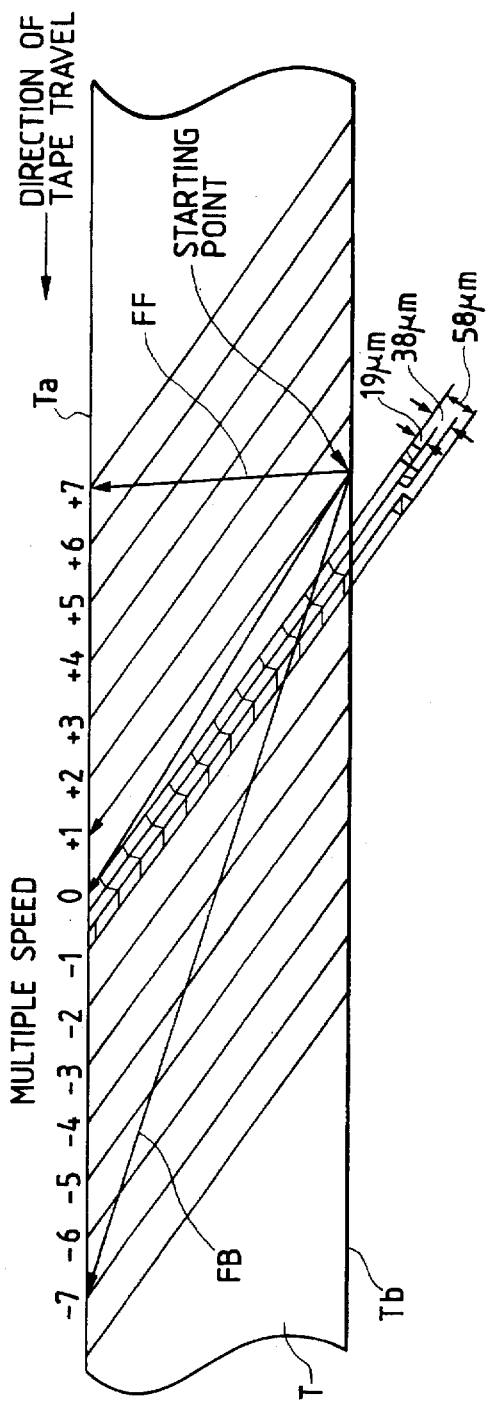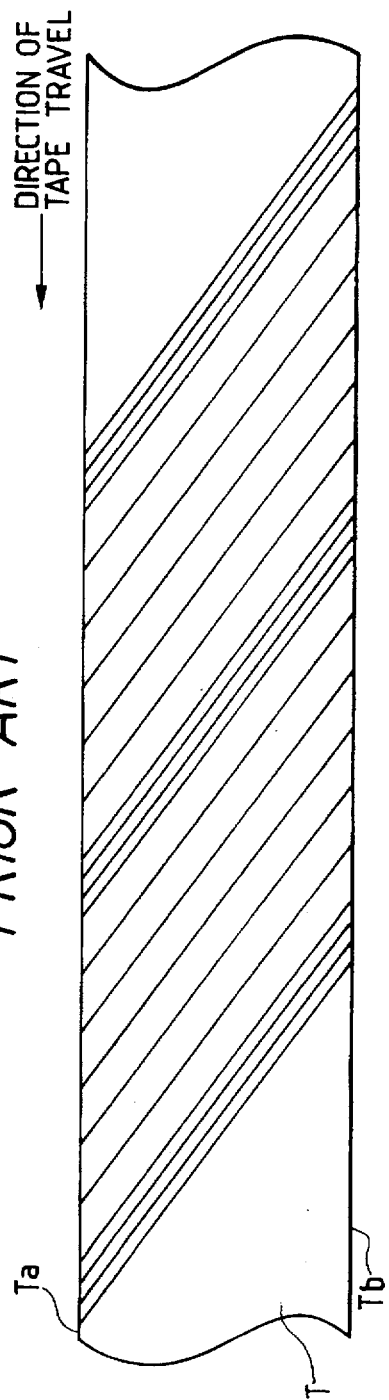

FIG. 14

| PIVOT LOCATION FOR LEAD CORRECTION (a%) | MULTIPLE SPEED | | | | | | | | |
|---|---|---|---|---|---|---|---|---|---|
| | 21 | 13 | 7 | 3 | 1 | -3 | -7 | -13 | -21 |
| 70% | × | × | × | ○ | ○ | ○ | ○ | ○ | ○ |
| 66% | × | × | ○ | ○ | ○ | ○ | ○ | ○ | ○ |
| 62% | × | ○ | ○ | ○ | ○ | ○ | ○ | ○ | △ |
| 58% | △ | ○ | ○ | ○ | ○ | ○ | △ | × | × |
| 50% | ○ | ○ | ○ | ○ | ○ | ○ | △ | × | × |
| 39% | ○ | ○ | ○ | ○ | ○ | ○ | △ | × | × |
| 30% | ○ | ○ | ○ | ○ | ○ | ○ | △ | × | × |

○ : GOOD FM OUTPUT

△ : LITTLE BETTER FM OUTPUT

× : BAD FM OUTPUT

NORMAL PLAYBACK MODE

FF PLAYBACK MODE

FB PLAYBACK MODE

NORMAL PLAYBACK MODE

FF PLAYBACK MODE

FB PLAYBACK MODE

FF PLAYBACK MODE

FB PLAYBACK MODE

FF PLAYBACK MODE

FB PLAYBACK MODE

NORMAL PLAYBACK MODE

FF PLAYBACK MODE

FB PLAYBACK MODE

MAGNETIC RECORDING/REPRODUCING APPARATUS WITH A POSITIONING MECHANISM FOR A TAPE GUIDE DRUM

BACKGROUND OF THE INVENTION

1. Technical Field

The present invention relates generally to a magnetic recording/reproducing apparatus designed to record and reproduce signals on and from slant tracks on a magnetic tape using rotary magnetic heads. More particularly, the invention is directed to an improvement on a magnetic recording/reproducing apparatus with a positioning mechanism which changes a positional relation between a head travel path of rotary magnetic heads and a magnetic tape according to the travel speed of the magnetic tape so that the magnetic heads rotate along a path oriented at a given angle to a longitudinal reference edge of the magnetic tape.

2. Background Art

A VHS video tape recorder (VTR) is well known as a magnetic recording/reproducing apparatus that forms slant tracks on a magnetic tape using rotary magnetic heads for recording information signals. Such a VTR has a variable speed reproduction function (referred to as a trick play mode) of reproducing information signals recorded on a magnetic tape while moving the magnetic tape at a different speed (including a rest) in a different direction from those during recording as well as a function of reproducing the magnetic tape while moving the magnetic tape at the same speed as that during recording (referred to as a normal playback mode).

Additionally, there is proposed a VTR which is designed to move a magnetic tape cyclically for recording an objective phenomenon thereon for a long time in an operation mode such as a time lapse mode or a scene recording mode and to reproduce the magnetic tape while moving it at a standard speed.

FIG. 1 shows a tape-transport system of a conventional VHS VTR. FIG. 2 is a front view of FIG. 1 illustrating a positional relation between slant tracks formed on a magnetic tape T and a tape guide drum 10. FIG. 3 is a plan view from which an entrance guide roller 13 and an exit guide roller 14 are omitted for convenience. The line L1 extends through a drum shaft 11 so as to divide an area of the magnetic tape T wrapped about the tape guide drum 10 into two equal sections, while the line L2 extends perpendicular to the line L1. In the following discussion, it is assumed that the left of the line L2 is defined as 0°, and angular positions of component parts around the drum shaft 11 are defined as angles in a counterclockwise direction from 0°.

The shown VTR generally includes the tape guide drum 10 consisting of an upper drum 10a rotatably supported by the drum shaft 11 and a lower drum 10b, mounted on a drum base 17 at an angle φ to the vertical line Z, the entrance guide roller 13, the exit guide roller 14, and the inclined guide posts 1 and 2. The entrance guide roller 13 is arranged at a position where the magnetic tape T enters the tape guide drum 10, while the exit guide roller 14 is arranged at a position where the magnetic tape T leaves the tape guide drum 10. The magnetic tape T is withdrawn from a supply reel 3 of a tape cassette 20 into engagement with an erase head 4 and an impedance roller 5, wrapped helically about a portion of the periphery of the tape guide drum 10 over an angle defined by the guide posts 1 and 2, and then transported to a take-up reel 9 by a pinch roller 8 and a capstan 7 in engagement with an audio control head 6.

During the tape transportation, slant tracks are formed on the magnetic tape T in a pattern, as shown in FIG. 4, by magnetic heads Ha and Hb mounted on the upper drum 10a.

In FIG. 4, a line extending from a starting point to a point as labeled "+1" on an upper edge Ta of the magnetic tape T and a plurality of lines extending parallel to that line indicate center lines of the slant tracks, respectively. The normal playback is achieved by having the magnetic heads Ha and Hb trace the slant tracks while transporting the magnetic tape T at the same speed in the same direction as those during recording.

If, however, the traveling speed or traveling direction of the magnetic tape T during the reproduction is different from that during recording, it will cause a relative speed between the magnetic tape T and the magnetic heads Ha and Hb to be changed so that the magnetic heads Ha and Hb move along a line as labeled "FF", "STILL", or "FB".

Lines extending from the starting point to points as labeled "+2", "+3", . . . "+7" represent travel paths of the magnetic heads Ha and Hb when reproduction (hereinafter, referred to as a FF playback mode) is achieved by moving the magnetic tape T in the same direction (shown by the positive sign "+") as that during recording in speeds twice, three times, . . . seven times faster than that during the recording.

Similarly, lines extending from the starting point to points as labeled "−2", "−3", . . . "−7" represent travel paths of the magnetic heads Ha and Hb when reproduction (hereinafter, referred to as a FB playback mode) is achieved by moving the magnetic tape T in an opposite direction (shown by the negative sign "−") to that during the recording in speeds twice, three times, . . . seven times faster than that during the recording.

A line extending from the starting point to a point as labeled "0" represents a travel path of the magnetic heads Ha and Hb when reproduction (hereinafter, referred to as a STILL playback mode) is achieved while the magnetic tape T is held still.

In a standard VHS VTR, the magnetic tape T is moved while it is wrapped through 180° helically about a peripheral surface of a 62-mm-diameter rotary drum rotating at 1800 rpm. In an SP (Standard Playing) mode, the magnetic tape T is transported at a speed of 33.35 mm/sec., and 58-µm-wide tracks are recorded on the magnetic tape at an angle of 5° 58' 9.9" (video track angle) relative to a lower edge Tb of the magnetic tape T. The VHS VTR further performs an EP (Extended Playing) mode wherein the magnetic tape T is transported at a speed of 11.12 mm/sec. to record thereon 19 µm-wide tracks. In the EP mode, three times playing time is established by decreasing both the travel speed of the magnetic tape T and the width of the tracks down to one-third (⅓) of those in the SP mode. It is, however, more difficult for the magnetic heads Ha and Hb to trace the tracks correctly than in the SP mode because the width of the tracks recorded on the magnetic tape is narrow.

When the magnetic tape T is at rest, the magnetic heads Ha and Hb move on the magnetic tape T along a travel path inclined at an angle of 5° 56' 7.4" relative to the lower edge Tb. For example, in FIG. 4, the line extending from the starting point to the point +7 on the upper edge Ta of the magnetic tape T in the SP mode is inclined at an angle of 6° 10' 54" relative to the lower edge Tb. The line extending from the starting point to the point −7 on the upper edge Ta in the SP mode is inclined at an angle of 5° 42' 25.7" relative to the lower edge Tb.

As will be apparent from the track pattern in FIG. 4, a head path along which the magnetic heads Ha and Hb travel in engagement with the magnetic tape T in a trick play mode such as the FF, FB, or STILL playback mode traverses the tracks recorded on the magnetic tape T in the SP mode. Therefore, a signal level of an FM signal reproduced in the trick play mode is, as shown in FIG. 6(b), changed greatly every time the magnetic heads Ha and Hb traverse the recorded tracks, so that the FM envelope fluctuates for one vertical head scanning duration. This results in bad quality images being reproduced on which noise bars appear.

In recent years, new type VTRs (hereinafter, referred to as a W-VHS VTR) are on the market which are designed to form three parallel tracks each having a width of 19 μm on the magnetic tape T in a pattern as shown in FIG. 5(a) for recording and reproducing high-vision image information. Adjacent two of the three parallel tracks on the magnetic tape T used for recording and reproducing video signals through two magnetic heads oriented at azimuth angles opposite to one another. The remaining one track is used for recording and reproducing audio signals through another magnetic head.

The magnetic heads of the W-VHS VTR travel on the magnetic tape T in the FF or FB playback mode along a path extending from the starting point as shown in FIG. 5(a) to, for example, the point +7 or −7 on the upper edge Ta of the magnetic tape T. The two video signal heads oriented at the different azimuth angles thus traverse the tracks formed on the magnetic tape T during reproducing, thereby resulting in increased noise bars being formed on reproduced images.

Digital VTRs introduced recently are designed to compress and record video data through a high-efficiency coding system. Thus, when rotary magnetic heads traverse tracks recorded on a magnetic tape during a reproducing mode such as the FF or FB playback mode, images may not be reproduced at all due to an arrangement of data blocks in a mosaic pattern.

To alleviate the above problem, Japanese Utility Model Second Publication No. 63-34126 and Japanese Utility Model First Publication No. 61-158633 both assigned to the same assignee of this application, teach magnetic recording and reproducing apparatuses designed to incline a rotary drum for correcting a head path to agree with tracks recorded on a magnetic tape.

The former, however, encounters the drawback in that since an arc-shaped tape guide portion formed on a lower drum of a drum assembly engages a reference edge (i.e., a lower edge) of a magnetic tape in a point contact for guiding transportation of the magnetic tape, portions of the reference edge separated from the guide portion become unstable, thereby leading to the formation of noise bars on images reproduced in the FF or FB playback mode.

The latter encounters the following drawback. A guide member is mounted on a chassis of the apparatus apart from a lower drum of a drum assembly for guiding a reference edge of a magnetic tape over a given length thereof, thereby supporting a reference edge of the magnetic tape in the normal playback mode. Inclining the rotary drum in the FF or FB playback mode, however, causes a portion of the magnetic tape wrapped about a tape-wrapped surface of the rotary drum to be brought into disengagement therefrom, thus leading to the formation of noise bars on images reproduced in the FF or FB playback mode.

SUMMARY OF THE INVENTION

It is therefore a principal object of the present invention to avoid the disadvantages of the prior art.

It is another object of the present invention to provide a magnetic recording/reproducing apparatus which has a positioning mechanism for orienting magnetic heads so as to follow tracks recorded on a magnetic tape correctly during reproduction.

According to one aspect of the present invention, there is provided a magnetic recording and/or reproducing apparatus which comprises (a) a tape guide drum including an upper drum portion and a lower drum portion supported by a drum shaft, the upper drum portion having mounted thereon a magnetic head which is rotatable about the drum shaft along a given head path for recording and/or reproducing information data on and from a magnetic tape in first and second operation modes, the first operation mode being such that the information data is recorded and/or reproduced on and from the magnetic tape traveling at a normal speed, the second operation mode being such that the information data is recorded and/or reproduced on and from the magnetic tape traveling at a given speed different from the normal speed, (b) a lead guiding a reference edge of the magnetic tape wrapped about a given tape-wrapped surface of the tape guide drum and traveling in a given direction, (c) a drum base supporting the tape guide drum and the lead coaxially with each other, (d) a head locus plane correcting means for correcting an angle of a head locus plane defined by the head path of the magnetic head relative to the lead according to the given speed of the magnetic tape in the second operation mode to orient the head locus plane at a given angle to the reference edge of the magnetic tape, (e) a lead correcting means for correcting an angle of the lead relative to the drum base to bring the lead into engagement with a portion of the reference edge of the magnetic tape over the given tape-wrapped surface of the tape guide drum, (f) a first position holding means for holding the head locus plane of the magnetic head in a given basic position relative to the lead during the first operation mode, and (g) a second position holding means for holding the lead at a given basic position relative to the drum base during the first operation mode.

In the preferred mode of the invention, the lower drum portion of the tape guide drum includes an annular portion and a bottom portion. The annular portion has formed thereon a tape-wrapped surface and a small-diameter portion having a smaller diameter than that of the tape-wrapped surface. A lead ring is further provided which includes an annular portion having a greater diameter than that of the tape-wrapped surface of the lower drum and a bottom portion. The annular portion of the lead ring receives therein the small-diameter portion of the lower drum with a given clearance to define at an edge thereof the lead. The lead ring is rotatably supported by the drum shaft coaxially with the upper and lower drums.

The first and second position holding means include first and second drive means diametrically opposed across a line extending through the drum shaft and a central portion of the tape-wrapped surface of the tape guide drum on a tape-entering side and a tape-leaving side of the tape guide drum. The first and second drive means is actuated in opposite directions to each other. When the first and second drive means are in inoperative conditions, the head locus plane of the magnetic head is held in the given basic position relative to the lead during the first operation mode, and the lead is held at the given basic position relative to the drum base during the first operation mode.

The head locus plane correcting means includes first and second pivots disposed between the lead ring and the lower drum, defining a first axis of rotation about which the lower drum is rotated relative to the lead ring, a first urging means for urging the lower drum to rotate about the first axis of rotation, and a first rotating means for rotating the lower drum about the first axis of rotation against activities of the first urging means. The lead correction means includes third and fourth pivots disposed between the drum base and the lead ring, defining a second axis of rotation about which the lead ring is rotated relative to the drum base, a second urging means for urging the lead ring to rotate about the second axis of rotation, and a second rotating means for rotating the lead ring about the second axis of rotation against activities of the second urging means. The first position holding means includes the first and second pivots, a first spacer disposed between the lower drum and the lead ring at a location away from a line extending from the first pivot to the second pivot to form a given gap therebetween, and a third urging means for urging the tape guide drum toward the drum base. The second position holding means includes the third and fourth pivots, a second spacer disposed between the lead ring and the drum base at a location away from a line extending from the third pivot to the fourth pivot to form a given gap therebetween, and a third urging means for urging the tape guide drum toward the drum base.

The first rotating means includes a first screw which engages a first tapped hole formed in the bottom portion of the lead ring to urge at its end the bottom portion of the lower drum. The second rotating means includes a second screw which engages a second tapped hole formed in the drum base to urge at its end the bottom portion of the lead ring.

The head locus plane correcting means may alternatively include first, second, and third pivots disposed between the lead ring and the lower drum, defining first and second axes of rotation about which the lower drum is rotated relative to the lead ring, first urging means for urging the lead ring toward the lower drum, first rotating means for rotating the lower drum about the first axis of rotation defined by the first and second pivots against activities of the first urging means, and second rotating means for rotating the lower drum about the second axis of rotation defined by the first and third pivots against the activities of the first urging means. The lead correction means may include fourth, fifth, and sixth pivots disposed between the lower drum and the drum base through the bottom portion of the lead ring, defining third and fourth axes of rotation about which the lower drum is rotated relative to the drum base, second urging means for urging the tape guide drum toward the drum base, a third rotating means for rotating the lower drum about the third axis of rotation defined by the fourth and fifth pivots against activities of the second urging means, and fourth rotating means for rotating the lower drum about the fourth axis of rotation defined by the fourth and sixth pivots against the activities of the second urging means. The first position holding means includes the first, second, and third pivots and the first urging means. The second position holding means includes the fourth, fifth, and sixth pivots and the second urging means.

The first and second rotating means may include first and second screws which engage first and second tapped holes formed in the bottom portion of the lead ring to urge at their ends the bottom portion of the lower drum. The third and fourth rotating means may include third and fourth screws which engage third and fourth tapped hole formed in the drum base to urge at their ends the bottom portion of the lead ring.

The first and second rotating means may include first and second screws which engage first and second tapped holes formed in the bottom portion of the lead ring to urge at their ends the bottom portion of the lower drum. The third and fourth rotating means may include third and fourth screws which engage third and fourth tapped hole formed in the drum base to urge at their ends the bottom portion of the lead ring.

The first and second rotating means may include first and second screws which engage first and second tapped holes formed in the drum base and which pass at their ends through the bottom portion of the lead ring to urge the bottom portion of the lower drum. The third and fourth rotating means may include third and fourth screws which engage third and fourth tapped hole formed in the drum base and which draws the bottom portion of the lead ring toward the drum base.

According to another aspect of the present invention, there is provided a magnetic reproduction apparatus which comprises (a) an upper drum rotatable about a drum shaft and having mounted thereon a magnetic head which is rotatable along a given head path to record and/or reproduce information data on and from a magnetic tape in first and second operation modes, the first operation mode being such that the information data is recorded and/or reproduced on and from the magnetic tape traveling at a normal speed, the second operation mode being such that the information data is recorded and/or reproduced on and from the magnetic tape traveling at a given speed different from the normal speed, (b) a lower drum supported by the drum shaft coaxially with the upper drum, the lower drum including a bottom portion and an annular portion which has formed, thereon a tape-wrapped surface and a small-diameter surface formed below the tape-wrapped surface having a smaller diameter than that of the tape-wrapped surface, (c) a lead ring including an annular portion having a greater diameter than that of the tape-wrapped surface of the lower drum and a bottom portion, the annular portion of the lead ring receiving therein the small-diameter portion of the lower drum with a given clearance to define a lead guiding movement of a reference edge of the magnetic tape, (d) a drum base supporting the lower drum, (e) a head locus plane correcting means for correcting an angle of a head locus plane defined by the head path of the magnetic head relative to the lead according to the given speed of the magnetic tape in the second operation mode to orient the head locus plane at a given angle to the reference edge of the magnetic tape, and (f) a lead correcting means for correcting an angle of the lead relative to the drum base to bring the lead into engagement with a portion of the reference edge of the magnetic tape over the given tape-wrapped surface of the lower drum. The head locus plane correcting means includes at least two pivots disposed between the lead ring and the lower drum, defining a first axis of rotation about which the lower drum is rotated relative to the lead ring, first urging means for urging the lead ring toward the lower drum, and first rotating means for rotating the lower drum about the first axis of rotation against activities of the first urging means. The lead correction means includes at least two pivots disposed between the drum base and the lower drum through the lead ring, defining a second axis of rotation about which the lower drum is rotated relative to the drum base, second urging means for urging the upper and lower drums toward the drum base, and second rotating means for rotating the lower drum about the second axis of rotation against activities of the second urging means.

According to a further aspect of the present invention, there is provided a magnetic reproduction apparatus which comprises (a) an upper drum rotatable about a drum shaft and having mounted thereon a magnetic head which is rotatable along a given head path to record and/or reproduce information data on and from a magnetic tape in first and second operation modes, the first operation mode being such that the information data is recorded and/or reproduced on and from the magnetic tape traveling at a normal speed, the second operation mode being such that the information data is recorded and/or reproduced on and from the magnetic tape traveling at a given speed different from the normal speed, (b) a lower drum supported by the drum shaft coaxially with the upper drum, the lower drum including a bottom portion and an annular portion which has formed thereon a tape-wrapped surface and a small-diameter surface formed below the tape-wrapped surface having a smaller diameter than that of the tape-wrapped surface, (c) a lead ring including an annular portion having a greater diameter than that of the tape-wrapped surface of the lower drum and a bottom portion, the annular portion of the lead ring receiving therein the small-diameter portion of the lower drum with a given clearance to define a lead guiding movement of a reference edge of the magnetic tape, (d) a drum base supporting the lower drum, (e) a head locus plane correcting means for correcting an angle of a head locus plane defined by the head path of the magnetic head relative to the lead according to the given speed of the magnetic tape in the second operation mode to orient the head locus plane at a given angle to the reference edge of the magnetic tape, and (f) a lead correcting means for correcting an angle of the lead relative to the drum base to bring the lead into engagement with a portion of the reference edge of the magnetic tape over the given tape-wrapped surface of the lower drum. The head locus plane correcting means includes first, second, and third pivots disposed between the lead ring and the lower drum, defining first and second axes of rotation about which the lower drum is rotated relative to the lead ring, first urging means for urging the lead ring toward the lower drum, first rotating means for rotating the lower drum about the first axis of rotation defined by the first and second pivots against activities of the first urging means, and second rotating means for rotating the lower drum about the second axis of rotation defined by the first and third pivots against the activities of the first urging means. The lead correction means includes fourth, fifth, and sixth pivots disposed between the lower drum and the drum base through the bottom portion of the lead ring, defining third and fourth axes of rotation about which the lower drum is rotated relative to the drum base, second urging means for urging the upper and lower drums toward the drum base, a third rotating means for rotating the lower drum about the third axis of rotation defined by the fourth and fifth pivots against activities of the second urging means, and fourth rotating means for rotating the lower drum about the fourth axis of rotation defined by the fourth and sixth pivots against the activities of the second urging means.

In the preferred mode of the invention, the second and third pivots are arranged outside the fifth and sixth pivots in a radial direction with respect to a line extending perpendicular to the drum shaft through a central portion of the tape-wrapped surface of the lower drum.

According to a still further aspect of the invention, there is provided a magnetic reproduction apparatus which comprises (a) an upper drum rotatable about a drum shaft and having mounted thereon a magnetic head which is rotatable along a given head path to record and/or reproduce information data on and from a magnetic tape in first and second operation modes, the first operation mode being such that the information data is recorded and/or reproduced on and from the magnetic tape traveling at a normal speed, the second operation mode being such that the information data is recorded and/or reproduced on and from the magnetic tape traveling at a given speed different from the normal speed, (b) a lower drum including a bottom portion and an annular portion which has formed thereon a tape-wrapped surface and a lead under the tape-wrapped surface for guiding movement of a reference edge of the magnetic tape, (c) an intermediate member supported by the drum shaft coaxially with the upper drum and engaging an inner wall of the lower drum, (d) a drum base supporting the intermediate member, (e) a head locus plane correcting means for correcting an angle of a head locus plane defined by the head path of the magnetic head relative to the lead according to the given speed of the magnetic tape in the second operation mode to orient the head locus plane at a given angle to the reference edge of the magnetic tape, and (f) a lead correcting means for correcting an angle of the lead relative to the drum base to bring the lead into engagement with a portion of the reference edge of the magnetic tape over the given tape-wrapped surface of the lower drum. The head locus plane correcting means includes at least two pivots disposed between the intermediate member and the lower drum, defining a first axis of rotation about which the intermediate member is rotated relative to the lower drum, first urging means for urging the lower drum toward the intermediate member, and first rotating means for rotating the intermediate member about the first axis of rotation against activities of the first urging means. The lead correction means includes at least two pivots disposed between the drum base and the intermediate member through the lower drum, defining a second axis of rotation about which the intermediate member is rotated relative to the drum base, second urging means for urging the intermediate member toward the drum base, and second rotating means for rotating the intermediate member about the second axis of rotation against activities of the second urging means.

According to a yet further aspect of the present invention, there is provided a magnetic reproduction apparatus which comprises (a) an upper drum rotatable about a drum shaft and having mounted thereon a magnetic head which is rotatable along a given head path to record and/or reproduce information data on and from a magnetic tape in first and second operation modes, the first operation mode being such that the information data is recorded and/or reproduced on and from the magnetic tape traveling at a normal speed, the second operation mode being such that the information data is recorded and/or reproduced on and from the magnetic tape traveling at a given speed different from the normal speed, (b) a lower drum including a bottom portion and an annular portion which has formed thereon a tape-wrapped surface and a lead under the tape-wrapped surface for guiding movement of a reference edge of the magnetic tape, (c) an intermediate member supported by the drum shaft coaxially with the upper drum and engaging an inner wall of the lower drum, (d) a drum base supporting the intermediate member, (e) a head path correcting means for correcting an angle of the head path of the magnetic head relative to the lead according to the given speed of the magnetic tape in the second operation mode to have the head path coincide with the slant tracks formed on the magnetic tape, and (f) a lead correcting means for correcting an angle of the lead relative to the drum base to bring the lead into engagement with a portion of the reference edge of the magnetic tape over the given tape-wrapped surface of the lower drum. The head path correcting means includes first, second, and third pivots disposed between the lower drum and the intermediate member, defining first and second axes of rotation about which the intermediate member rotated relative to the lower drum, first urging means for urging the lower drum toward the intermediate member, first rotating means for rotating the intermediate member about the first axis of rotation defined by the first and second pivots against activities of the first urging means, and second rotating means for rotating the intermediate member about the second axis of rotation defined by the first and third pivots against the activities of the first urging means. The lead correction means includes fourth, fifth, and sixth pivots disposed between the drum base and the intermediate member through the bottom portion of the lower drum, defining third and fourth axes of rotation about which the intermediate member is rotated relative to the drum base, second urging means for urging the upper drum and the intermediate member toward the drum base, a third rotating means for rotating the intermediate member about the third axis of rotation defined by the fourth and fifth pivots against activities of the second urging means, and fourth rotating means for rotating the intermediate member about the fourth axis of rotation defined by the fourth and sixth pivots against the activities of the second urging means.

In the preferred mode of the invention, the second and third pivots are arranged outside the fifth and sixth pivots in a radial direction with respect to a line extending perpendicular to the drum shaft through a central portion of the tape-wrapped surface of the lower drum.

According to a further aspect of the present invention, there is provided a magnetic reproduction apparatus which comprises (a) an upper drum supported by a drum shaft, the upper drum having mounted thereon a magnetic head which is rotatable about the drum shaft along a given head path for recording and reproducing information data on and from a magnetic tape in first and second operation modes, the first operation mode being such that the information data is recorded and/or reproduced from the magnetic tape traveling at a normal speed, the second operation mode being such that the information data is recorded and/or reproduced on and from the magnetic tape traveling at a given speed different from the normal speed, (b) a lower drum supported by the drum shaft coaxially with the upper drum, the lower drum having formed thereon a tape-wrapped surface and a small-diameter surface, the tape-wrapped surface having a first end portion and a second end portion opposite the first end surface in a tape traveling direction, the small-diameter surface having a diameter smaller than that of the tape-wrapped surface formed beneath the tape-wrapped surface, (c) a lead ring including an annular portion into which the small-diameter portion of the lower drum is fitted with a given clearance, the lead ring having formed thereon a lead for guiding a reference edge portion of the magnetic tape traveling along the tape-wrapped surface of the lower drum, (d) a drum base supporting the upper and lower drums and the lead ring, (e) a first inclining means for inclining the upper and lower drums and the lead ring relative to the drum base through a first angle in a first direction in the second operation mode, and (f) a second inclining means for inclining the lead ring through a second angle in a second direction opposite the first direction in the second operation mode to orient a head locus plane defined by the head path of the magnetic head at the second angle to the lead ring and to orient the lead ring at a third angle that is a difference between the first angle and the second angle relative to the drum base to bring the lead into engagement with a portion of the reference edge of the magnetic tape over the given tape-wrapped surface of the lower drum.

In the preferred mode of the invention, a first position holding means is further provided which holds the head locus plane defined by the head path of the magnetic head in a given basic position relative to the lead during the first operation mode and second position holding means for holding the lead at a given basic position relative to the drum base during the first operation mode.

BRIEF DESCRIPTION OF THE DRAWINGS

The present invention will be understood more fully from the detailed description given hereinbelow and from the accompanying drawings of the preferred embodiment of the invention, which, however, should not be taken to limit the invention to the specific embodiment but are for explanation and understanding only.

In the drawings:

FIGS. 5(a) and 5(b) show the relation between a pattern of slant tracks recorded on a magnetic tape by a W-WHS VTR and a head path of magnetic heads in a trick playback mode;

FIG. 14 is a table which shows signal conditions of reproduced FM outputs in terms of combinations of locations of pivots defining axes of rotation and multiple tape travel speed;

DESCRIPTION OF THE PREFERRED EMBODIMENT

Figure 1:
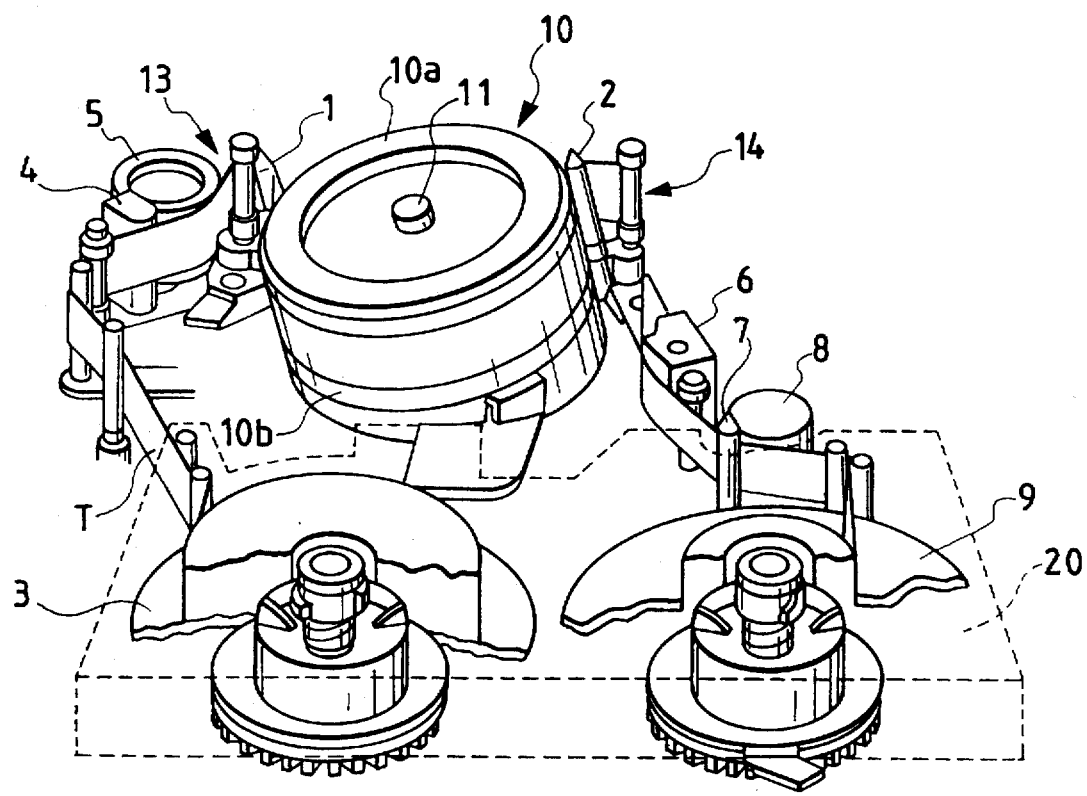
FIG. 1 is a perspective view which shows a tape-transport system of a conventional VHS video tape recorder.
Figure 2:
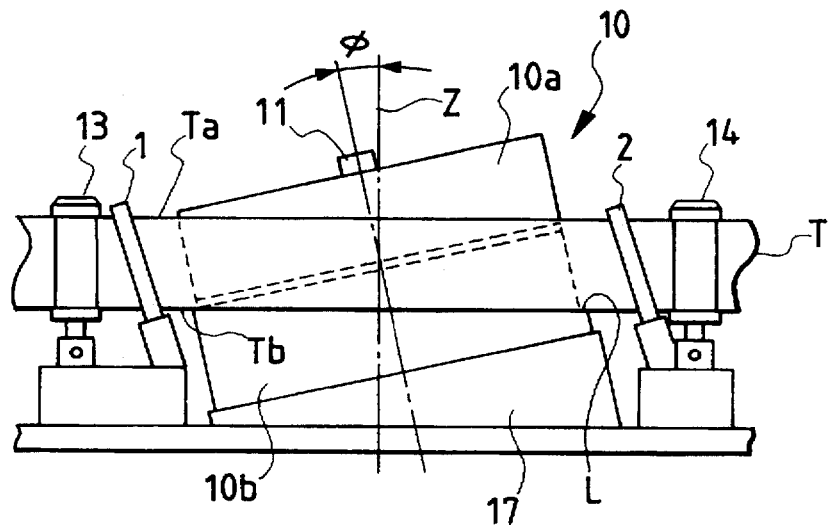
FIG. 2 is a front view of FIG. 1 which shows a positional relation between a tape guide head drum and guide rollers.
Figure 3:
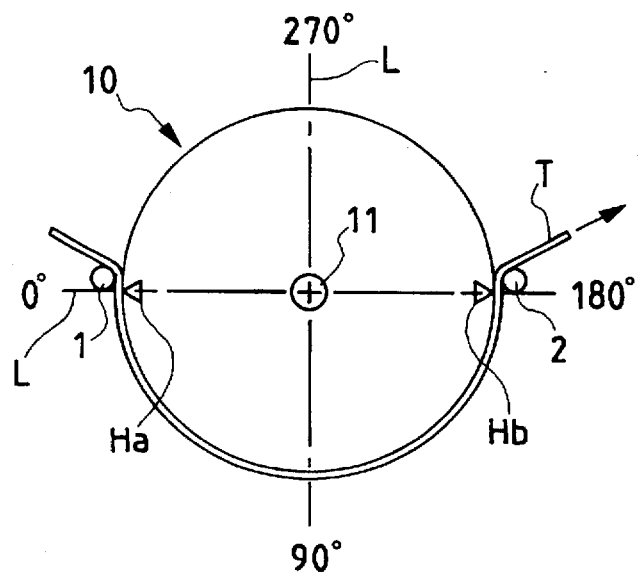
FIG. 3 is a plan view of FIG. 2.
Figure 4:
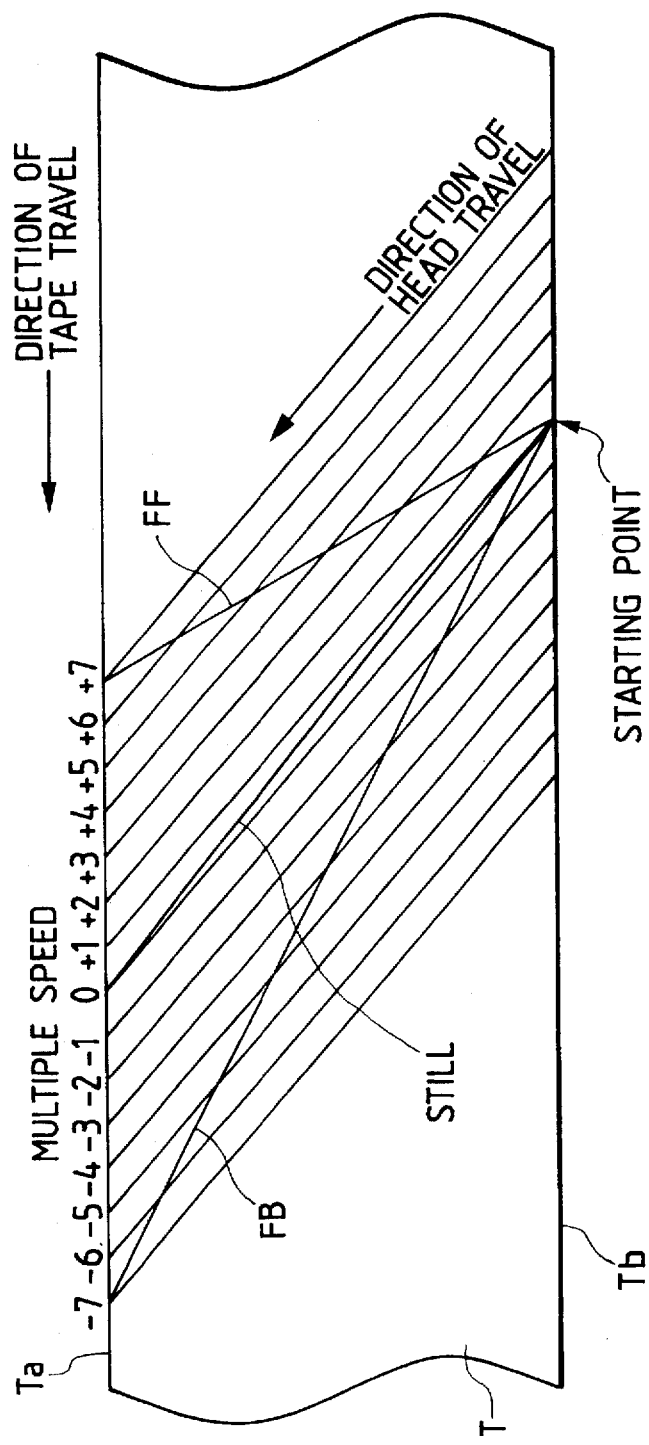
FIG. 4 shows a pattern of slant tracks recorded on a magnetic tape by magnetic heads.
Figure 6A:
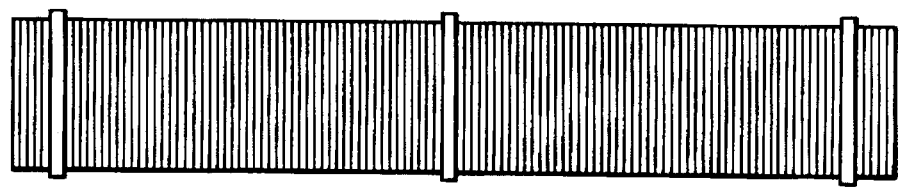
FIG. 6(a) shows an optimum waveform of a reproduced FM signal.
Figure 6B:
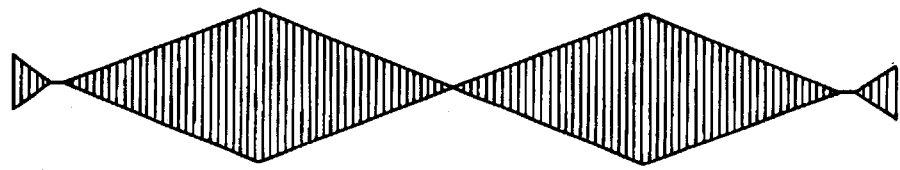
FIG. 6(b) shows a waveform of an FM signal reproduced in a track play mode of a conventional VTR.

Referring now to the drawings, wherein like reference numbers refer to like parts in several views, particularly to FIGS. 7(a) to 10, there is shown a drum positioning mechanism of a magnetic recording/reproducing apparatus according to the first embodiment of the invention.

Figure 7A:
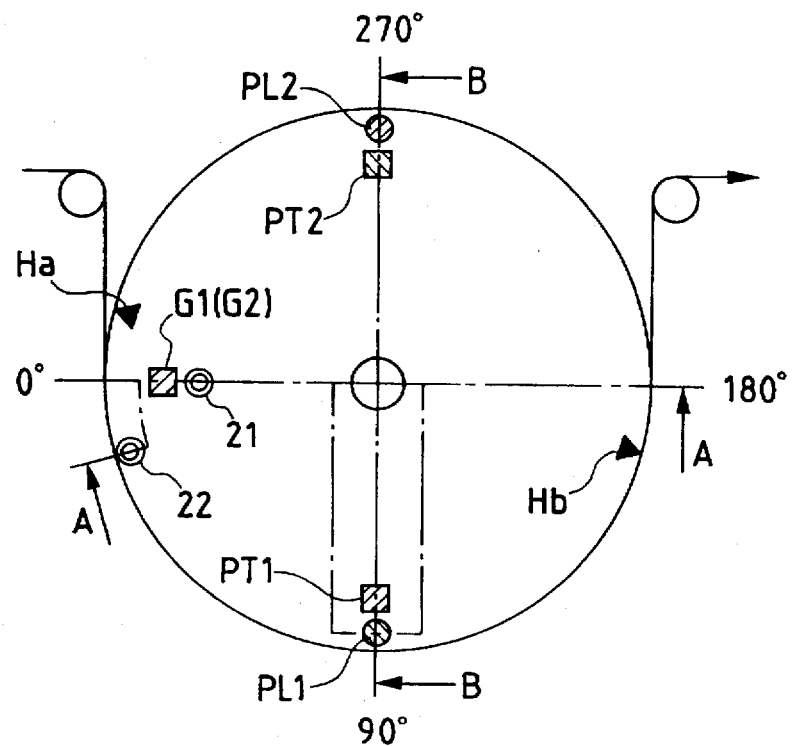
FIG. 7(a) is a top view which shows a basic structure of a drum positioning mechanism according to the first embodiment of the invention.
Figure 7B:
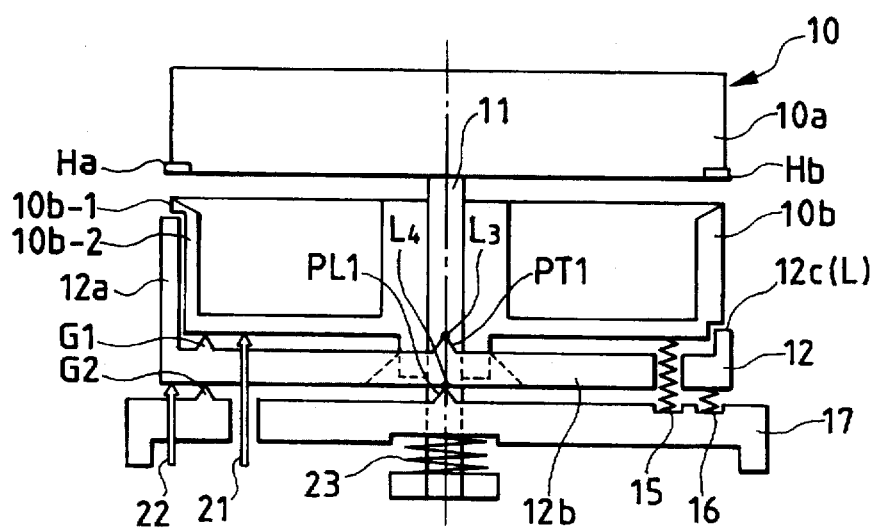
FIG. 7(b) is a vertical cross sectional view taken along the line A—A in FIG. 7(a)
Figure 8A:
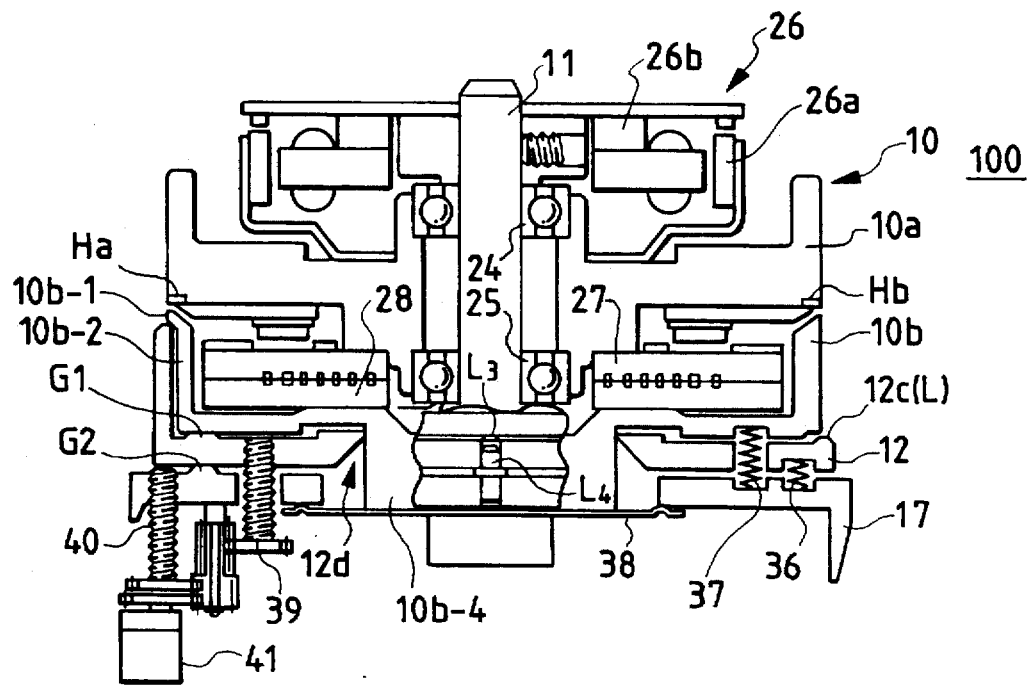
FIG. 8(a) is a cross sectional view taken along the line A—A in FIG. 7(a) which shows a structure of the drum positioning mechanism in detail.
Figure 8B:
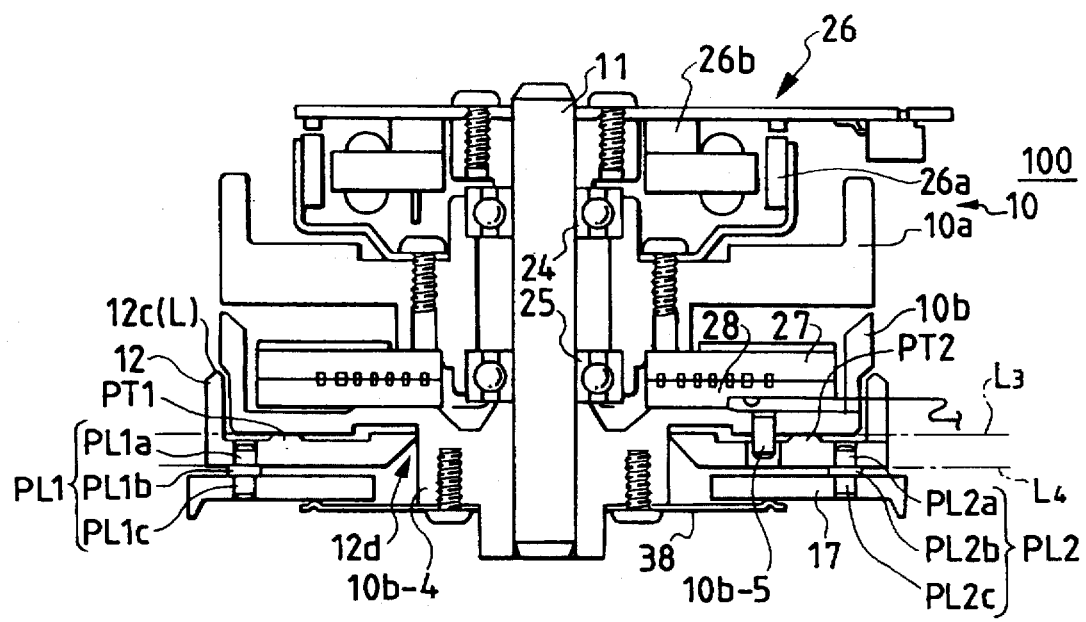
FIG. 8(b) is a cross sectional view taken along the line B—B in FIG. 7(a) shows a structure of the drum positioning mechanism in detail.

FIGS. 7(a) and 7(b) are schematic illustrations which show a basic structure of the drum positioning mechanism. FIG. 8(a) is a cross sectional view taken along the line A—A in FIG. 7(a). FIG. 8(b) is a cross sectional view taken along the line B—B in FIG. 7(a).

As will be understood from the discussion below, the magnetic recording/reproducing apparatus of this invention may be used not only in a reproducing mode, but also in a recording mode, and is designed to orient a head locus plane defined by a head travel path of rotary magnetic heads at a preselected angle to a longitudinal reference edge of a magnetic tape wrapped about a rotary head drum.

The magnetic recording/reproducing apparatus includes generally a drum assembly 100 consisting of a lead ring 12 and a tape guide drum 10. The lead ring 12 is mounted on a drum base 17. The tape guide drum 10 is mounted on the lead ring 12 and includes an upper drum 10a and a lower drum 10b. The tape guide drum 10 is inclined at a given angle relative to a chassis (i.e., the center line of a magnetic tape extending in a tape traveling direction).

The upper drum 10a has disposed thereon magnetic heads Ha and Hb and is rotatably supported by a drum shaft 11 coaxially with the lower drum 10b.

The lead ring 12 has disposed thereon pivots PT1 and PT2 at angular position of 90° and 270° and a spacer G1 at an angular position of 0°. The tape guide drum 10 is disposed on the pivots PT1 and PT2 and the spacer G1.

The drum base 17 has disposed thereon pivots PL1 and PL2 at angular position of 90° and 270° and a spacer G2 at an angular position of 0°. On the pivots PL1 and PL2 and the spacer G2, the lead ring 12 is mounted.

A spring 23 is wound around a lower portion of the drum shaft 11 for urging the tape guide drum 10 and the lead ring 12 toward the drum base 17.

Disposed between the drum base 17 and the lower drum 10b and between the drum base 17 and the lead ring 12 are springs 15 and 16 which urge the lower drum 10b and the lead ring 12 in the counterclockwise direction, as viewed in FIG. 7(b).

An actuator 21 is, as shown in FIG. 7(a), disposed on the lead ring 12 at the angular position of 0°. An actuator 22 is disposed on the drum base 17 at a given angular interval away from 0°. The actuator 21 acts on the lower drum 10b to rotate it in the clockwise direction relative to the lead ring 12. The actuator 22 acts on the lead ring 12 to rotate it in the clockwise direction relative to the drum base 17.

The upper drum 10a is, as shown in FIGS. 8(a) and 8(b), supported by the drum shaft 11 through ball bearings 24 and 25 and rotated by a drum motor 26 consisting of a rotor 26a secured on the upper drum 10a and a stator 26b installed on the drum shaft 11. On the upper drum 10a, a rotary transformer 27 is disposed in an opposed relation to a transformer 28 mounted on the lower drum 10b for achieving transmission of signals therebetween.

Figure 9:
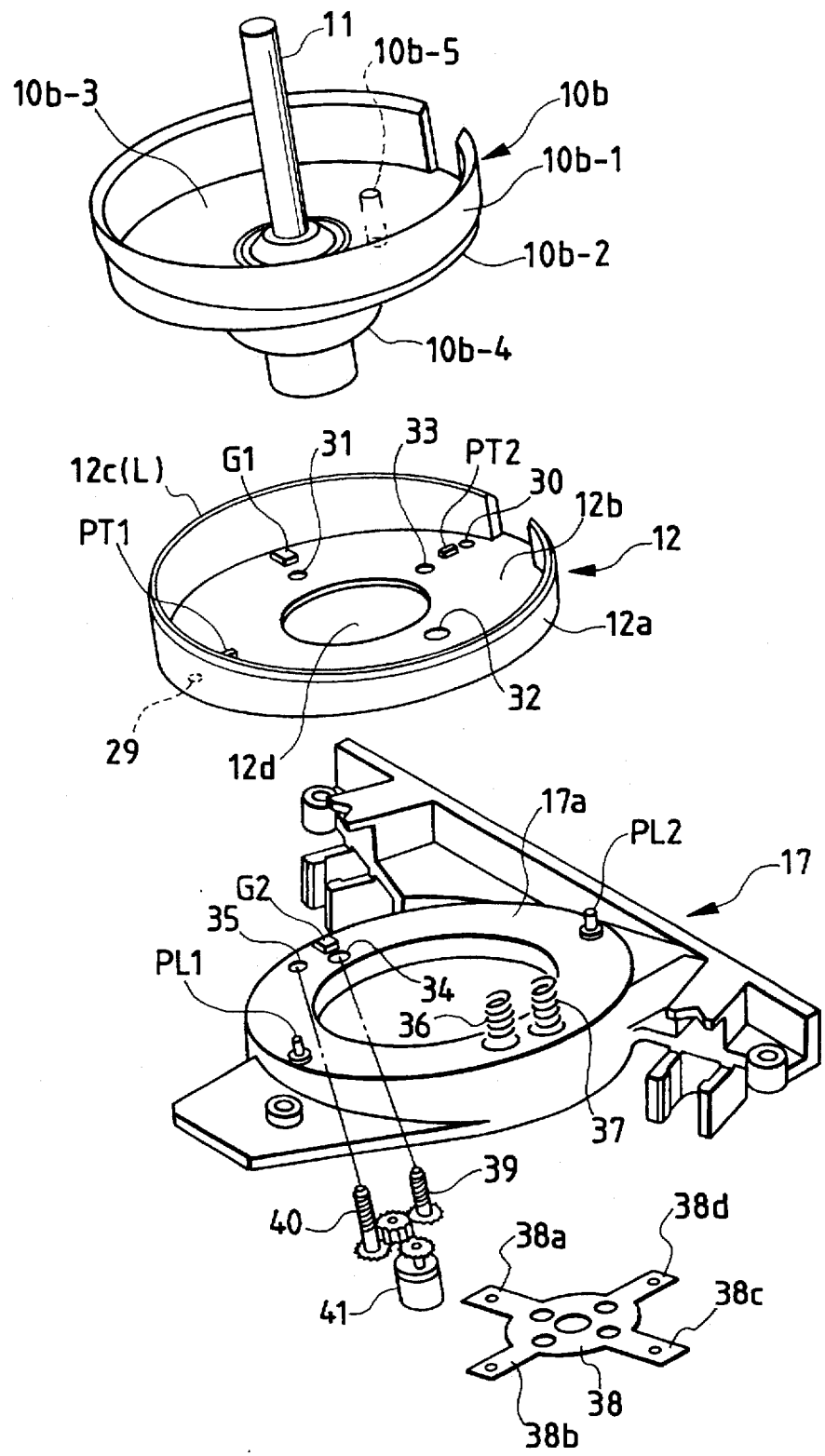
FIG. 9 is an exploded perspective view which shows a drum positioning mechanism of the first embodiment.

The lower drum 10b, as shown in FIG. 9, includes an annular portion having formed thereon a tape-wrapped surface 10b-1 and a small-diameter surface 10b-2 smaller in diameter than the tape-wrapped surface 10b-1, a bottom portion 10b-3, and a central boss 10b-4 projecting downward from the bottom portion 10b-3. The small-diameter surface 10b-2 engages an annular portion 12a of the lead ring 12 with a given clearance.

On the bottom portion 10b-3 of the lower drum 10b, a positioning pin 10b-5 is disposed which projects downward to be inserted with a clearance fit into a hole 33 formed in the bottom of the lead ring 12 at the angular position of 270° for holding a relative angular position between the lower drum 10b and the lead ring 12.

The lead ring 12 includes the annular portion 12a, a bottom portion 12b, and a central opening 12d which is of knife-edge shape in cross section, as clearly shown in FIGS. 8(a) and 8(b). The central boss 10b-4 of the lower drum 10b is inserted into the central opening 12d with a clearance fit for avoiding eccentricity of the lower drum 10b and the lead ring 12. The annular portion 12a has an edge portion 12c defining a lead L for guiding movement of a lower edge of a magnetic tape.

The lead ring 12 has formed thereon the spacer G1 and a tapped hole 31 at the angular position of 0°, the pivot PT1 and a through hole 29 at the angular position of 90°, a through hole 32 at the angular position of 180°, and the pivot PT2 and through holes 30 and 33 at the angular position of 270°.

The pivots PT1 and PT2 and the spacer G1 have protrusions at the same level from the bottom portion 12b. A line L3 extending between the pivots PT1 and PT2 through the drum shaft 11 in a direction from 90° to 270° to define an axis of rotation of the tape guide drum 10 relative to the lead ring 12. The engagement of all the pivots PT1 and PT2 and the spacer G1 with the lower drum 10b establishes a basic position of the tape guide drum 10 relative to the lead ring 12.

The drum base 17 has the spacer G2 and a through hole 34 at the angular position of 0°, a through hole 35 at a given angular interval away from 0°, the pivot PL1 at the angular position of 90°, coil springs 36 and 37 at angular positions of about 180°, and the pivot PL2 at the angular position of 270°. The pivots PL1 and PL2, as shown in FIG. 8(b), are made of pin members consisting of upper protrusions PL1a and PL2a, collars PL1b and PL2b, lower protrusions PL1c and PL2c, respectively. The lower protrusions PL1c and PL2c are pressed into the drum base 17 with the collars PL1b and PL2b engaging an upper surface 17a of the drum base 17. The upper protrusions PL1a and PL2a engage the through holes 29 and 30 formed in the bottom portion 12b of the lead ring 12 with given clearances.

Upper surfaces of the collars PL1b and PL2b and the spacer G2 are at the same level from the upper surface 17a of the drum base 17. A line L4 extending between the pivots PL1 and PL2 parallel to the line L1 through the drum shaft 11 defines an axis of rotation of the lead ring 12 relative to the drum base 17. The engagement of all the collars PL1b and PL2b and the spacer G2 with the lead ring 12 establishes a basic position of the lead ring 12 relative to the drum base 17.

The central boss 10b-4 of the lower drum 10b has mounted thereon a plate spring 38 which includes, as clearly shown in FIG. 9, four arms 38a, 38b, 38c, and 38d extending radially at regular intervals. The arms 38a to 38d engage a bottom surface of the drum base 17 to urge the tape guide drum 10 and the lead ring 12 downward.

The coil spring 37, as shown in FIG. 8(a), passes through the hole 32 of the lead ring 12 and urges the lower drum 10b counterclockwise around the line L3. The coil spring 36 urges the lead ring 12 counterclockwise around the line L4.

A screw with a gear 39 engages the tapped hole 31 of the lead ring 12 through the hole 34 of the drum base 17 and is moved by a motor 41 vertically to lift at its end the bottom portion 10b-3 of the lower drum 10b upward. A screw with a gear 40 engages the tapped hole 35 of the drum base 17 and is moved by the motor 41 vertically to lift at its end the bottom portion 12b of the lead ring 12 upward.

Figure 10:
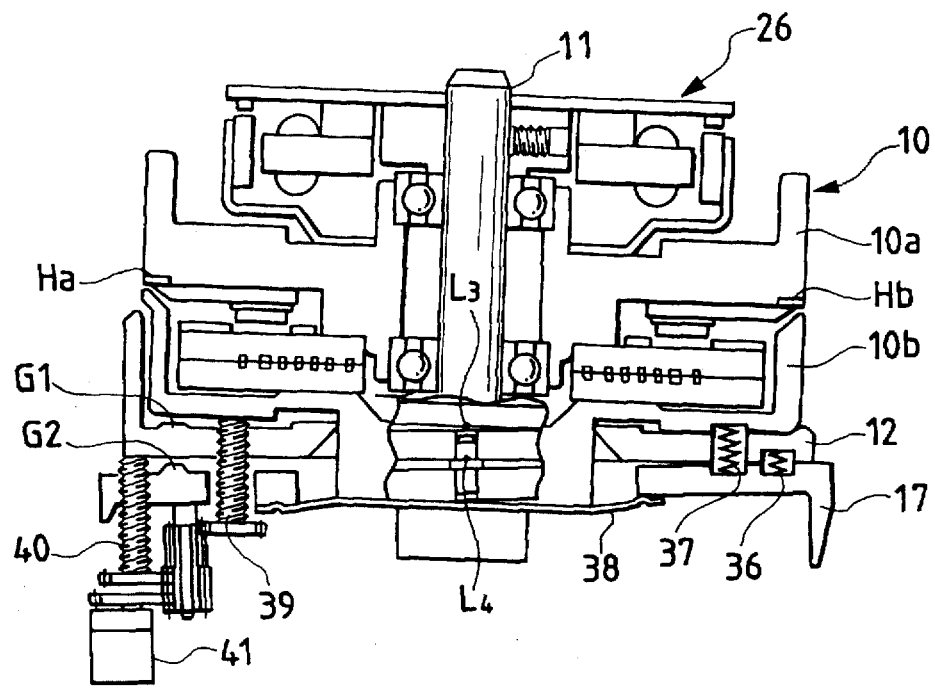
FIG. 10 is a cross sectional view taken along the line A—A in FIG. 7(a) which shows a tape guide drum and a lead ring turned counterclockwise in a FF playback mode.

In the FF playback mode of the magnetic recording/reproducing apparatus, the screw 39 is, as shown in FIG. 10, moved upward to lift up the lower drum 10b against a spring force of the coil spring 37 disposed between the drum base 17 and the lower drum 10b to rotate the tape guide drum 10 clockwise about the line L3 for correcting a head path of the magnetic heads Ha and Hb to agree with tracks recorded on a magnetic tape (hereinafter, such attitude control to modify a relative angle of the head path of the magnetic heads Ha and Hb to the lead L according to a travel speed of the magnetic tape will be referred to as a track correction). The track correction, however, causes the lower edge of the magnetic tape to disengage from the lead L or be pressed against the lead L. In order to avoid this problem, the screw 40 urges the lead ring 12 upward against a spring force of the coil spring 36 disposed between the drum base 17 and the lead ring 12 to rotate the lead ring 12 clockwise around the line L4 so that the lower edge of the magnetic tape may travel along the lead L (hereinafter, this will be referred to as a lead correction). The track correction and the lead correction will be discussed later in detail.

During recording and normal playback modes, the tape guide drum 10 and the lead ring 12 are in the basic positions relative to the lead ring 12 and the drum base 17, respectively. Specifically, the screw 39 is, as shown in FIG. 8(a), moved by the motor 41 downward from the lower drum 10b, and the screw 40 is also moved by the motor 41 downward from the lead ring 12. Since the plate spring 38 urges the tape guide drum 10 downward, the lead ring 12 is held on a plane defined by the pivots PL1 and PL2 and the spacer G2 in the basic position. Similarly, the tape guide drum 10 is held on a plane defined by the pivots PT1 and PT2 and the spacer G1 in the basic position.

As discussed above, the magnetic recording/reproducing apparatus of this embodiment performs both the track correction to orient the head path to coincide with the tracks recorded on the magnetic tape and the lead correction to guide the lower edge of the magnetic tape in constant engagement with the lead L of the lead ring 12, thereby preventing noise bars from appearing on reproduced images.

While in the first embodiment as explained above, the tape guide drum 10 and the lead ring 12 are, as shown in FIG. 10, rotated clockwise in the FF playback mode, it is possible to arrange the screws 39 and 40 symmetrically with the coil springs 36 and 37 with respect to the drum shaft 11 for achieving the track correction and the lead correction.

Further, the screws 39 and 40 are both moved by the single motor 41, but they may alternatively be moved by separate motors. However, as will be explained below, since the track correction has a constant relation to the lead correction, it is advisable that the screws 39 and 40 be driven by a single motor for decreasing component parts and manufacturing costs.

The relation between the track correction and the lead correction will be discussed below with reference to FIGS. 11 and 12.

Figure 11:
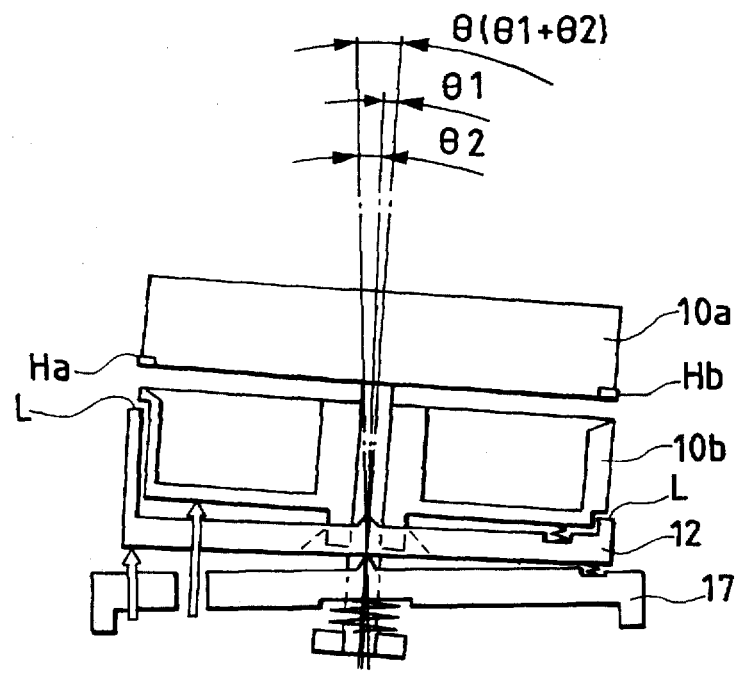
FIG. 11 is a 0°–180° cross section of a drum assembly which shows the relation between track correction angle θ1 and lead correction angle θ2.

FIG. 11 is a 0°–180° cross section which shows the relation between θ1 (hereinafter, referred to as a track correction angle) and θ2 (hereinafter, referred to as a lead correction angle).

The track correction angle θ1 is a correction angle between the lead L and the head path of the magnetic heads Ha and Hb, that is, an angle through which the tape guide drum 10 is to be inclined to the lead ring 12 according to the tape travel speed.

The track correction, as already explained, causes the lower edge of the magnetic tape to leave the lead L or to be pressed against the lead L. For example, in the FF playback mode, a clockwise rotation of the tape guide drum 10 causes a portion of the magnetic tape entering the tape guide drum 10 (i.e., near a portion of a peripheral surface of the tape guide drum 10 at the angular position of 0°) to be lifted up, as viewed in FIG. 11, from the lead L, while it causes a portion of the magnetic tape leaving the tape guide drum 10 (i.e., near a portion of the peripheral surface of the tape guide drum 10 at the angular position of 180°) to be drawn downward and to be pressed against the lead L.

Thus, the exact coincident of the lower edge of the magnetic tape with the lead L is achieved by inclining the lead ring 12 to the drum base 17 through the lead correction angle θ2 in the same direction as that of the track correction.

Specifically, when the track correction and the lead correction are performed simultaneously, it will cause the head path of the magnetic heads Ha and Hb to be inclined to the lead L at the angle θ1 and the lead L to be inclined to the drum base 17 at the angle θ2 with the result that the head path of the magnetic heads Ha and Hb is inclined to the drum base 17 at an angle θ (=θ1+θ2).

Figure 12:
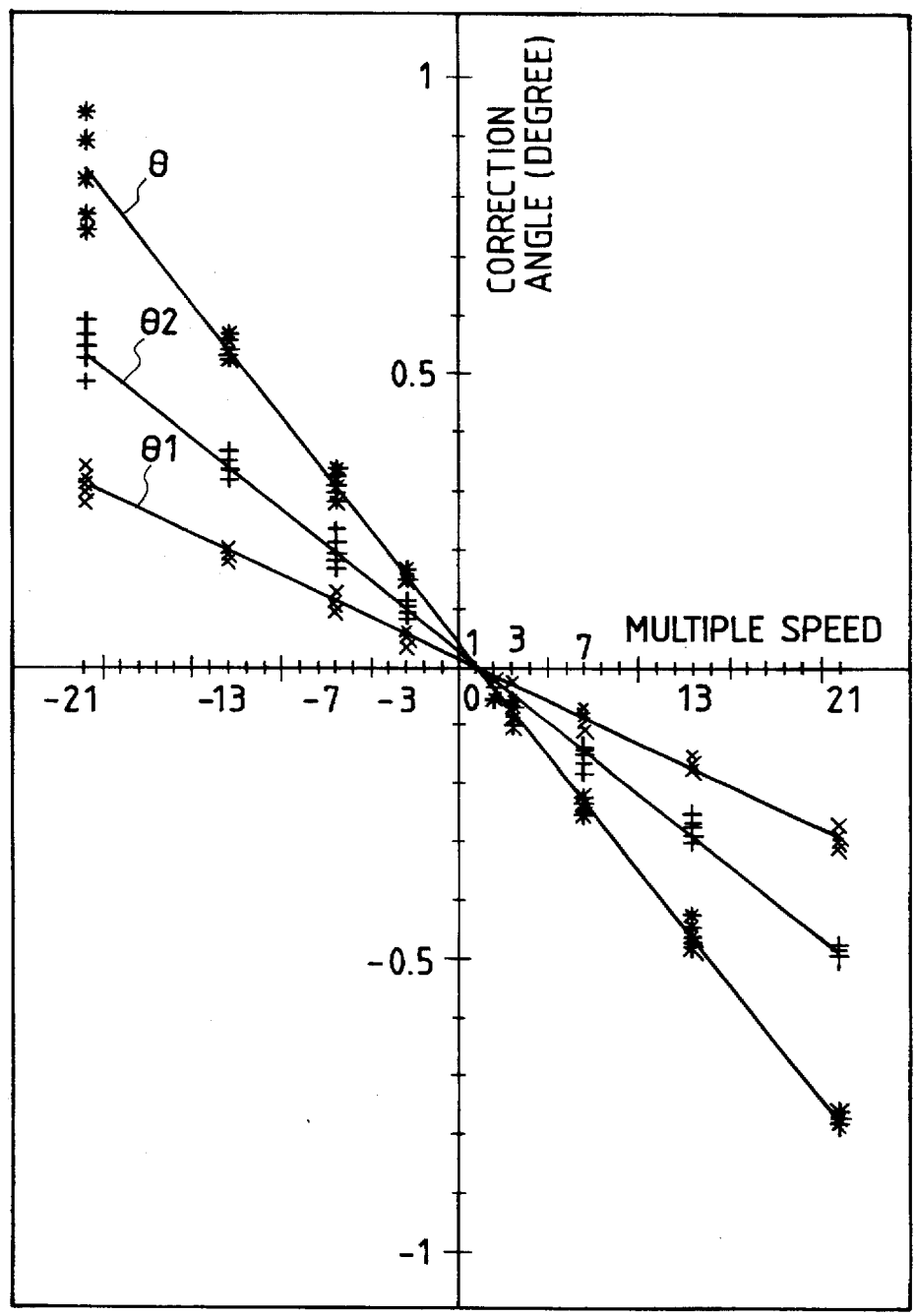
FIG. 12 is a graph which shows the relation between correction angles and a multiple tape travel speed.

FIG. 12 shows experimental results in five test machines representing the relation between the track correction angle θ1 and the lead correction angle θ2 in the EP mode of a VHS VTR. The abscissa axis indicates a tape travel speed (hereinafter, referred to as a multiple speed) as expressed by a multiple of a normal tape travel speed (e.g., 11.12 mm/sec.) in the EP mode, while the ordinate axis indicates a correction angle as expressed by a degree. A symbol "×" indicates a plotted track correction angle θ1, a symbol "+" indicates a plotted lead correction angle θ2, and a symbol "∗" indicates an angle θ that is the sum of the track correction angle θ1 and the lead correction angle θ2.

The graph shows that the track correction angle θ1 and the lead correction angle θ2 are both changed in proportion to the multiple speed, and θ2/θ1 results in about 1.8.

The magnetic recording/reproducing apparatus of the above discussed first embodiment is designed to achieve the attitude control of the drum assembly 100 either in the FF playback mode or in the FB playback mode and cannot achieve the attitude control of the drum assembly 100 both in the FF playback mode and in the FB playback mode. Accordingly, the inventors of this application studied the arrangement of pivots supporting the tape guide drum 10 and the lead ring 12 for achieving the track correction and the lead correction both in the FF and FB playback modes and for holding the drum assembly 100 in the basic position in the recording and normal playback mode.

Figure 13A:
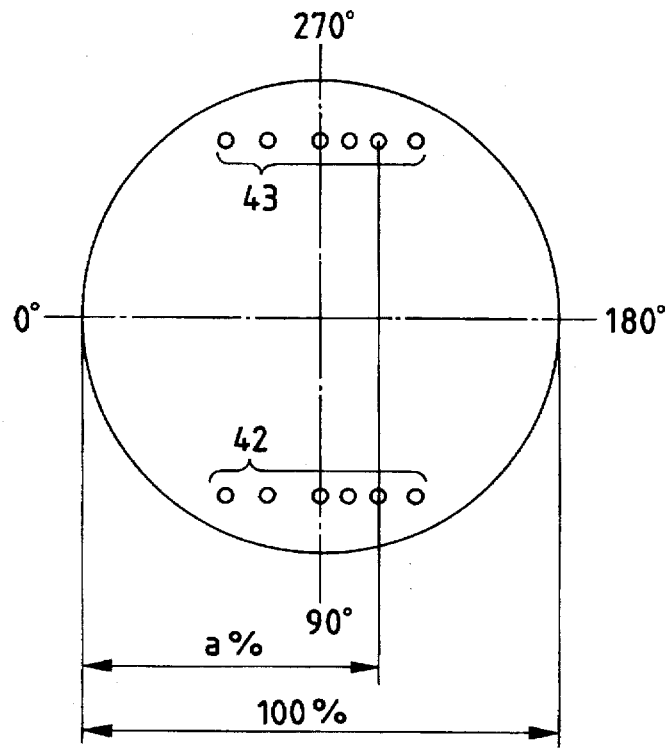
FIG. 13(a) shows the arrangement of holes formed in an upper surface of a drum base for insertion of pivots defining axes of rotation.
Figure 13B:
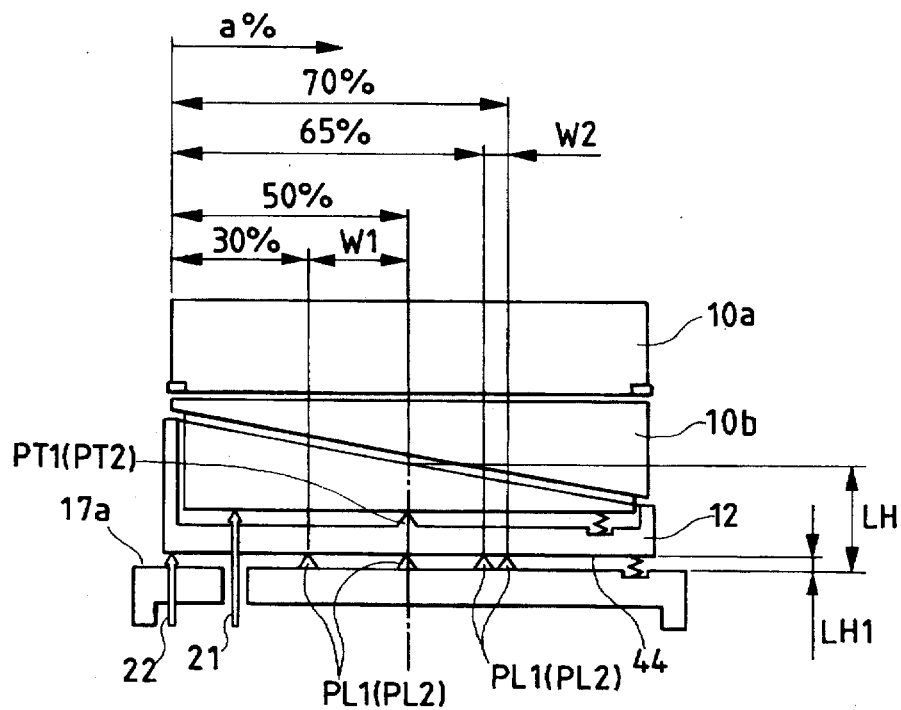
FIG. 13(b) is a 0°–180° cross sectional view of FIG. 13(a)

The inventors of this application first studied the arrangement of the pivots PL1 and PL2 for the lead correction in the magnetic recording/reproducing apparatus of the first embodiment. The results will be discussed with reference to FIGS. 13(a) and 13(b). FIG. 13(a) shows the arrangement of holes formed in the upper surface 17a of the drum base 17 for insertion of the lower protrusions PL1c and PL2c of the pivots PL1 and PL2 and omits other component elements for the brevity of illustration. FIG. 13(b) is a 0°–180° cross sectional view showing the drum assembly 100.

The pivots PT1 and PT2 for the track correction are, similar to the first embodiment, arranged along a line extending from 90° to 270°. Two arrays of holes 42 and 43 for insertion of the lower protrusions PL1c and PL2c of the pivots PL1 and PL2 are, as shown in FIG. 13(a), formed in the drum base 17 so that an axis of rotation of the lead ring 12 in the lead correction may be selectively defined. In FIG. 13(a), locations of the holes 42 and 43 are indicated by intervals from a tangent line of the lower drum 10b at the angular position of 0° in the angular direction of 180°, as expressed in percentage when the diameter of the tape-wrapped surface 10b-1 of the lower drum 10b is defined as 100%.

FIG. 14 is a table showing signal conditions of reproduced FM outputs in terms of combinations of the location of the pivots PL1 and PL2 and the multiple speed of the magnetic tape. "○" indicates a good signal condition of the FM output, "×" indicates a bad signal condition of the FM output, and "Δ" indicates a little better signal condition of the FM output.

The table shows that the good signal condition of the FM output is obtained in the FF playback mode over a range from 30% to 50% at the multiple speeds ranging from 3 to 21 and in the FB playback mode over a range from 66% to 70% at the multiple speeds ranging from −3 to −21. FIG. 13(b) represents these relations and shows that the pivots PL1 and PL2 are preferably arranged within a range W1 for defining an axis of rotation of the lead ring 12 for the lead correction in the FF playback mode, while they are preferably arranged within a range W2 for defining an axis of rotation of the lead ring 12 for the lead correction in the FB playback mode. Accordingly, in order to achieve both the FF playback mode at the multiple speeds of up to 21 and the FB playback mode at the multiple speeds of up to −21, it is necessary to define two separate axes of rotation of the lead ring 12 within the ranges W1 and W2.

The reason why the range W1 of the axis of rotation in the FF playback mode is different from the range W2 of the axis of rotation in the FB playback mode will be discussed below with reference to FIGS. 13(b) and 15(a) to 15(d).

Figure 15A:
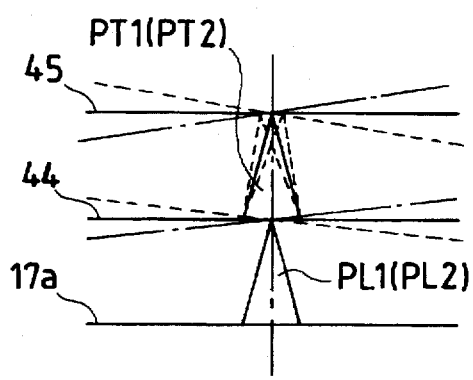
FIGS. 15(a) to 15(d) are schematic illustrations each showing inclination of a lower drum and a lead ring on pivots in FIG. 13(b)
Figure 15C:
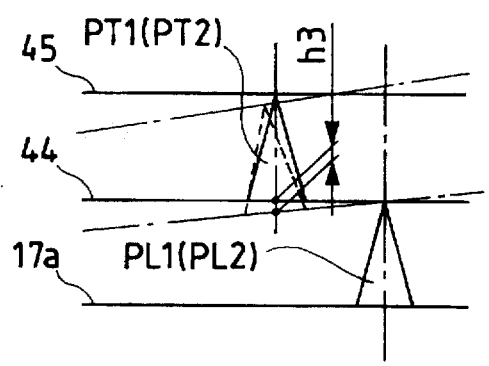
Figure 15B:
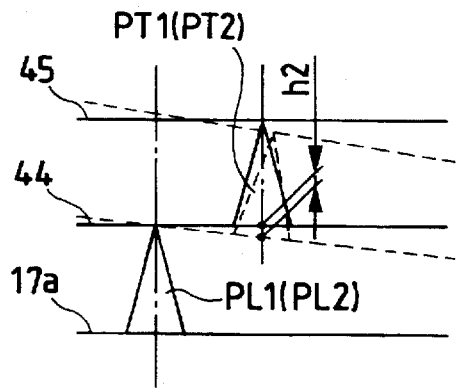

FIGS. 15(a) to 15(d) are schematic illustrations each showing the pivots PT1 and PT2 and the pivots PL1 and PL2 in FIG. 13(b). FIG. 15(a) shows the pivots PT1 and PT2 and the pivots PL1 and PL2 all arranged along a line extending from 90° to 270°. FIG. 15(b) shows the pivots PT1 and PT2 arranged along the line from 90° to 270° and the pivots PL1 and PL arranged within the range W1. FIG. 15(c) shows the pivots PT1 and PT2 arranged along the line from 90° to 270° and the pivots PL1 and PL2 arranged within the range W2. In these drawings, the reference number 44 indicates the bottom of the lead ring 12 supported by the pivots PL1 and PL2, and the reference number 45 indicates the bottom of the lower drum 10b supported by the pivots PT1 and PT2.

Usually, a head path of magnetic heads during the recording and normal playback modes and a lead of a lead ring extend along two lines intersecting at a given angle (e.g., 5° 56' 7.4" in a VHS VTR). However, in the magnetic recording/reproducing apparatus of this embodiment, a relative angle of the tape guide drum 10 (i.e., a plane defined by the head path of the magnetic heads Ha and Hb) to the lead ring 12 (i.e., the lead L) in the FF and FB playback modes is, as shown in FIG. 12, modified by the track correction to be different from that in the normal playback mode. Thus, a line defined by the lead L shows a near sine curve with respect to the head path of the magnetic heads Ha and Hb.

Next, the height of the lead L (i.e., the edge portion 12c) of the lead ring 12 subjected to the lead correction will be analyzed below. In the following discussion, a distance LH, as shown in FIG. 13(b), from the upper surface 17a of the drum base 17 to a portion of the edge portion 12c of the lead ring 12 at the angular position of 90° is defined as a reference value of the height of the lead L, and the reference value is expressed for convenience by the height LH1 from the upper surface 17a of the drum base 17 to the bottom 44 of the lead ring 12 at the angular position of 90°.

The variation in the height LH1 when the lead ring 12 undergoes the lead correction will be examined in FIGS. 15(a) to 15(c).

In FIG. 15(a), the height LH1 of the surface 44 of the lead ring 12, as shown by a solid line, in the normal playback mode, the height LH1, as shown by a broken line, of the surface 44 rotated clockwise in the FF playback mode, and the height LH1, as shown by a chain line, of the surface 44 rotated counterclockwise in the FB playback mode all show the same level.

In FIG. 15(b), the height LH1, as shown by a broken line, of the surface 44 rotated clockwise in the FF playback mode is lowered a distance h2 from the height LH1, as shown by a solid line, of the surface 44 in the normal playback mode.

In FIG. 15(c), the height LH1, as shown by a chain line, of the surface 44 rotated counterclockwise in the FB playback mode is lowered a distance h3 from the height LH1, as shown by a solid line, of the surface 44 in the normal playback mode.

It will be appreciated that shifting the locations of the pivots PL1 and PL2 horizontally from a line extending from 90° to 270° causes the height LH1 of the lead ring 12 (i.e., the height LH of the lead L) is lowered according to the lead correction in the FF or FB playback mode from that in the normal playback mode. This absorbs the undulation of the sine curve of the line along by the lead L due to the track correction, thereby providing the signal conditions of the FM outputs shown in FIG. 14.

Figure 15D:
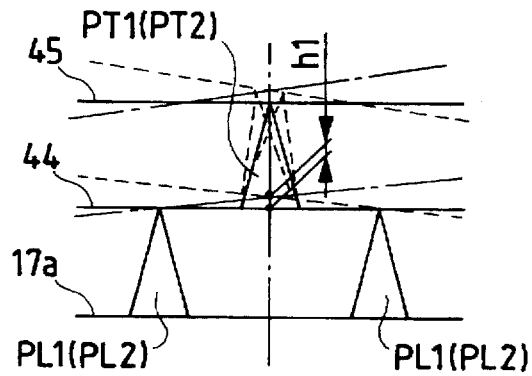

If the pivots PL1 and PL2 are, as shown in FIG. 15(d), arranged within the ranges W1 and W2 on the drum base 17, it will be apparent that the above mentioned decrease in the height LH1 of the lead ring 12 are not obtained both in the FF and FB playback modes. The reason for this is that since the lead correction in the FF playback mode rotates the lead ring 12 clockwise, the lead ring 12 is rotated about a line extending between the right side pivots PL1 and PL2, thereby causing the height of the lead ring 12 to be increased by a distance h1. This is true for the FB playback mode.

Figure 16:
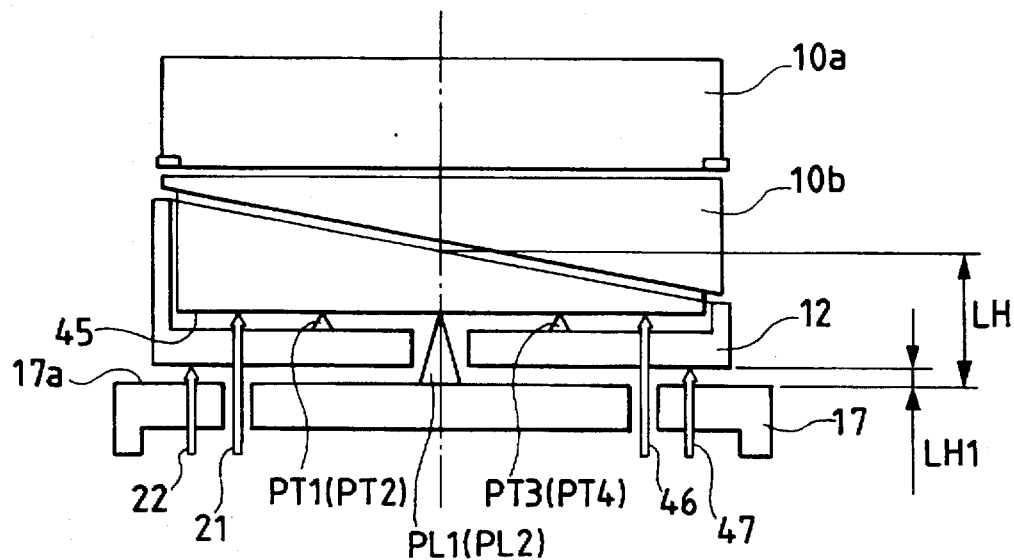
FIG. 16 is a schematic illustration which shows a drum positioning mechanism according to the second embodiment of the invention.
Figure 17A:
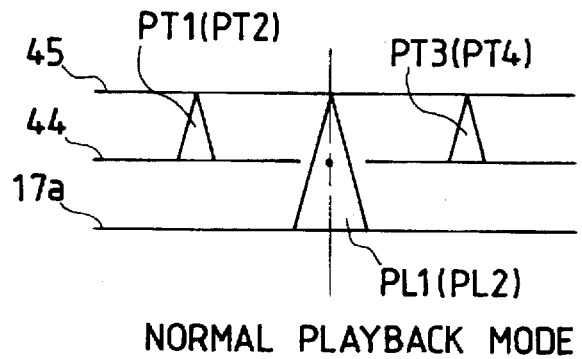
FIGS. 17(a) to 17(c) show inclination of a lower drum and a lead ring in normal playback, FF playback, and FB playback modes, respectively.

FIGS. 16 and 17 shows a second embodiment of the invention which is designed to decrease the height LH of the lead L (i.e., the height LH1 of the lead ring 12) according to the lead correction both in the FF and FB playback modes.

The four pivots PT1, PT2, PT3, and PT4 are disposed between the lead ring 12 and the lower drum 10b for the track correction. The track correction in the FB playback mode is accomplished by rotating the tape guide drum 10 counterclockwise about a line extending between the pivots PT1 and PT2 (perpendicular to the drawing of FIG. 16), while the track correction in the FF playback mode is accomplished by rotating the tape guide drum 10 clockwise about a line extending between the pivots PT3 and PT4 (perpendicular to the drawing of FIG. 15).

The pivots PL1 and PL2 for the lead correction are disposed on the drum base 17 along a line from 90° to 270° to support the lower drum 10b through the lead ring 12. An actuator 21 is mounted in the lead ring 12 at the angular position of 0°. An actuator 22 is mounted in the drum base 17 near 0°. An actuator 46 is disposed in the lead ring 12 at the angular position of 180°. An actuator 47 is disposed in the drum base 17 near 180°.

The actuator 21 urges the lower drum 10b in the clockwise direction, while the actuator 22 urges the lead ring 12 in the clockwise direction. Similarly, the actuator 46 urges the lower drum 10b in the counterclockwise direction, while the actuator 47 urges the lead ring 12 in the counterclockwise direction. An urging means for urging the lead ring 12 toward the lower drum 10b and an urging means such as the spring 23 in FIG. 7(b) for urging the tape guide drum 10 toward the drum base 17 are, although not shown in FIG. 15 for the brevity of illustration, provided.

Figure 17B:
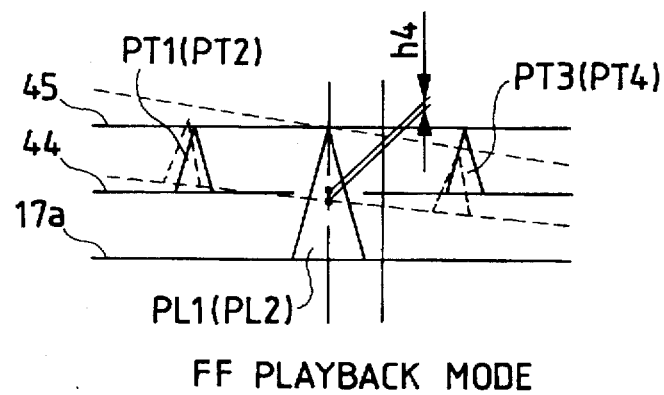
Figure 17C:
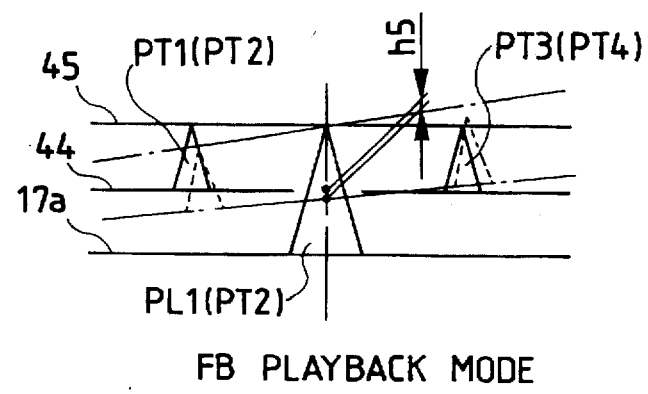

With the above arrangements, the lead correction in the FF and FB playback modes decreases the height LH of the lead L below that in the recording and normal playback modes. FIG. 17(b) shows that the height, as shown by a broken line, of the surface 44 of the lead ring 12 rotated clockwise in the FF playback mode is lowered a distance h4 from the height LH1, as shown by a solid line in FIG. 17(a), of the surface 44 in the normal playback mode. FIG. 17(c) shows that the height, as shown by a chain line, of the surface 44 of the lead ring 12 rotated counterclockwise in the FB playback mode is lowered a distance h5 from the height LH1, as shown by the solid line in FIG. 17(a), of the surface 44.

The basic position of the tape guide drum 10 relative to the lead ring 12 is established by moving the actuators 21 and 46 out of engagement with the bottom surface 45 of the lower drum 10b to hold the tape guide drum 10 on the pivots PT1, PT2, PT3, and PT4 disposed on the lead ring 12 with the aid of activities of the urging means for urging the lead ring 12 toward the lower drum 10b. The basic position of the lead ring 12 relative to the drum base 17 is accomplished by controlling the degree to which the actuators 22 and 47 project from the upper surface 17a of the drum base 17.

Figure 18:
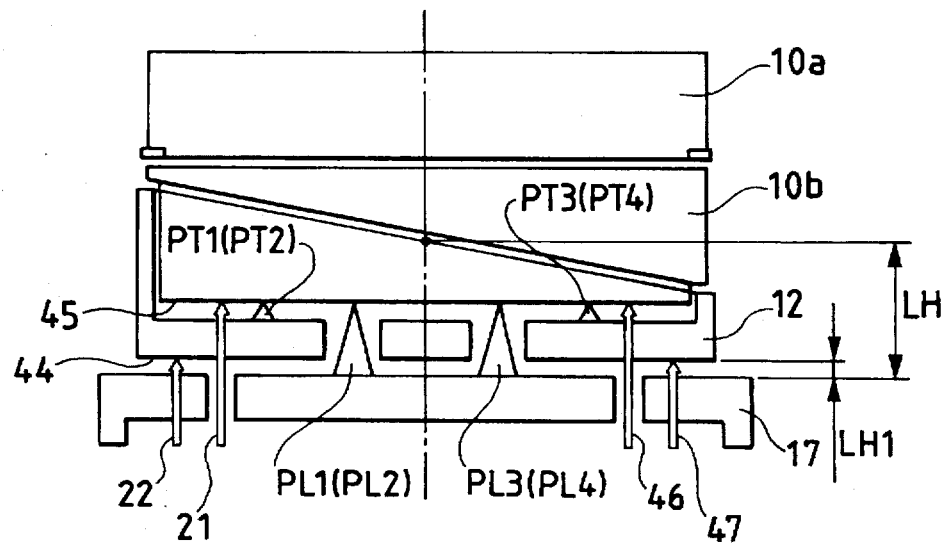
FIG. 18 is a schematic illustration which shows a drum positioning mechanism according to the third embodiment of the invention.
Figure 19A:
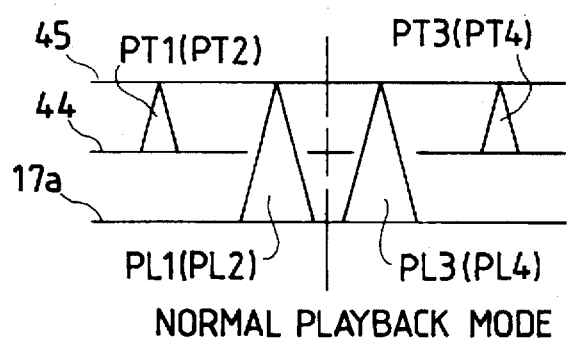
FIGS. 19(a) to 19(c) show inclination of a lower drum and a lead ring in normal playback, FF playback, and FB playback modes, respectively.

FIGS. 18 and 19 show a third embodiment which is designed to control the basic position of the lead ring 12 relative to the drum base 17 with high accuracy.

The arrangement of the pivots PT1, PT2, PT3, and PT4 for the track correction are the same as that in the above second embodiment and explanation thereof in detail will be omitted here.

The four pivots PL1, PL2, PL3, and PL4 for the lead correction are disposed on the drum base 17 through the lead ring 12 to support the lower drum 10b. The lead correction in the FB playback mode is accomplished by rotating the tape guide drum 10 together with the lead ring 12 counterclockwise about a line extending between the pivots PL1 and PL2 (perpendicular to the drawing of FIG. 18). The lead correction in the FF playback mode is accomplished by rotating the tape guide drum 10 together with the lead ring 12 clockwise about a line extending between the pivots PL3 and PL4 (perpendicular to the drawing of FIG. 18). The arrangements of the actuators 21, 22, 46, and 47 are the same as those in the above second embodiment.

Figure 19B:
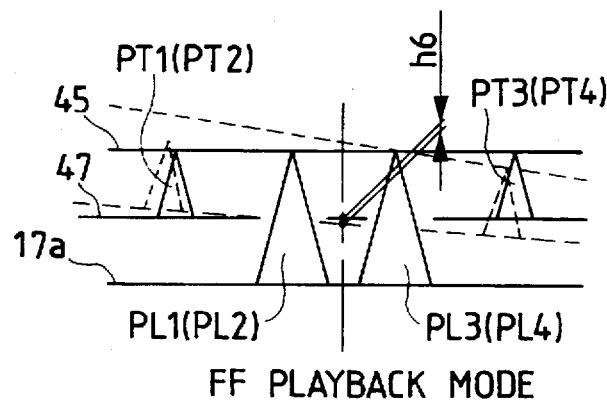
Figure 19C:
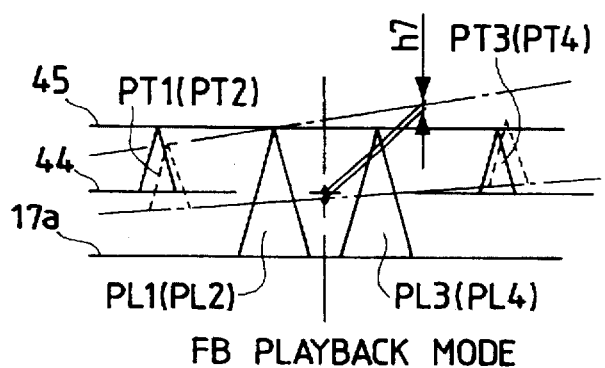

Accordingly, similar to the second embodiment, the lead correction decreases the height LH of the lead L below that in the recording and normal playback modes. FIG. 19(b) shows that the height, as shown by a broken line, of the surface 44 of the lead ring 12 rotated clockwise in the FF playback mode is lowered a distance h6 from the height LH1, as shown by a solid line in FIG. 19(a), of the surface 44 in the normal playback mode. FIG. 19(c) shows that the height, as shown by a chain line, of the surface 44 of the lead ring 12 rotated counterclockwise in the FB playback mode is lowered a distance h7 from the height LH1, as shown by the solid line in FIG. 17(a), of the surface 44.

The basic position of the tape guide drum 10 relative to the lead ring 12 in the recording and normal playback modes is established by moving the actuators 21 and 46 out of engagement with the bottom surface 45 of the lower drum 10b to hold the tape guide drum 10 on the pivots PT1, PT2, PT3, and PT4 disposed on the lead ring 12 with the aid of activities of the urging means urging the lead ring 12 toward the lower drum 10b. Similarly, the basic position of the lead ring 12 relative to the drum base 17 is accomplished by moving the actuators 22 and 47 downward from the lower surface 44 of the lead ring 12 to hold the lower surface 45 of the lower drum 10b on the pivots PL1, PL2, PL3, and PL4 disposed on the drum base 17 with the aid of activities of the urging means (not shown) urging the tape guide drum 10 toward the drum base 17.

In the third embodiment, the pivots PL1 to PL4 and PT1 to PT4 for the track correction and the lead correction are so arranged that the axes of rotation defined by the pivots PL1 to PL4 and PT1 to PT4 lie parallel to the line L1 extending from 90° to 270°, but the pivots PL1 to PL4 and PT1 to PT4 may alternatively be arranged as discussed below.

FIGS. 20(a) to 26(b) show a fourth embodiment which defines the axes of rotation of the tape guide drum 10 and the lead ring 12 which are oriented at a given angle relative to the line L1 extending from 90° to 270°.

Figure 20A:
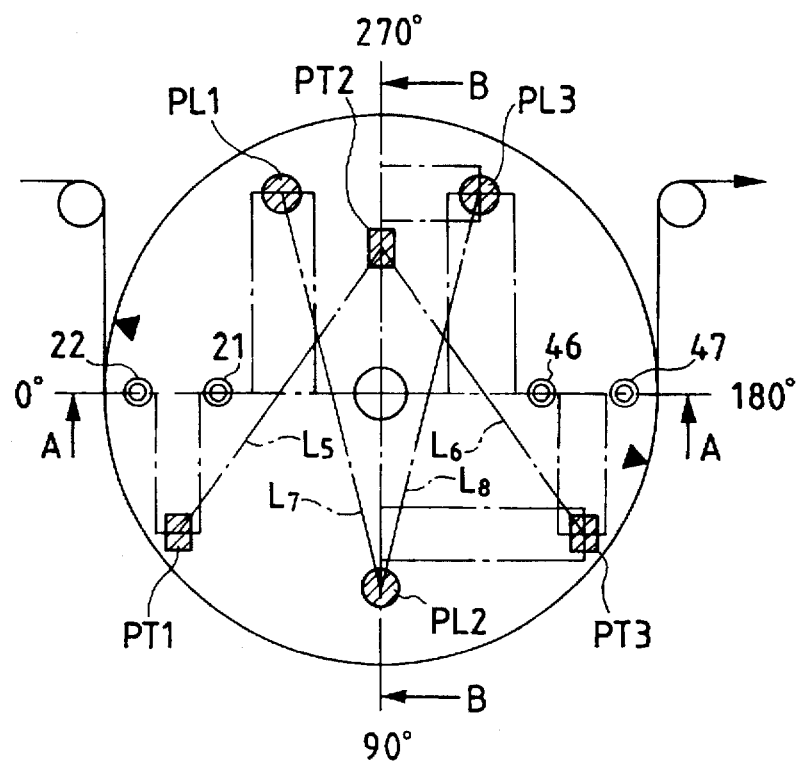
FIG. 20(a) is a schematic illustration which shows the positional relation among pivots for track correction formed on a lead ring and pivots for lead correction formed on a drum base according to the fourth embodiment of the invention.
Figure 20B:
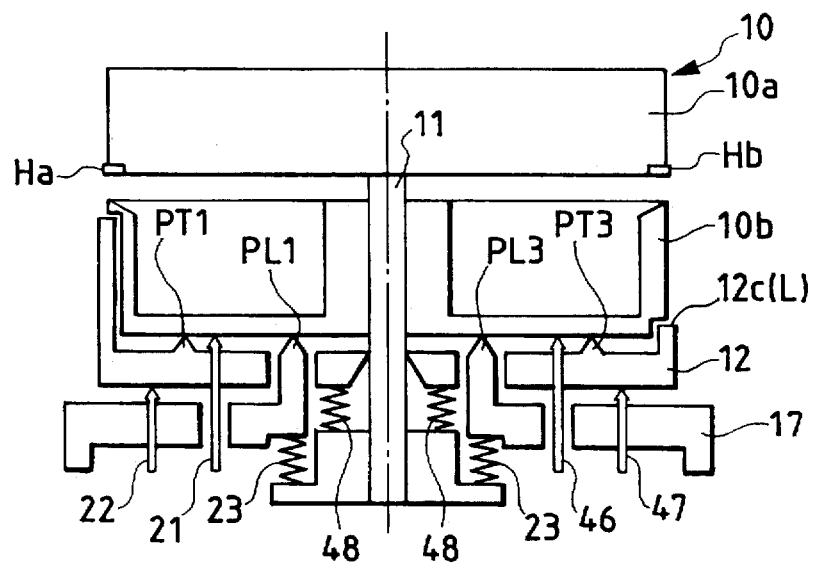
FIG. 20(b) is a schematic cross sectional illustration taken along the line A—A in FIG. 20(a)

FIG. 20(a) shows the positional relation among the pivots PT1, PT2, and PT3 for the track correction formed on the lead ring 12 and the pivots PL1, PL2, and PL3 for the lead correction formed on the drum base 17. FIG. 20(b) is a schematic cross sectional illustration taken along the line A—A in FIG. 20(a) showing a basic structure of the fourth embodiment.

The structure of the drum assembly 100 consisting of the tape guide drum 10 and the lead ring 12 and the coaxial arrangement of the upper drum 10a and the lower drum 10b about the drum shaft 11 are the same as those in the above first to third embodiments, and explanation thereof in detail will be omitted here.

The lead ring 12 has disposed thereon the pivot PT1 at an angular position of about 40°, the pivot PT2 at an angular position of about 270°, and the pivot PT3 at an angular position of about 140°. On the pivots PT1 to PT3, the tape guide drum 10 is mounted.

The drum base 17 has formed thereon the pivot PL1 at an angular position of about 300°, the pivot PL2 at an angular position of about 90°, and the pivot PL3 at an angular position of about 240°. The pivots PL1 to PL3 pass through the lead ring 12 to support the lower drum 10b.

Springs 23 are disposed between a flange of the drum shaft 11 and the drum base 17 to urge the tape guide drum 10 toward the drum base 17. Springs 48 are disposed between the drum shaft 11 and the lead ring 12 to urge the lead ring 12 toward the lower drum 10b. The actuators 21, 22, 46, and 47 are the same as those in the second and third embodiments.

Figure 21A:
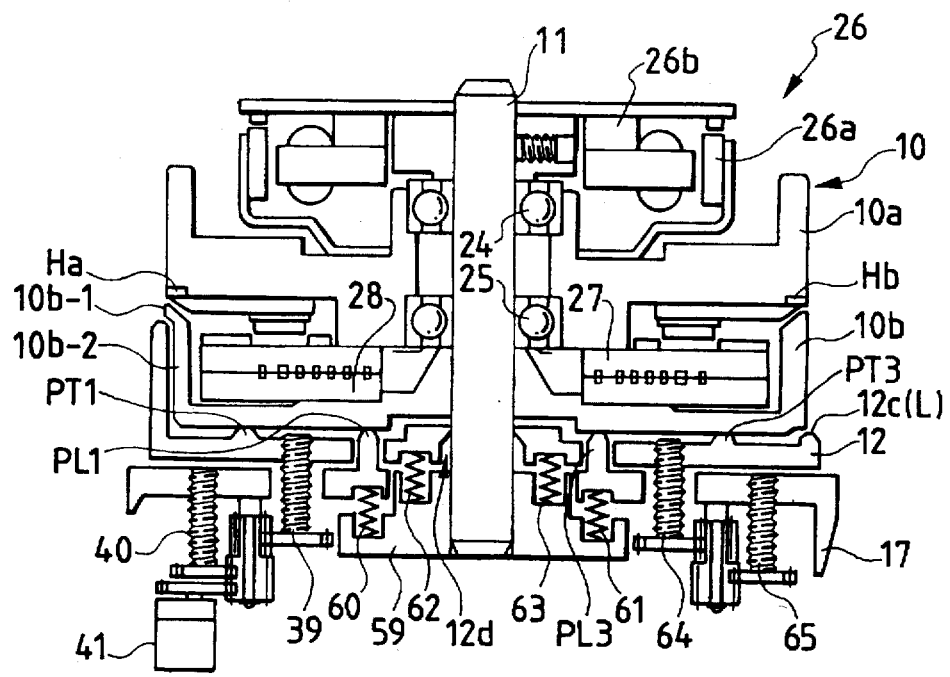
FIG. 21(a) is a cross sectional view taken along the line A—A in FIG. 20(a) which shows a structure of the drum positioning mechanism in detail.
Figure 21B:
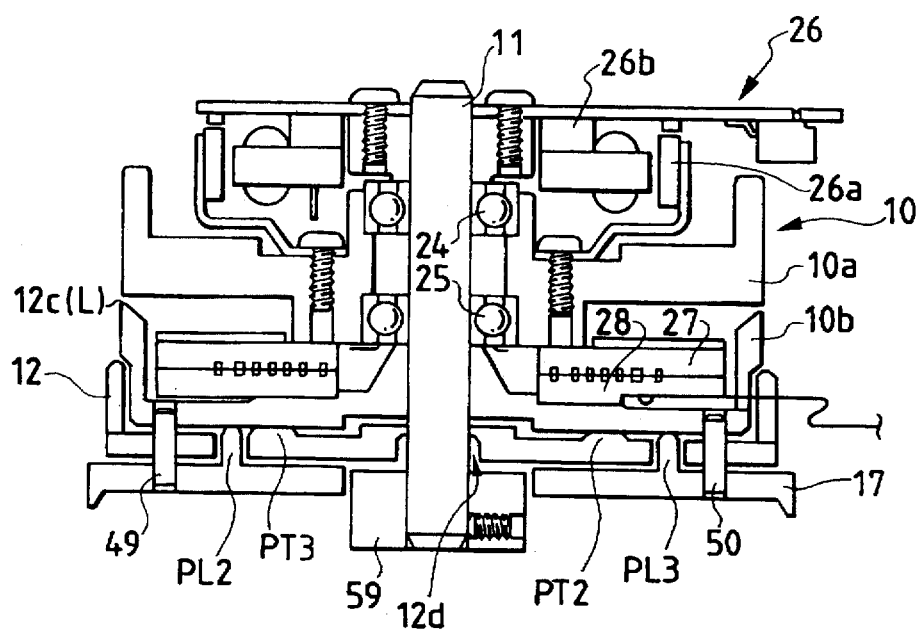
FIG. 21(b) is a cross sectional view taken along the line B—B in FIG. 20(a) which shows a structure of the drum positioning mechanism in detail.
Figure 22:
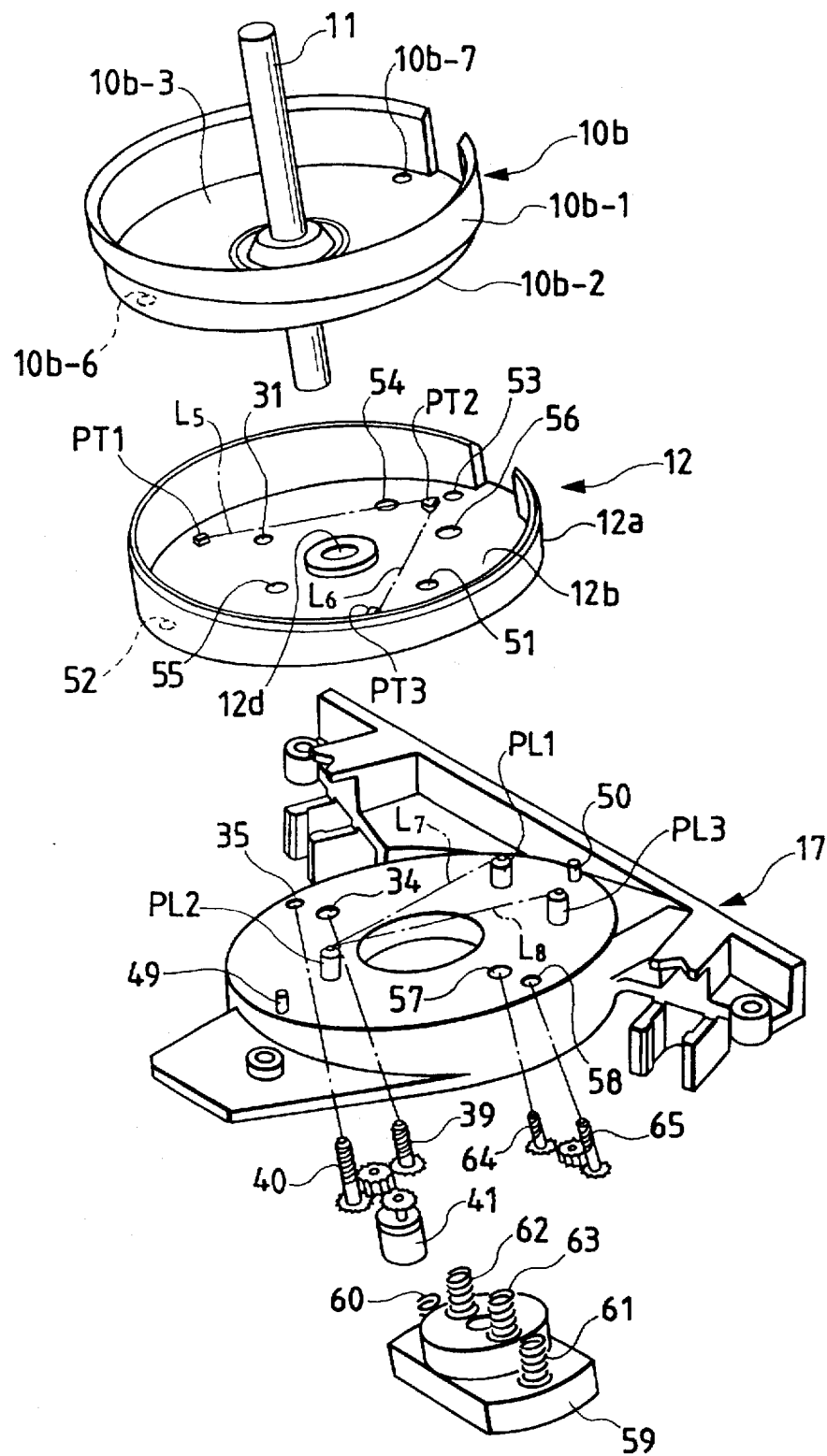
FIG. 22 is an exploded perspective view which shows a drum positioning mechanism of the fourth embodiment.

The upper drum 10a having mounted thereon the magnetic heads Ha and Hb is, as shown in FIGS. 21(a) to 22, supported rotatably by the drum shaft 11 through the bearings 24 and 25 in a coaxial relation to the lower drum 10b. The drum motor 26 includes a rotor 26a secured on the upper drum 10a and a stator 26b installed on the drum shaft 11. On the upper drum 10a, a rotary transformer 27 is disposed in an opposed relation to a transformer 28 mounted on the lower drum 10b for achieving transmission of signals therebetween.

The lower drum 10b, as shown in FIG. 22 includes an annular portion having formed thereon a tape-wrapped surface 10b-1 and a small-diameter surface 10b-2 smaller in diameter than the tape-wrapped surface 10b-1, and a bottom portion 10b-3. The small-diameter surface 10b-2 engages an annular portion 12a of the lead ring 12 with a given clearance.

The lower drum 10b also has formed in the bottom portion 10b-3 through holes 10b-6 and 10b-7 at the angular positions of 90° and 270°. Positioning pins 49 and 50 are disposed on the drum base 17 and inserted into the holes 10b-6 and 10b-7 with given clearances for determining a relative angular position of the lower drum 10b to the drum base 17.

The lead ring 12 includes the annular portion 12a, a bottom portion 12b, and a central opening 12d which is of knife-edge shape in cross section, as clearly shown in FIGS. 21(a) and 21(b). The drum shaft 11 is fitted into the central opening 12d with a certain clearance for avoiding eccentricity of the lower drum 10b and the lead ring 12. The annular portion 12a has an edge portion 12c functioning as a lead L for guiding movement of a lower edge of a magnetic tape.

The lead ring 12 also has formed in and on the bottom portion 12b a tapped hole 31 at the angular position of 0°, the pivot PT1 at the angular position of 40°, through holes 52 and 55 at the angular position of 90°, the pivot PT3 at the angular position of 140°, a tapped hole 51 at the angular position of 180°, a through hole 56 at the angular position of 240°, a through hole 53 and the pivot PT2 at the angular position of 270°, and a through hole 54 at the angular position of 300°.

The pivots PT1, PT2, and PT3 have protrusions at the same level from the bottom portion 12b. A line L5 extending from the pivot PT1 to PT2 and a line L6 extending from the pivot PT3 to PT2, as shown in FIG. 20(a), define axes of rotation of the tape guide drum 10 relative to the lead ring 12. The engagement of all the pivots PT1, PT2, and PT3 with the lower drum 10b establishes a basic position of the tape guide drum 10 relative to the lead ring 12.

The drum base 17 has formed in upper surface a tapped hole 35 and a through hole 34 at the angular position of 0°, and a through hole 57 and a tapped hole 58 at the angular position of 180°. The drum base 17 also has disposed on its upper surface the pivot PL2 and the positioning pin 49 at the angular position of 90°, the positioning pin 50 at the angular position of 270°, the pivot PL1 at the angular position of 300°, and the pivots PL3 at the angular position of 240°. The pivots PL1, PL2, and PL3, as shown in FIGS. 21(a) and 21(b), are formed with pin members and pressed into the drum base 17. The pivots PL1, PL2, and PL3 project from the through holes 54, 55, and 56 formed in the bottom portion 12b of the lead ring 12 to support the lower drum 10b.

A line L7 extending between the pivots PL1 and PL2 and a line L8 extending between the pivots PL3 and PL2 define axes of rotation of the tape guide drum 10 relative to the drum base 17. The basic position of the tape guide drum 10 relative to the drum base 17 is established when the pivots PL1, PL2, and PL3 all engage the lower drum 10.

The spring holder 59 is, as shown in FIGS. 21(b) and 22, secured on the bottom of the drum shaft 11. The coil springs 60 and 61 are disposed between the spring holder 59 and the drum base 17 to urge the tape guide drum 10 toward the lead ring 12. The coil springs 62 and 63 are disposed between the spring holder 59 and the lead ring 12 to urge the lead ring 12 toward the lower drum 10b.

The screw with a gear 39 and the screw with a gear 64 engage the tapped holes 31 and 51 of the lead ring 12 through the holes 34 and 57 of the drum base 17 and are moved by the motor 41 vertically to lift at their ends the bottom portion 10b-3 of the lower drum 10b upward. The screw with a gear 40 and the screw with a gear 65 engage the tapped holes 35 and 58 of the drum base 17 and are moved by the motor 41 vertically to lift at their ends the bottom portion 12b of the lead ring 12 upward.

Figure 23A:
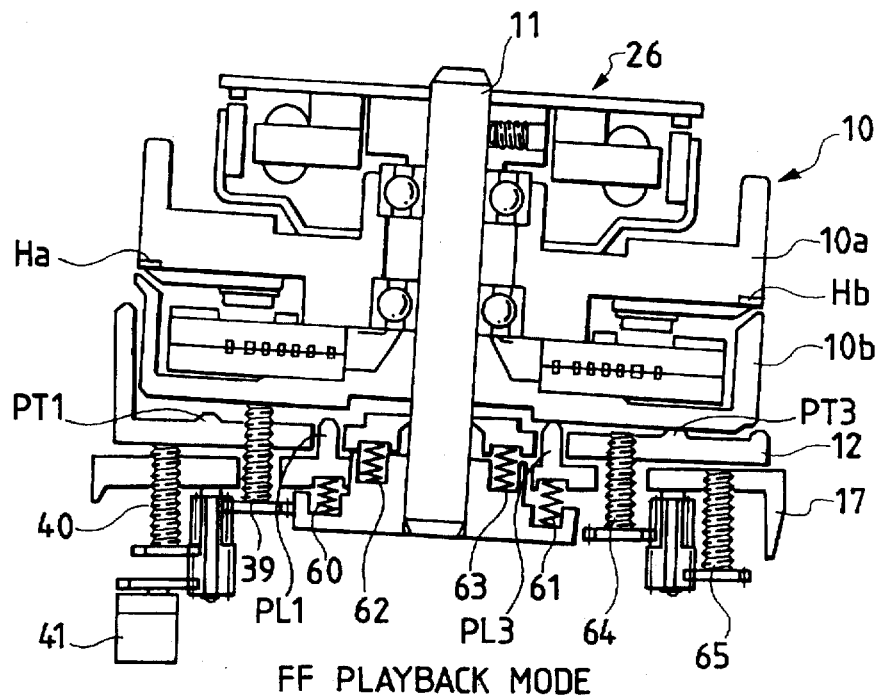
FIG. 23(a) is a cross sectional view taken along the line A—A in FIG. 20(a) which shows a tape guide drum and a lead ring turned counterclockwise in an FF playback mode.
Figure 23B:
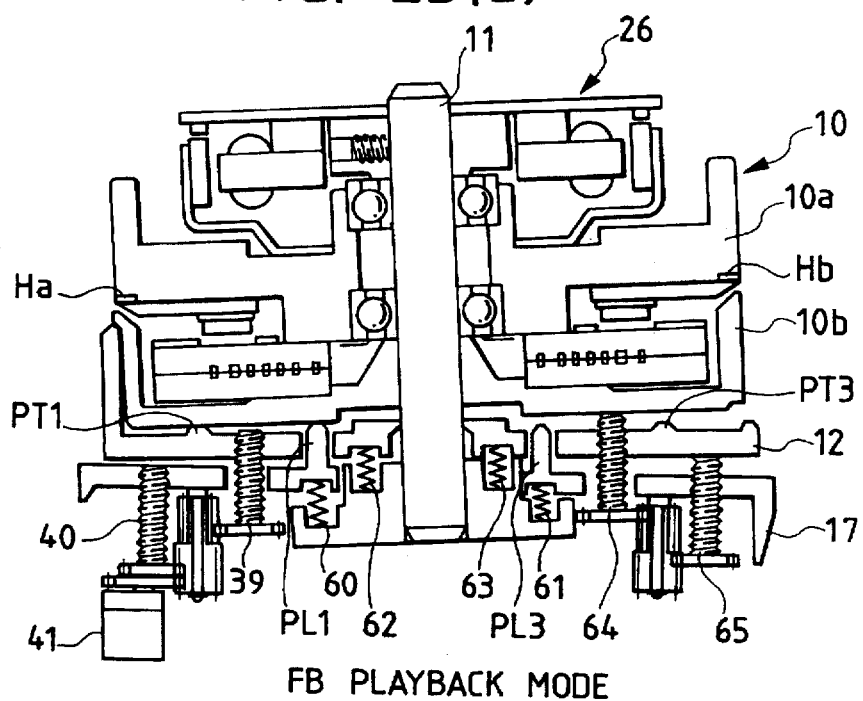
FIG. 23(b) is a cross sectional view taken along the line A—A in FIG. 20(a) which shows a tape guide drum and a lead ring turned counterclockwise in an FB playback mode.

In operation, the track correction in the FF playback mode is accomplished by moving the screw 39, as shown in FIG. 23(a), upward to lift up the lower drum 10b to rotate the tape guide drum 10 clockwise about the line L6 for correcting a head locus plane defined by the head path of the magnetic heads Ha and Hb to agree with tracks recorded on the magnetic tape. Simultaneously, the lead correction is performed by moving the screw 40 to rotate the lead ring 12 clockwise about the line L8. Similarly, the track correction in the FB playback mode is, as shown in FIG. 23(b), accomplished by moving the screw 64 upward to rotate the lower drum 10b counterclockwise about the line L5 relative to the lead ring 12. Simultaneously, the lead correction is accomplished by moving the screw 65 upward to rotate the lead ring 12 counterclockwise about the line L7.

During the recording and normal playback modes, the tape guide drum 10 and the lead ring 12 are in the basic positions relative to the drum base 12 and the lower drum 10b, respectively. Specifically, the screws 39 and 64 are, as shown in FIG. 21(a), moved by the motor 41 downward from the lower drum 10b, and the screws 40 aid 65 are also moved by the motor 41 downward from the lead ring 12. Since the coil springs 60 and 61 urge the tape guide drum 10 downward, the lower drum 10b or the tape guide drum 10 is held in the basic position on a plane defined by the pivots PL1, PL2, and PL,3. Similarly, the basic position of the lead ring 12 is established with engagement of the pivots PT1, PT2, and PT3 with the lower drum 10b with aid of spring forces of the coil springs 62 and 63.

Figure 24A:
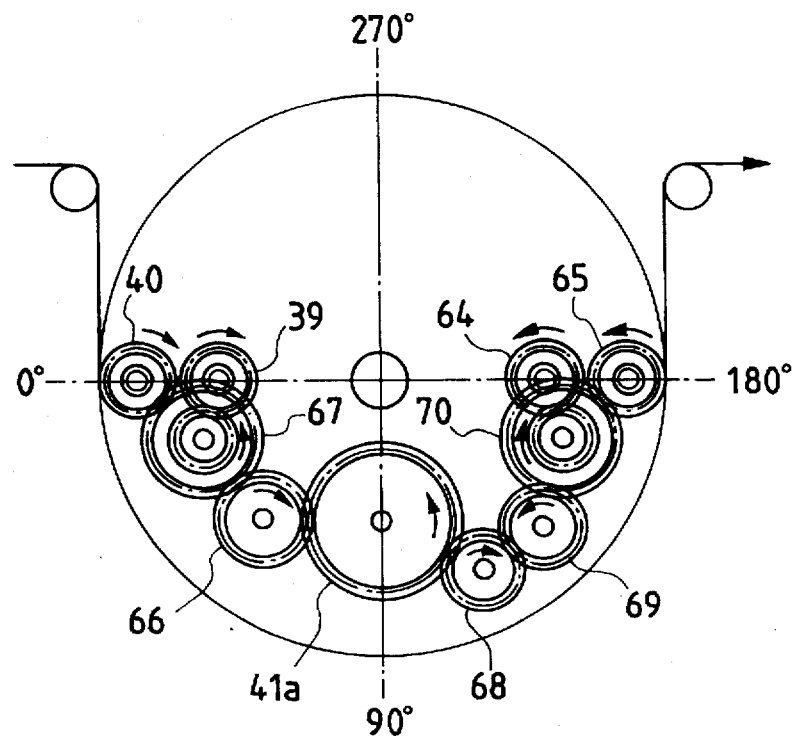
FIG. 24(a) is a horizontal cross sectional view which shows the arrangement of gears of a drive mechanism.
Figure 24B:
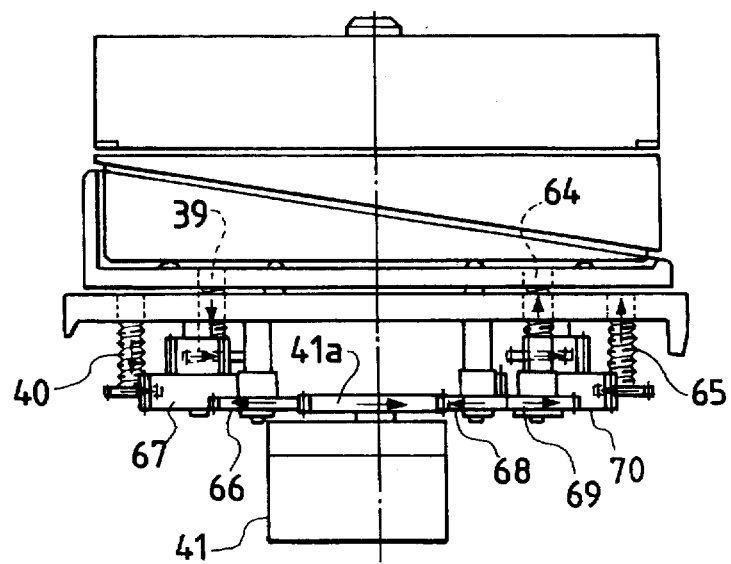
FIG. 24(b) is a front elevation of FIG. 24(a)

FIGS. 24(a) and 24(b) show a drive mechanism for screws 39, 64, 40, and 65.

As already discussed in the first embodiment, an angle at which the tape guide drum 10 is inclined relative to the lead ring 12 by the track correction has a constant relation to an angle at the lead correction. This permits the screws 39, 64, 40, and 65 to be driven by the single motor 41. In practice, rotation of an output gear 41a of the motor 41 is, as shown in FIG. 24(a), transmitted to the screws 39 and 40 at a first speed ratio through two idle gears 66 and 67 and also transmitted to the screws 64 and 65 at a second speed ratio through three idle gears 68, 69, and 70. This rotates all the idle gears and the screws in directions, as shown by arrows in FIG. 24(a), in the FB playback mode, so that the screws 64 and 65 are moved upward, as shown in FIG. 24(b), at the second speed ratio and the screws 39 and 40 are moved downward at the first speed ratio for achieving the track correction and the lead correction according to the traveling speed of the magnetic tape.

In the recording and normal playback modes, the tape guide drum 10 and the lead ring 12 are held in the basic position by moving the screws 39, 40, 64, and 65, as shown in FIG. 21(a), out of engagement with the lead ring 12 and the lower drum 10b to hold the lower drum 10b on a plane defined by the pivots PL1, PL2, and PL3 disposed on the drum base 17 and to establish constant engagement of the pivots PT1, PT2, and PT3 with the lower drum 10b.

Figure 25:
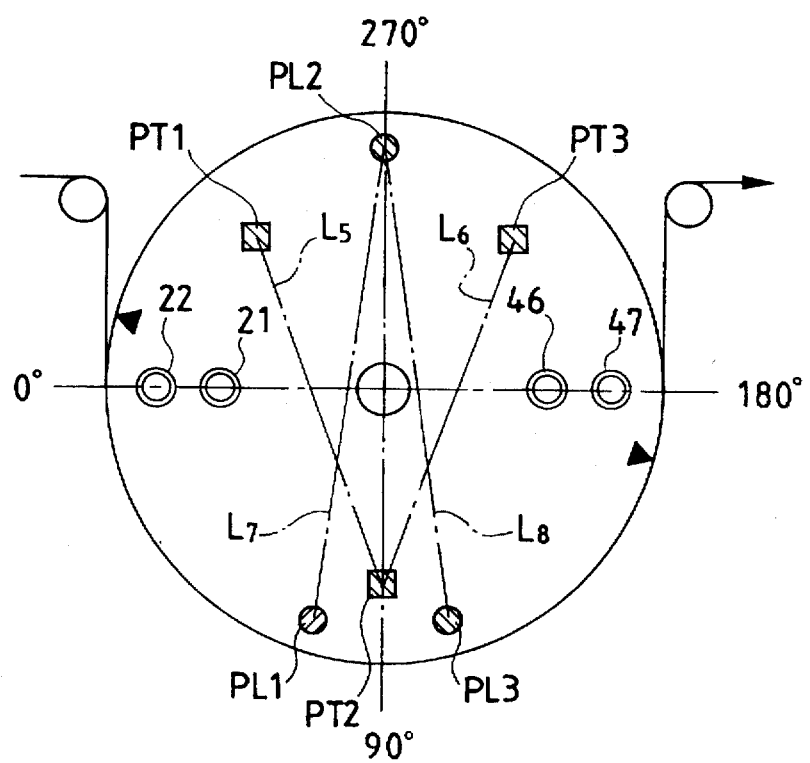
FIG. 25 shows a modification of the arrangement of pivots in the fourth embodiment.

The arrangements of the pivots PT1, PT2, and PT3 and the pivots PL1, PL2, and PL3 are not limited to the one as discussed above. For instance, the pivots PT1, PT2, and PT3 may be arranged diametrically opposite the pivots PL1, PL2, and PL3 with respect to the line extending from 0° to 180°, respectively. It is, however, advisable that the pivots PT1 and PT3 for the track correction, as shown in FIGS. 20(a) and 25, be arranged farther from the line extending from 90° to 270° than the pivots PL1 and PL3 for the lead correction. This is because the height LH of the lead L is decreased above that in the normal playback mode.

Figure 26A:
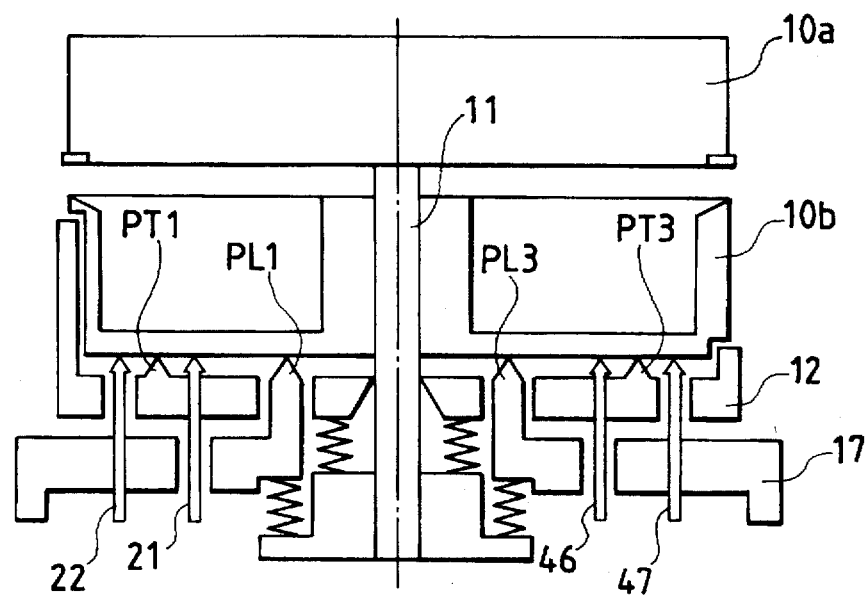
FIGS. 26(a) and 26(b) show modifications of a drive means for rotating a lower drum and a lead ring.
Figure 26B:
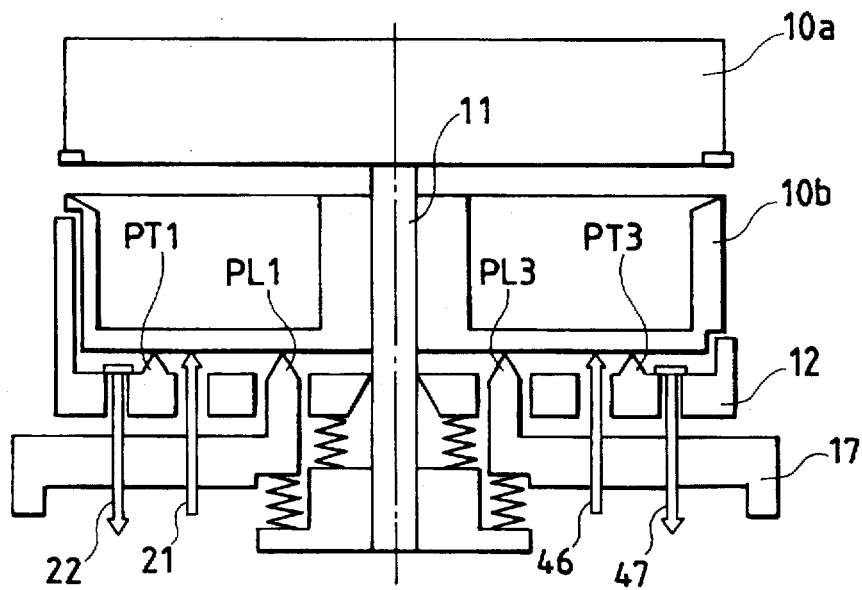

The actuator 22 (i.e., screw 40) and actuator 47 (i.e., screw 65) in the second, third, and fourth embodiments rotate the lead ring 12 relative to the drum base 17, but they are not limited to the same. The actuators 22 and 47, as shown in FIG. 26(a), may alternatively act directly on the lower drum 10b through the lead ring 12. Additionally, as shown in FIG. 26(b), they may be suspended from the upper surface of the lead ring 12 to draw the lead ring 12 downward.

Figure 27A:
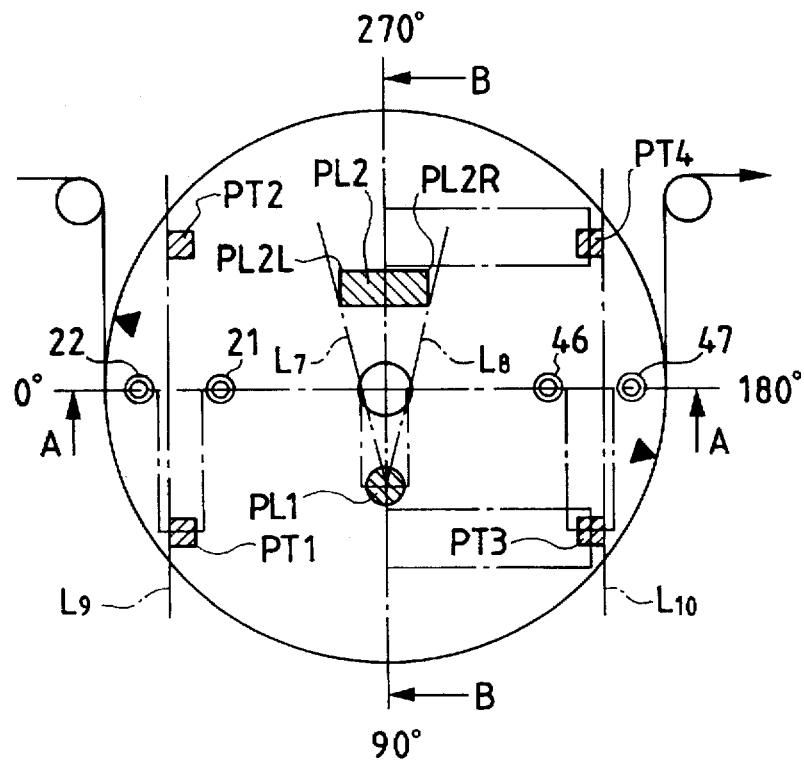
FIG. 27(a) shows the positional relation among pivots for track correction formed on a lead ring and pivots for lead correction formed on a drum base according to the fifth embodiment of the invention.
Figure 27B:
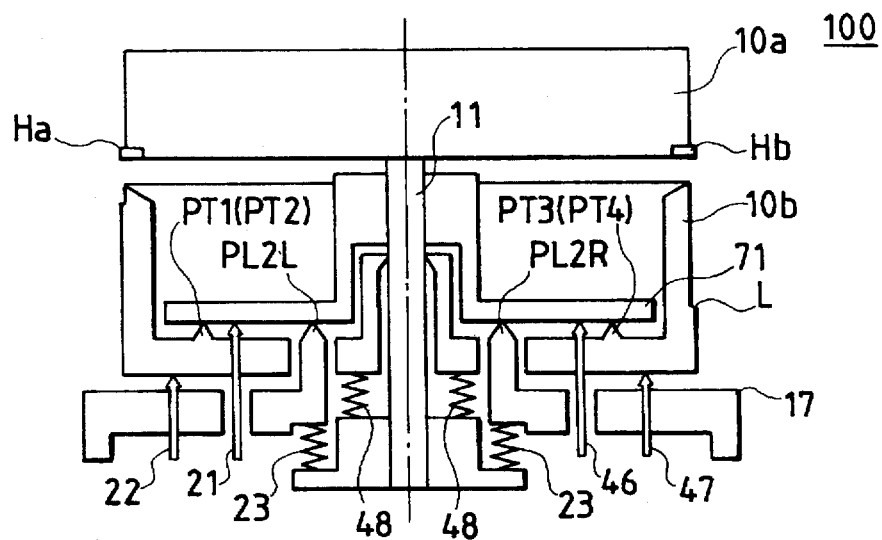
FIG. 27(b) is a schematic across sectional illustration taken along the line A—A in FIG. 27(a) which shows a basic structure of a drum positioning mechanism of the fifth embodiment.

Referring to FIGS. 27(a) to 30(d), there is shown the fifth embodiment of the invention. FIG. 27(a) shows the positional relation among the pivots PT1, PT2, PT3, and PT4 for the track correction formed on the lead ring 12 and the pivots PL1 and PL2 for the lead correction formed on the drum base 17. FIG. 27(b) is a schematic across sectional illustration taken along the line A—A in FIG. 27(a) showing a basic structure of the fifth embodiment.

The drum assembly 100 generally includes the lower drum 10b mounted on the drum base 17, an intermediate disc member 71 mounted on the lower drum 17, and the upper drum 10a.

The upper drum 10a has mounted thereon the magnetic heads Ha and Hb and is supported by the drum shaft 11 coaxially with the intermediate disc member 71.

The lower drum 10b has formed thereon the pivot PT1 at an angular position of 40°, the pivot PT3 at an angular position of 140°, the pivot PT4 at an angular position of 220°, and the pivot PT2 at an angular position of 320°. On the pivots PT1, PT2, PT3, and PT4, the intermediate disc member 71 is mounted.

The drum base 17 has formed thereon the pivots PL1 and PL2 at the angular positions of 90° and 270°, respectively, which pass through the lower drum 10b to support the intermediate disc member 71. The pivot PL2, as will be described later in detail, is formed with a rectangular protrusion having a given length parallel to a line extending from 0° to 180° and defines a plane along with the pivot PL1 for holding the intermediate disc member 71 or the upper drum 10a in a basic position.

The springs 23 are disposed between the drum shaft 11 and the drum base 17 to urge the upper drum 10a and the intermediate disc member 71 toward the drum base 17. The springs 48 are disposed between the drum shaft 11 and the lower drum 10b to urge the lower drum 10b toward the intermediate disc member 71. The actuators 21, 22, 46, and 47 are the same as those in the second to fourth embodiments. Specifically, the actuators 21 and 46 act on the intermediate disc member 71 to rotate the intermediate disc member 71 along with the upper drum 10a clockwise or counterclockwise, as viewed in FIG. 27(b), for achieving the track correction. Similarly, the actuators 22 and 47 act on the lower drum 10b to rotate the lower drum 10b clockwise or counterclockwise for achieving the lead correction.

The structure of the fifth embodiment will be described in detail with reference to FIGS. 28(a) to 30(b).

The upper drum 10a having mounted thereon the magnetic heads Ha and Hb is rotatably supported by the drum shaft 11 through the bearings 24 and 25 in a coaxial relation to the intermediate disc member 71. The drum motor 26 includes the rotor 26a secured on the upper drum 10a and the stator 26b installed on the drum shaft 11. On the upper drum 10a, the rotary transformer 27 is disposed in an opposed relation to the transformer 28 mounted on the lower drum 10b for achieving transmission of signals therebetween.

The intermediate disc member 71 has a central hole into which the drum shaft 11 is pressed and through holes 71a and 71b formed in peripheral portions at the angular positions of 90° and 270° into which the positioning pins 49 and 50 mounted on the drum base 17 are inserted with small clearances for determining a relative angular position of the intermediate disc member 71 to the drum base 17.

Figure 28A:
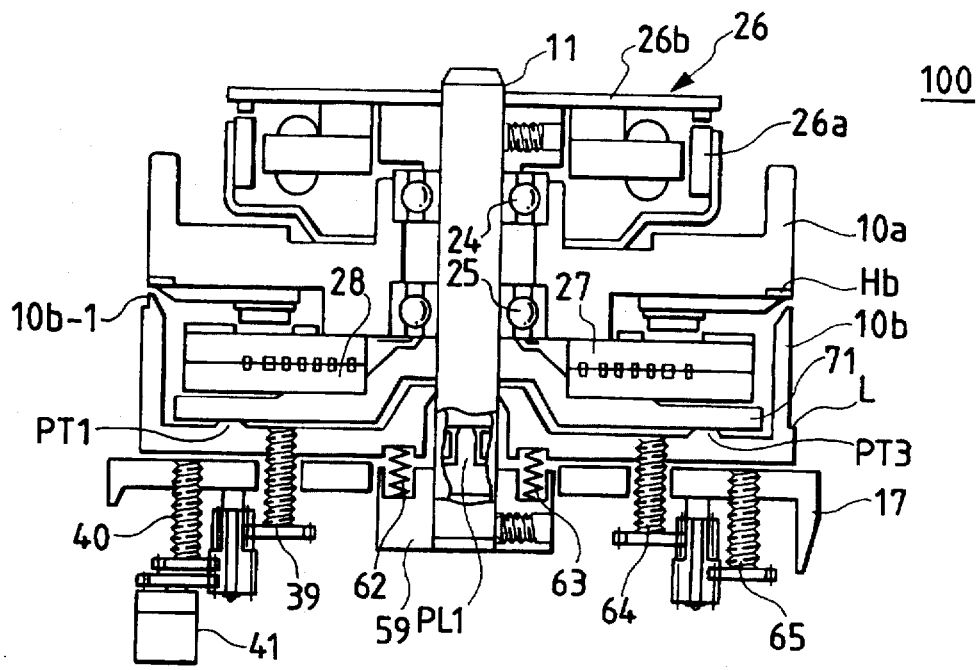
FIG. 28(a) is a cross sectional view taken along the line A—A in FIG. 27(a) which shows a drum positioning mechanism of the fifth embodiment in detail.
Figure 28B:
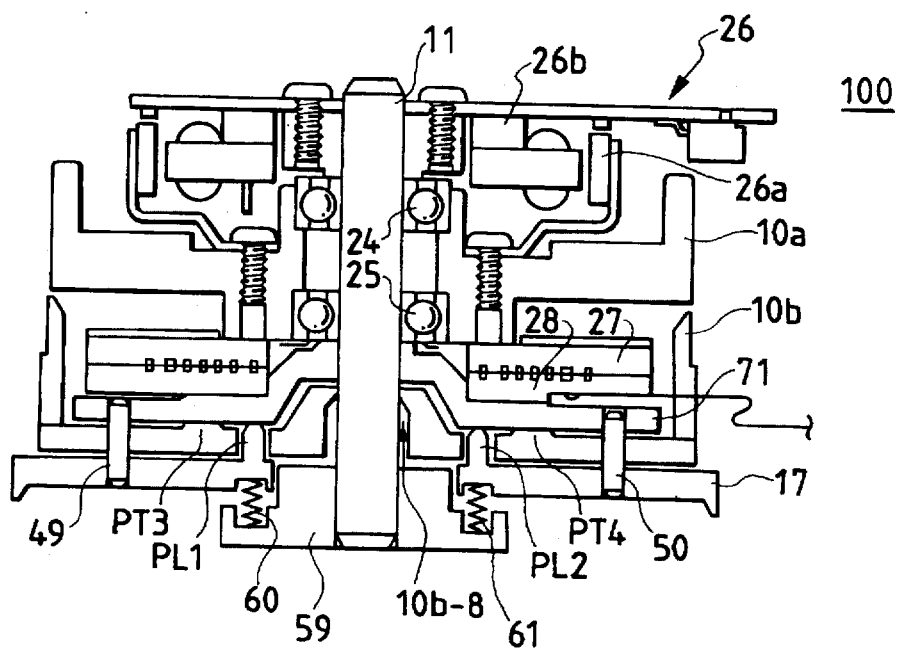
FIG. 28(b) is a cross sectional view taken along the line B—B in FIG. 27(a) which shows a drum positioning mechanism of the fifth embodiment in detail.

The lower drum 10b includes an annular portion having formed thereon the tape-wrapped surface 10b-1 and the lead L, the bottom portion 10b-3, and the central opening 10b-8 which is of knife-edge shape in cross section, as clearly shown in FIGS. 28(a) and 28(b). The drum shaft 11 is fitted into the central opening 10b-8 with a small clearance for avoiding eccentricity of the lower drum 10b, the intermediate disc member 71, and the upper drum 10a.

The lower drum 10b also has formed in the bottom portion 10b-3 a tapped hole 72 at the angular position of 0°, the pivot PT1 at an angular position of 40°, through holes 74 and 75 at the angular position of 90°, the pivot PT3 at an angular position of 140°, a tapped hole 73 at the angular position of 180°, the pivot PT4 at an angular position of 220°, a through hole 76 and a rectangular opening 77 at the angular position of 270°, and the pivot PT2 at an angular position of 320°. Into the through holes 75 and 76, the positioning pins 49 and 50 mounted on the drum base 17 are inserted with small clearances for determining a relative angular position of the lower drum 10b to the drum base 17.

The pivots PT1, PT2, PT3, and PT4 are formed with protrusions which are at the same level from the bottom portion 10b-3. A line L9 extending from the pivot PT1 to PT2 and a line L10 extending from the pivot PT3 to PT4 define axes of rotation of the intermediate disc member 71 or the upper drum 10a relative to the lower drum 10b. The engagement of all the pivots PT1, PT2, PT3, and PT4 with the intermediate disc member 71 establishes a basic position of the upper drum 10a relative to the lower drum 10b.

The drum base 17 has a through hole 34 and a tapped hole 35 formed at the angular position of 0°, the pivot PL2 and a positioning pin 49 disposed at the angular position of 90°, a through hole 57 and a tapped hole 58 formed at the angular position of 180°, and the pivot PL2 and a positioning pin 50 disposed at the angular position of 270°. The pivot PL1, as shown in FIG. 28(b), is made of a pin member pressed into the drum base 17. The pivot PL2 is, as mentioned above, made of a rectangular block member having tapered surfaces forming an edge extending from 0° to 180°. The pivots PL1 and PL2 pass through the holes 74 and 77 formed in the bottom portion 10b-3 of the lower drum 10b to support the intermediate disc member 71.

A line L7 extending from the pivots PL1 to the left end portion PL2L of the pivot PL2 and a line L8 extending from the pivot PL1 and the right end portion PL2R of the pivot PL2 define axes of rotation of the intermediate disc member 71 or the upper drum 10a relative to the drum base 17. The engagement of both the pivots PL1 and PL2 with the lower drum 10 establishes a basic position of the upper drum 10a relative to the drum base 17.

Figure 29:
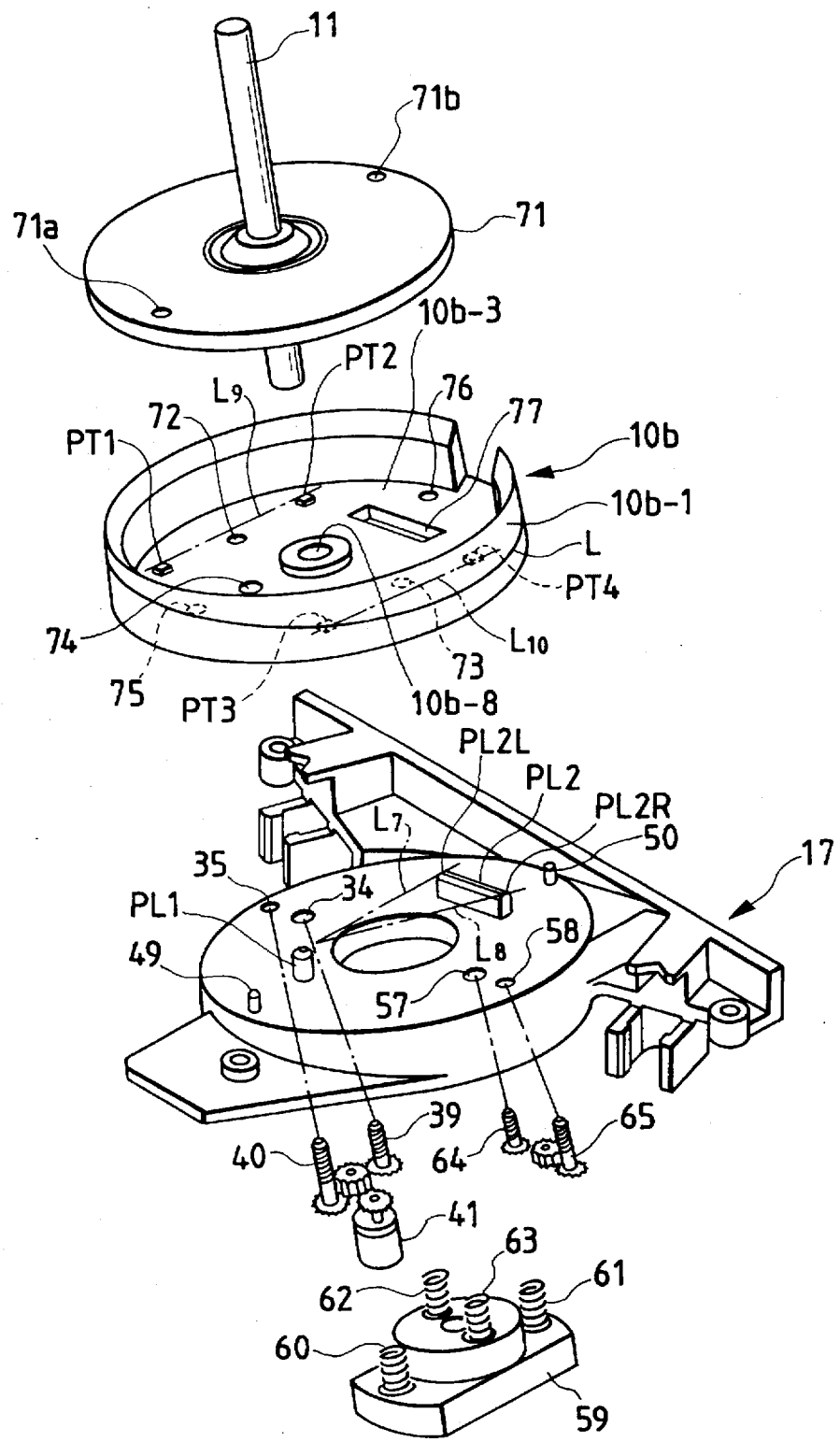
FIG. 29 is an exploded perspective view which shows a drum positioning mechanism of the fifth embodiment.

The spring holder 59 is, as shown in FIG. 28(b) and 29, secured on the bottom of the drum shaft 11. The coil springs 60 and 61 are disposed between the spring holder 59 and the drum base 17 to urge the intermediate disc member 71 and the upper drum 10a toward the drum base 17. The coil springs 62 and 63 are disposed between the spring holder 59 and the lower drum 10b to urge the lower drum 10b toward the intermediate disc member 71.

The screws with gears 39 and 64 pass through the holes 34 and 57 of the drum base 17 to engage the tapped holes 72 and 73 of the lower drum 10b and are moved by the motor vertically to lift up at their ends the intermediate disc member 71. The screws with gears 40 and 65 engaged the tapped holes 35 and 58 of the drum base 17 and are moved by the motor 41 vertically to lift up at their ends the bottom portion 10b-3 of the lower drum 10b.

Figure 30A:
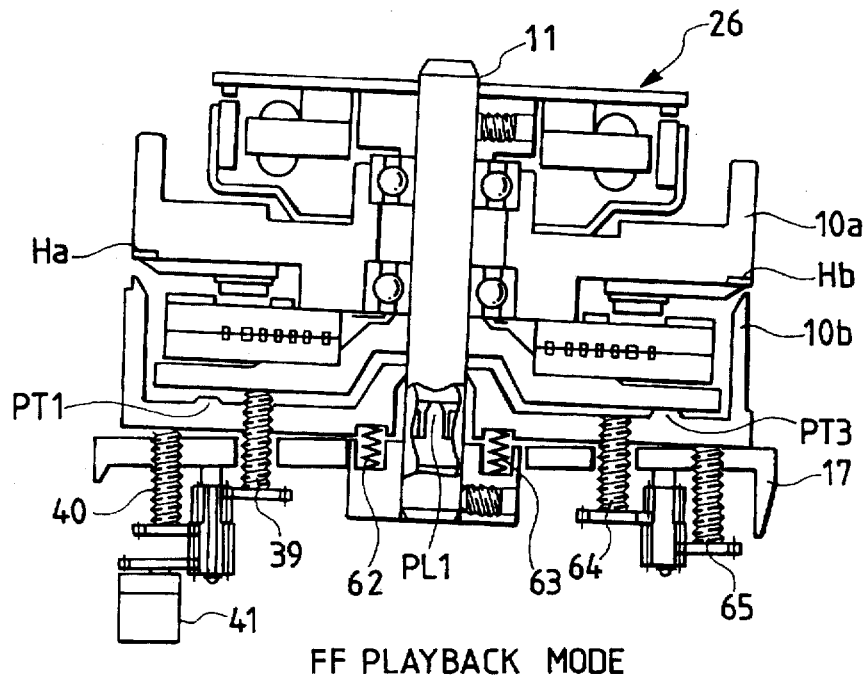
FIG. 30(a) is a cross sectional view taken along the line A—A in FIG. 27(a) which shows a tape guide drum and a lead ring turned counterclockwise in an FF playback mode.
Figure 30B:
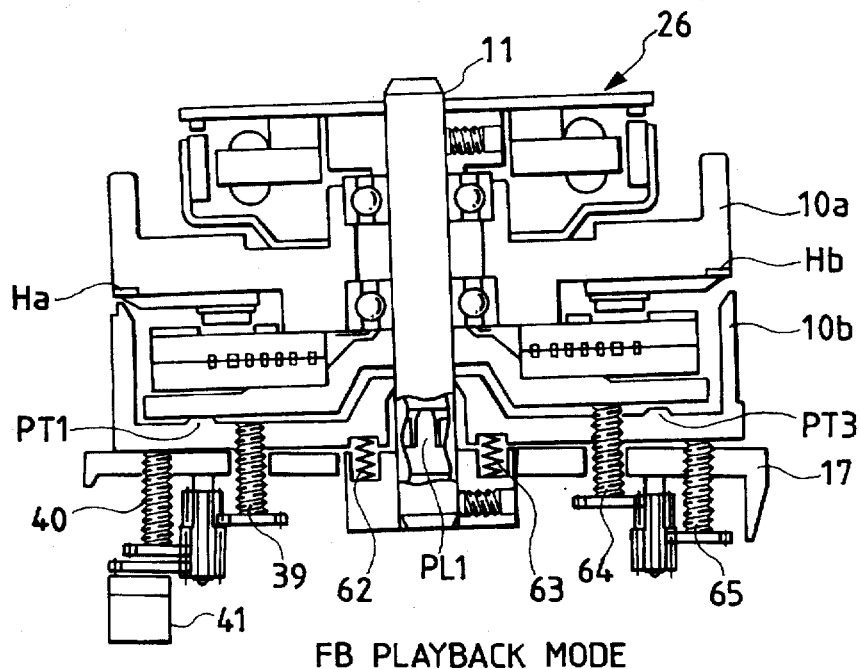
FIG. 30(b) is a cross sectional view taken along the line A—A in FIG. 27(a) which shows a tape guide drum and a lead ring turned counterclockwise in an FB playback mode.

In operation, the track correction in the FF playback mode is, as shown in FIG. 30(a), accomplished by moving the screw 39 upward to lift up the intermediate disc member 71 to rotate the intermediate disc member 71 together with the upper drum 10a clockwise about the line L10, as shown in FIG. 29, relative to the lower drum 10b. Simultaneously, the lead correction is performed by moving the screw 40 to lift up the lower drum 10b to rotate it clockwise about the line L8. Similarly, the track correction in the FB playback mode is, as shown in FIG. 30(b), accomplished by moving the screw 64 upward to rotate the intermediate disc member 71 and the upper drum 10a counterclockwise about the line L9 relative to the lower drum 10b. Simultaneously, the lead correction in the FB playback mode is accomplished by moving the screw 65 upward to rotate the lower drum 10b counterclockwise about the line L7.

During the recording and normal playback modes, the intermediate disc member 71 and the upper drum 10a are in the basic position relative to the drum base 17, while the lower drum 10b is in the basic position relative to the intermediate disc member 71. Specifically, the screws 39 and 64 are, as shown in FIG. 28(a), moved by the motor 41 downward from the intermediate disc member 71, and the screws 40 and 65 are also moved by the motor 41 downward from the lower drum 10b. The coil springs 60 and 61 urges the intermediate disc member 71 and the upper drum 10a downward. Thus, the intermediate disc member 71 or the upper drum 10a is held in the basic position on a plane defined by the pivots PL1 and PL2. Similarly, the basic position of the lower drum 10b is established with engagement of the pivots PT1, PT2, PT3, and PT4 with the intermediate disc member 71 with aid of spring forces of the coil springs 62 and 63. A drive mechanism for moving the screws 39, 64, 40, and 65 is the same set forth in the fourth embodiment, and explanation thereof in detail will be omitted here.

In the recording and normal playback modes, the screws 39, 40, 64, and 65 are, as shown in FIG. 28(a), moved out of engagement with the intermediate disc member 71 and the lower drum 10b to hold the intermediate disc member 71 (i.e., the upper drum 10a ) on a plane defined by the pivots PL1, PL2, and PL3 disposed on the drum base 17 and to establish constant engagement of the pivots PT1, PT2, PT3, and PT4 with the intermediate disc member 71.

While, in the above first to fifth embodiment, the FF and FB playback are discussed as examples of the trick play, the present invention may be useful in the STILL and slow playback modes. As apparent from FIG. 12, it is advisable that, in the STILL playback mode, angles corresponding to a multiple speed of zero (0) be selected as the track correction angle θ1 and the lead correction angle θ2, while in a rearward slow playback mode, angles within a range from a multiple speed −1 to +1 be selected as the track correction angle θ1 and the lead correction angle θ2. The multiple speeds are not limited to integral numbers and may be a number with a decimal such as 1.2 or 1.5.

Figure 31:
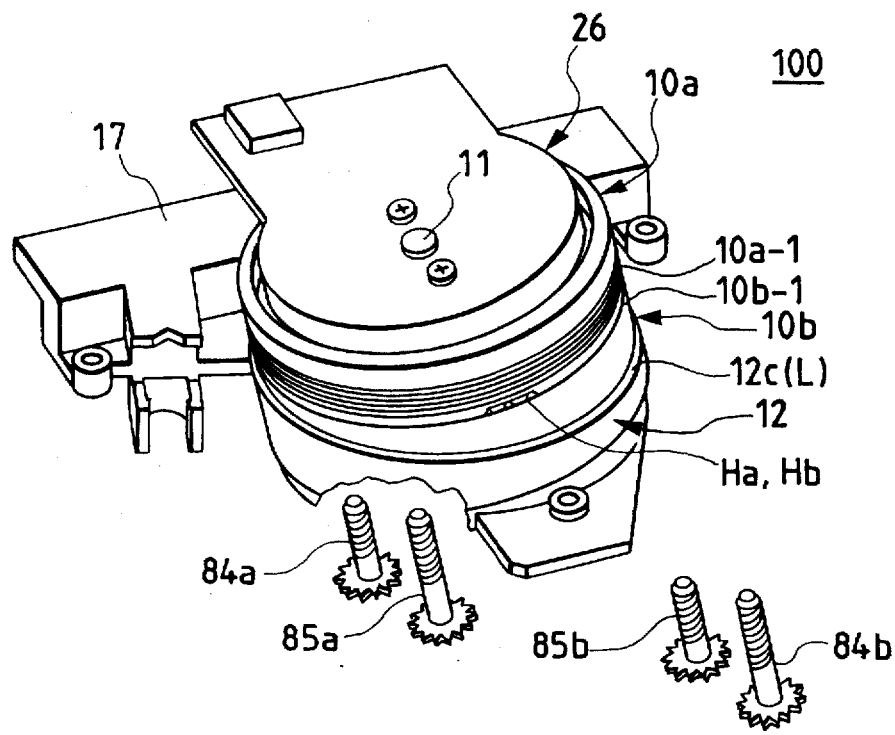
FIG. 31 is a perspective view showing a drum positioning mechanism according to the sixth embodiment of the invention.
Figure 32:
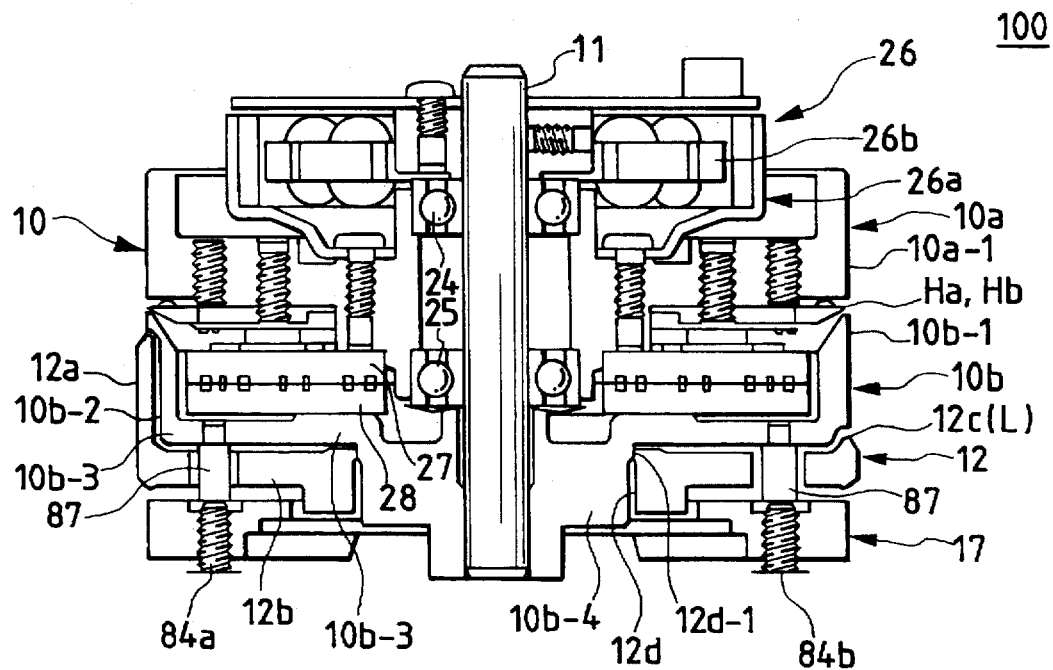
FIG. 32 is a vertical cross sectional view of FIG. 31.

FIGS. 31 and 32 show the sixth embodiment of the invention.

The drum assembly 100 includes an upper drum 10a, a lower drum 10b, and a lead ring 12. The upper drum 10a has formed thereon a tape-wrapped surface 10a-1 having substantially the same diameter as that of a tape-wrapped surface 10b-1 of the lower drum 10b. The lead ring 12 receives therein the small-diameter portion 10b-2 of the lower drum 10b with a small clearance therebetween to form on its upper edge a spiral lead 12c (L). A central opening 12d is formed in a bottom portion 12b of the lead ring 12 and has a knife edge portion 12d-1 engaging a central boss 10b-4, of the lower drum 10b.

Figure 33A:
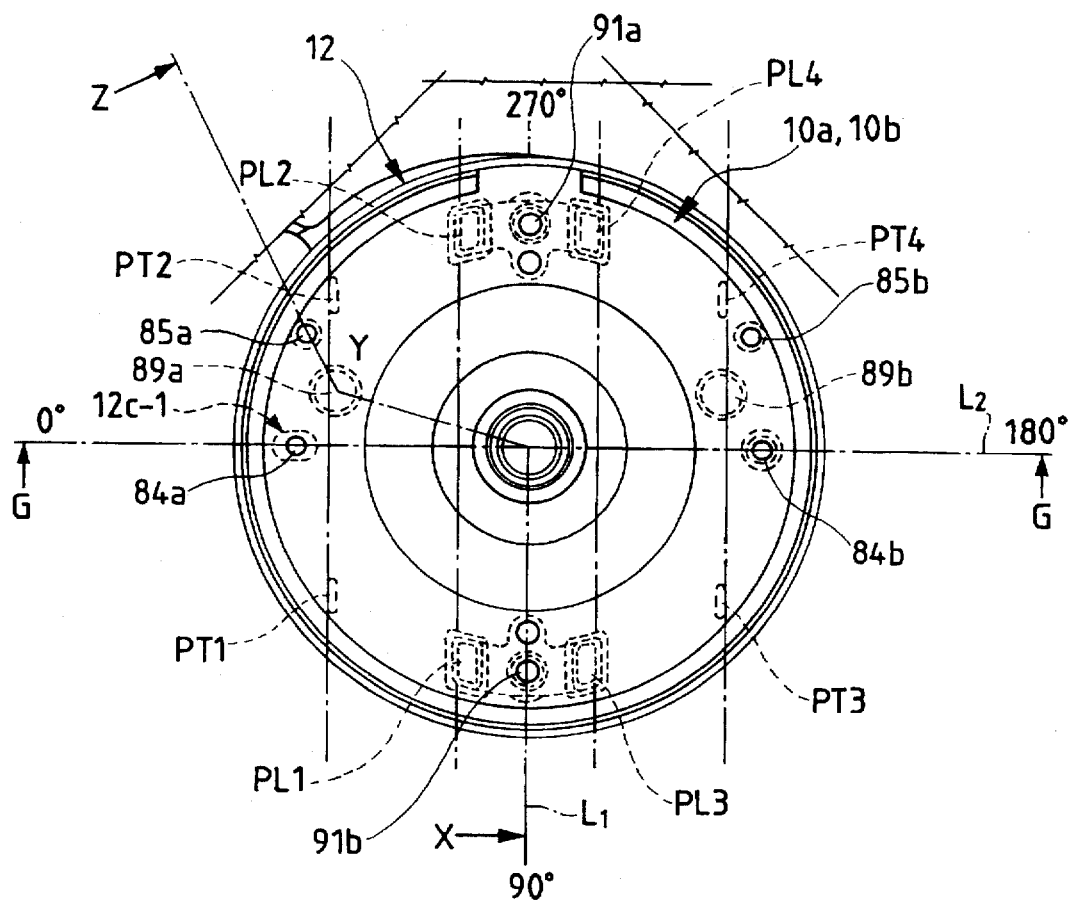
FIG. 33(a) is a top view showing a drum positioning mechanism of the sixth embodiment.
Figure 33B:
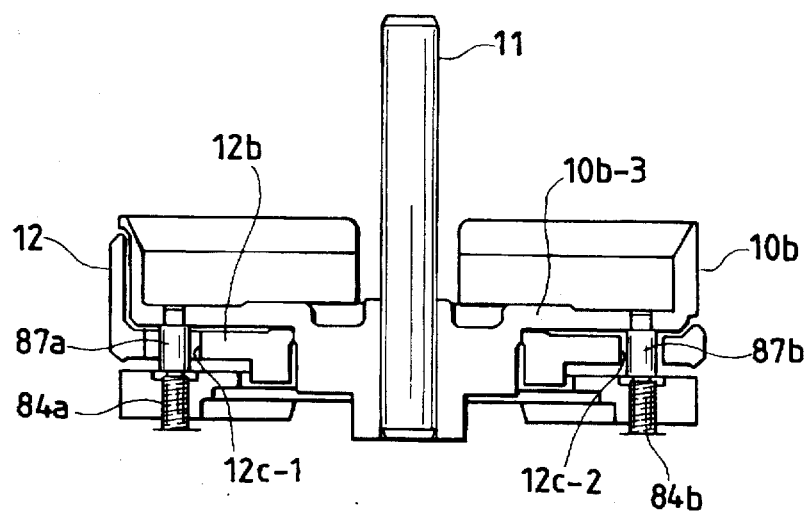
FIG. 33(b) is a vertical cross sectional view taken along the line G—G in FIG. 33(a)

In the bottom portion 10b-3 of the lower drum 10b, wear resistant positioning pins 87a and 87b are, as shown in FIGS. 33(a) and 33(b), installed which are arranged along a line L2 extending from 0° to 180° at locations diametrically opposed to each other across a line L1 extending from 90° to 270°. The positioning pins 87a and 87b have lower end portions inserted into an oval hole 12c-1 and a circular hole 12c-2 formed in the bottom portion 12b of the lead ring 12, respectively. The positioning pin 87a engages the oval hole 12c-1 with gaps therebetween in a direction from 0° to 180° and is restricted by the oval hole 12c-1 from moving in a direction from 90° to 270°. The positioning pin 87b engages the circular hole 12c-2 with a clearance fit.

Figure 38:
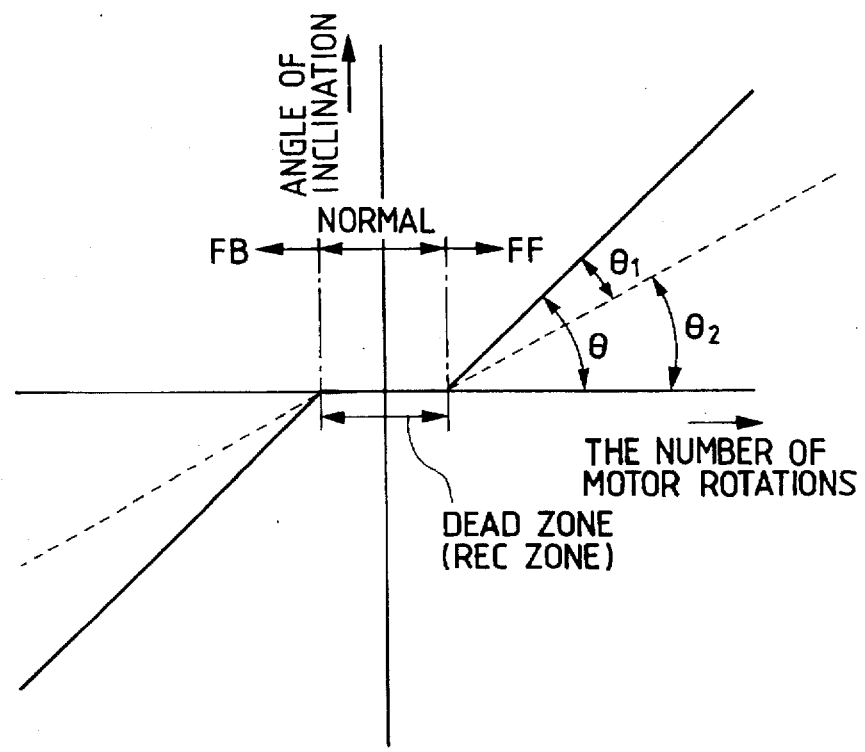
FIG. 38 is a graph which shows the relation between an angle of inclination of a drum assembly and the number of rotations of a motor moving screws for the inclination of the drum assembly.
Figure 40:
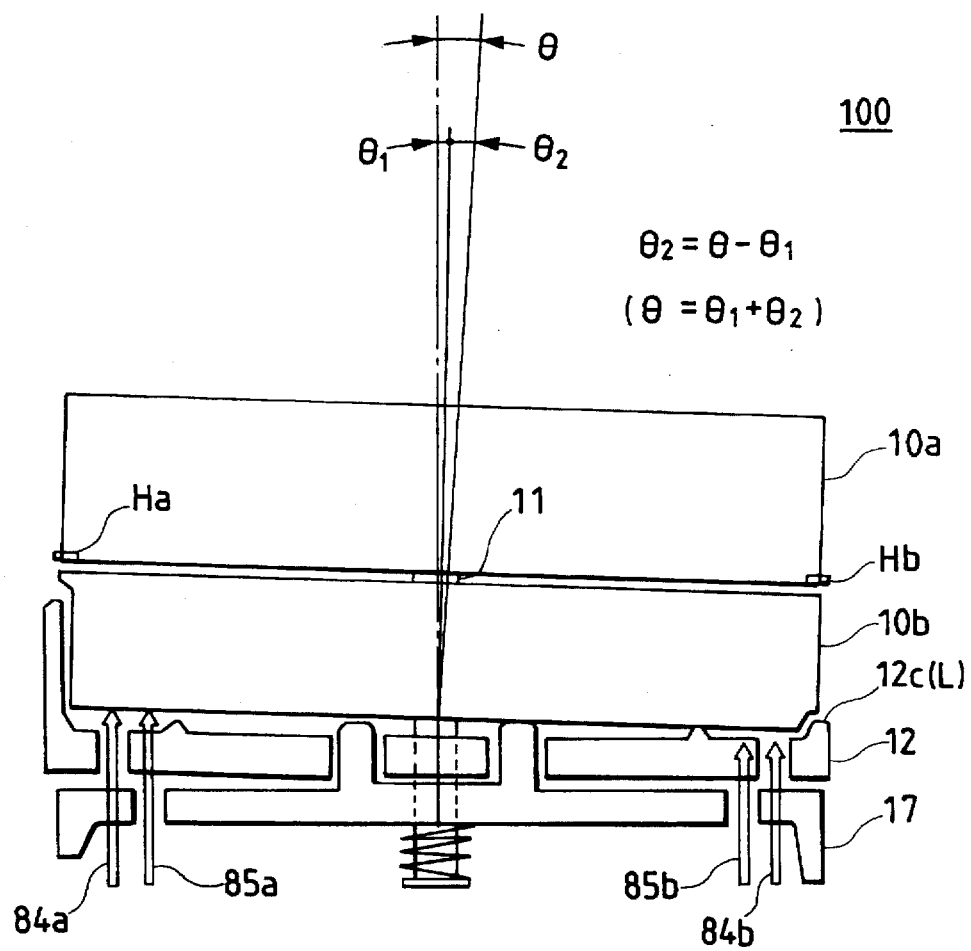
FIG. 40 shows the relation among overall drum inclination correction angle θ, track correction θ1, and lead correction θ2 of a drum assembly of the sixth embodiment.

Screws 84a and 84b engage threaded holes formed in the drum base 17 in alignment with the positioning pins 87a and 87b, respectively, and are rotated to be moved vertically to urge the lower drum 10b upward. Specifically, in the FF playback mode, the screw 84a presses at its upper end the positioning pin 87a upward to move the bottom portion 10b3 of the lower drum 10b for rotating the upper and lower drums 10a and 10b along with the lead ring 12 (i.e., the drum assembly 100) in a clockwise direction through an overall drum inclination correction angle θ, as shown in FIGS. 38 and 40. Similarly, in the FB playback mode, the screw 84b presses at its end the positioning pin 87b upward to rotate the drum assembly 100 counterclockwise.

Figure 37:
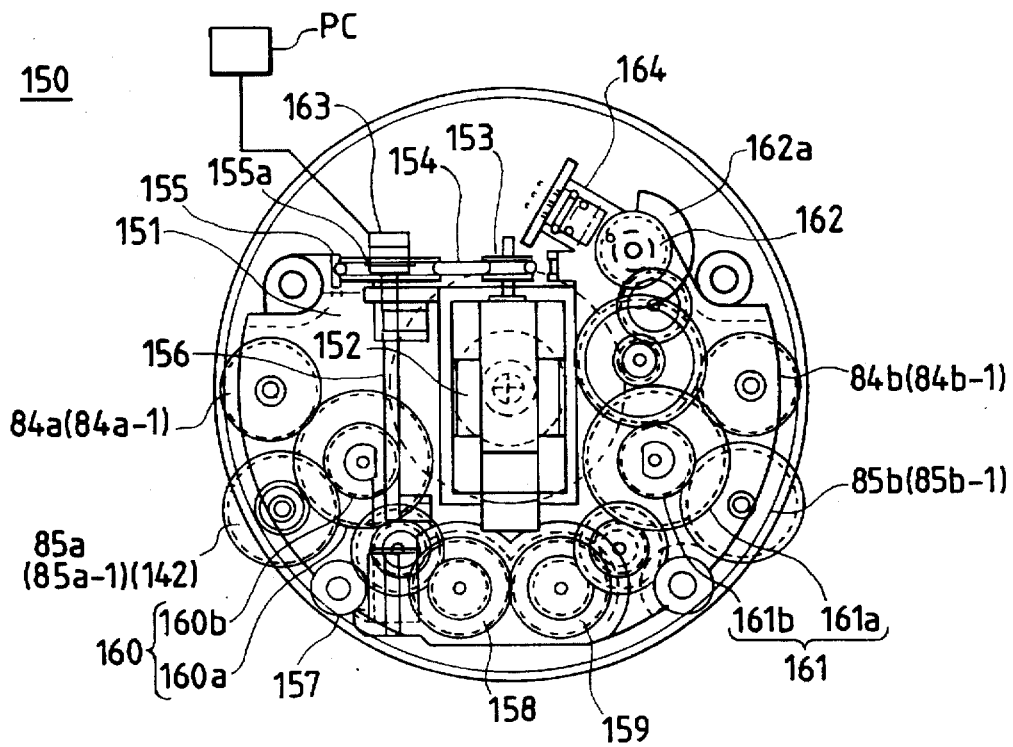
FIG. 37 is a horizontal cross sectional view which shows a drive mechanism mounted beneath a drum assembly.

The screws 84a and 84b are not inclined in both the FF and FB playback modes even when the lower drum 10b is rotated, and are connected directly with gear sets 160 and 161 of a drive mechanism 150, as will be described in detail with reference to FIG. 37.

Figure 34A:
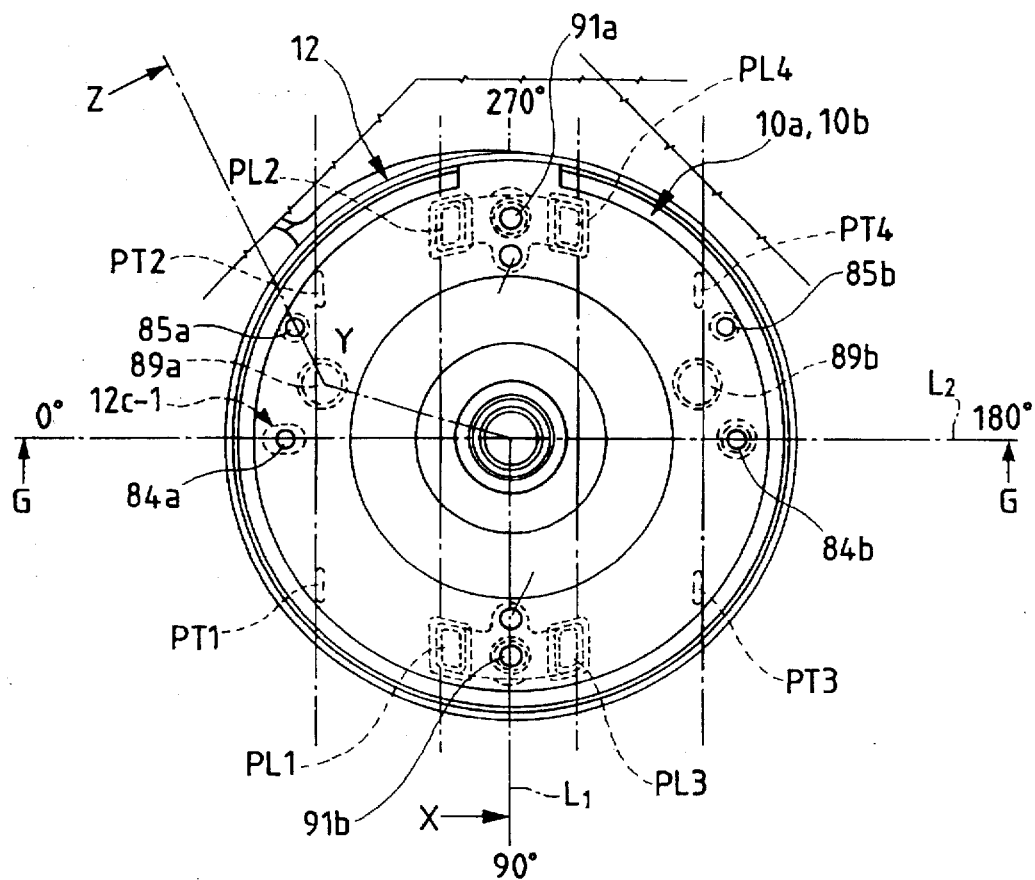
FIG. 34(a) is a top view which shows a drum positioning mechanism of the sixth embodiment.
Figure 34B:
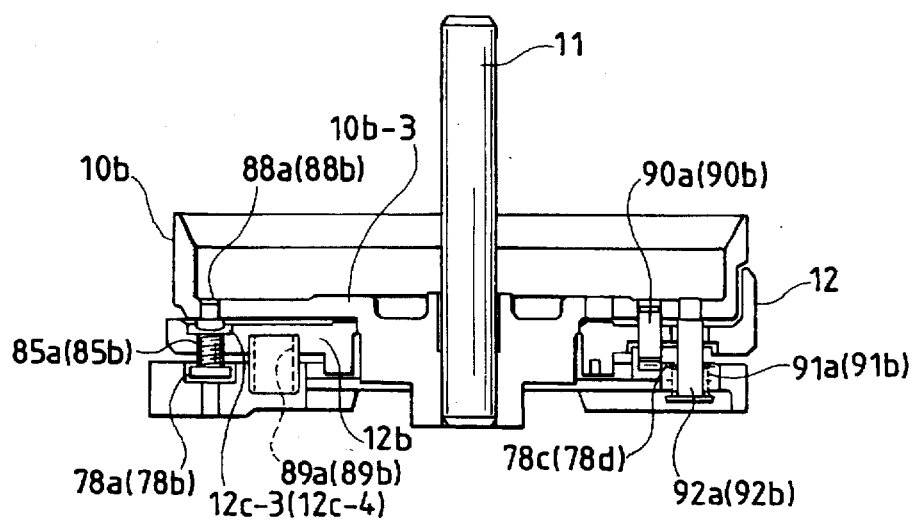
FIG. 34(b) is a vertical cross sectional view taken along the line X-O-Y-Z in FIG. 34(a)

The lower drum 10b, as shown in FIGS. 34(a) and 34(b), has in the bottom portion 10b-3 wear resistant pins 88a and 88b disposed at locations diametrically opposed to each other across the line L1 and away from the line L2 in the direction of 270°. Lower ends of the pins 88a and 88b project from the bottom 10b-3 and are disposed within recesses 12c-3 and 12c-4 formed in the bottom portion 12b of the lead ring 12, respectively. The recesses 12c-3 and 12c-4 communicate with threaded holes into which screws 85a and 85b are inserted in alignment with the pins 88a and 88b, respectively. The screws 85a and 85b have mounted on their lower ends flange portions which are disposed within stepped holes 78a and 78b formed in the drum base 17.

Figure 36A:
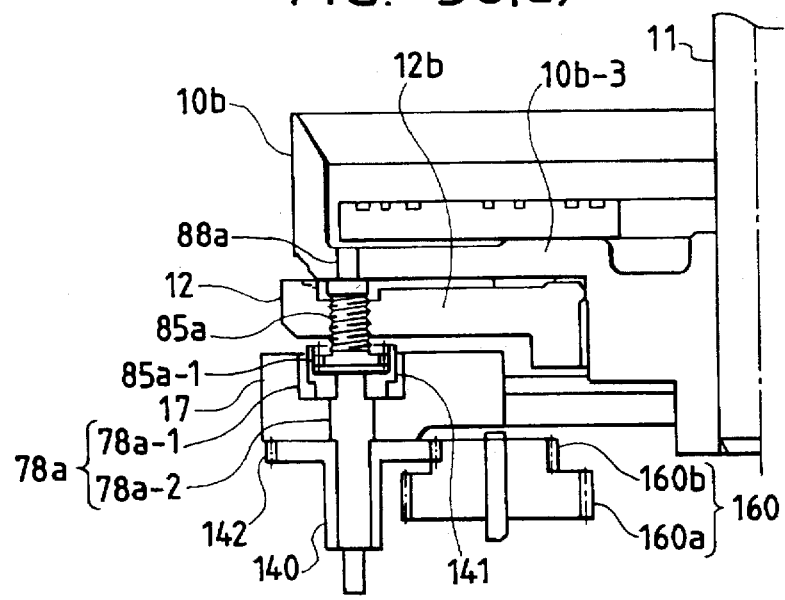
FIG. 36(a) is a vertical cross sectional view which shows a structure of a connection of a screw engaging a lead ring with a gear coupling.

The screws 85a and 85b have the same structure and are moved vertically by the same drive mechanism. For example, the screw 85, as shown in FIG. 36(a), has mounted on its lower end a gear 85a-1 connecting with a gear coupling 141 which is disposed within an upper large-diameter opening 78a-1 of the stepped holes 78a. The gear coupling 141 connects with an upper end of an operating shaft 140 fitted into a small-diameter opening 78a-2 of the stepped hole 78a. The operating shaft 140 has mounted on its lower end a screw-driving gear 142 meshing with a small gear 160b of the gear set 160 of the drive mechanism 150, as shown in FIG. 37.

Figure 36B:
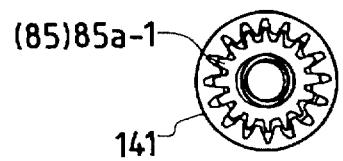
FIG. 36(b) is a horizontal cross sectional view showing a gear coupling.
Figure 36C:
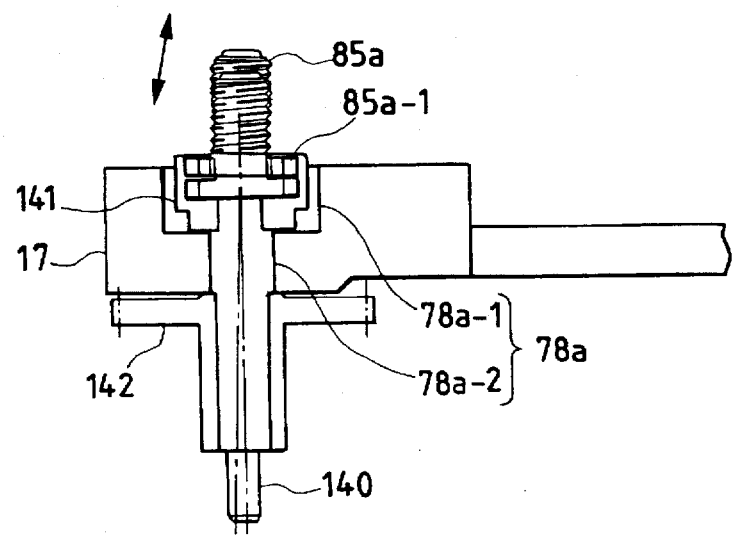
FIG. 36(c) is a partial cross sectional view which shows an operation of a gear coupling.

The gear coupling 141, as shown in FIG. 36(b), has formed on its inner wall gear teeth having the same module and the same number of teeth as those of the gear 85a-1 of the screw 85a. The gear teeth of the gear coupling 141 engage the gear 85a-1 of the screw 85a with a given clearance to serve as a flexible coupling for allowing a relative vertical movement of the gear coupling 141 to the screw 85a. The rotation of the gear coupling 141 through the screw-driving gear 141 and the operating shaft 140 causes the screw 85a to be moved vertically.

Accordingly, even when the lead ring 12 is inclined according to the rotation of the screw 85a, the engagement of the inner teeth of the gear coupling 141 with the gear 85a 1 of the screw 85a is achieved at all times.

Referring back to FIGS. 34(a) and 34(b), the screws 85a and 85b mesh with the lead ring 12 so as to urge the lower drum 10b upward for achieving the track correction to correct the head path to agree with tracks recorded on a magnetic tape. Specifically, the track correction in the FF playback mode is accomplished by moving the screw 85a upward in engagement with the pin 88a fitted into the lower drum 10b to urge the bottom portion 12b of the lead ring 12 downward from the lower drum 10b to rotate the lead ring 12 counterclockwise through the track correction angle θ1, as shown in FIGS. 38 and 40. Similarly, the track correction in the FB playback mode is accomplished by moving the screw 85b arranged opposite the screw 85a across the line L1 extending from 90° to 270° upward in engagement with the pin 88b to urge the bottom portion 12b of the lead ring 12 downward from the lower drum 10b to rotate the lead ring 12.

The lead correction is accomplished by rotating the lead ring 12 through the track correction angle θ1 in a direction opposite the direction of inclination of the lower drum 10b turned at the overall drum inclination correction angle θ. This orients the lead ring 12 to the drum base 17 at an angle θ2 (i.e., a lead correction angle) equal to a difference between the overall drum inclination correction angle θ and the track correction angle θ1 (=θ−θ2). In other words, in the FF playback mode, the lead ring 12 is rotated clockwise relative to the drum base 17, while in the FB playback mode, the lead ring 12 is rotated counterclockwise relative to the drum base 17.

As will be apparent from the above discussion, when the FF or FB playback mode is entered, the overall drum inclination correction is first performed by moving the screws 84a and 84b arranged on the tape-entering and tape-leaving side in opposite directions to rotate the upper and lower drums 10a and 10b together with lead ring 12 to orient them to the drum base 17 at the overall drum inclination correction angle θ according to the tape travel speed. The track correction is then achieved by rotating the screws 85a and 85b to incline the lead ring 12 relative to the lower drum 10b so as to correct the head path of the magnetic heads Ha and Hb to agree with tracks recorded on the magnetic tape. The lead correction is achieved with a combination of the overall drum inclination correction and the track correction. Specifically, the lead correction is achieved by rotating the upper and lower drums 10a and 10b together with the lead ring 12 through the overall drum inclination correction angle θ and then rotating the lead ring through the track correction angle θ1 in a direction opposite the rotation of the upper and lower drums 10a and 10b through the overall drum inclination correction angle θ with the result that the lead ring is oriented at the lead correction angle θ2 relative to the drum base 17. This permits the lead L of the lead ring 12 to coincide with the lower edge of the magnetic tape over the tape-wrapped surfaces 10a-1 and 10b-1.

Between the bottom portion 12b of the lead ring 12 and the drum base 17, compression springs 89a and 89b are disposed near the screws 85a and 85b to urge the lead ring 12 toward the lower drum 10b with weak spring forces, respectively.

Positioning pins 90a and 90b are, as shown in FIG. 34(b), arranged diametrically opposite to each other across the line L2 along the line L1 and inserted into the periphery of the bottom portion 10b-3 of the lower drum 10b and the periphery of the drum base 17 through the bottom portion 12b of the lead ring 12 for holding a relative angular position of the lower drum 10b to the drum base 17.

Stepped holes 78c and 78d are, as shown in FIGS. 34(a) to 35(b), formed in a lower surface of the drum base 17 at locations diametrically opposed to each other across the line L2 along the line L1. Inserted into the stepped holes 78a and 78b are screws with flanges 92a and 92b around which compression springs 91a and 91b are disposed, respectively. The spring forces of the compression springs 91a and 91b are stronger than those of the compression springs 89a and 89b. Upper threaded portions of the screws 92a and 92b engage the lower drum 10b through the lead ring 12. With these arrangements, the compression springs 91a and 91b urge the upper and lower drums 10a and 10b toward the drum base 17. The reciprocal action of the weak compression springs 89a and 89b and the strong compression springs 91a and 91b serve to incline the upper and lower drums 10a and 10b coaxially supported by the drum shaft 11 along with the lead ring 12.

Figure 35A:
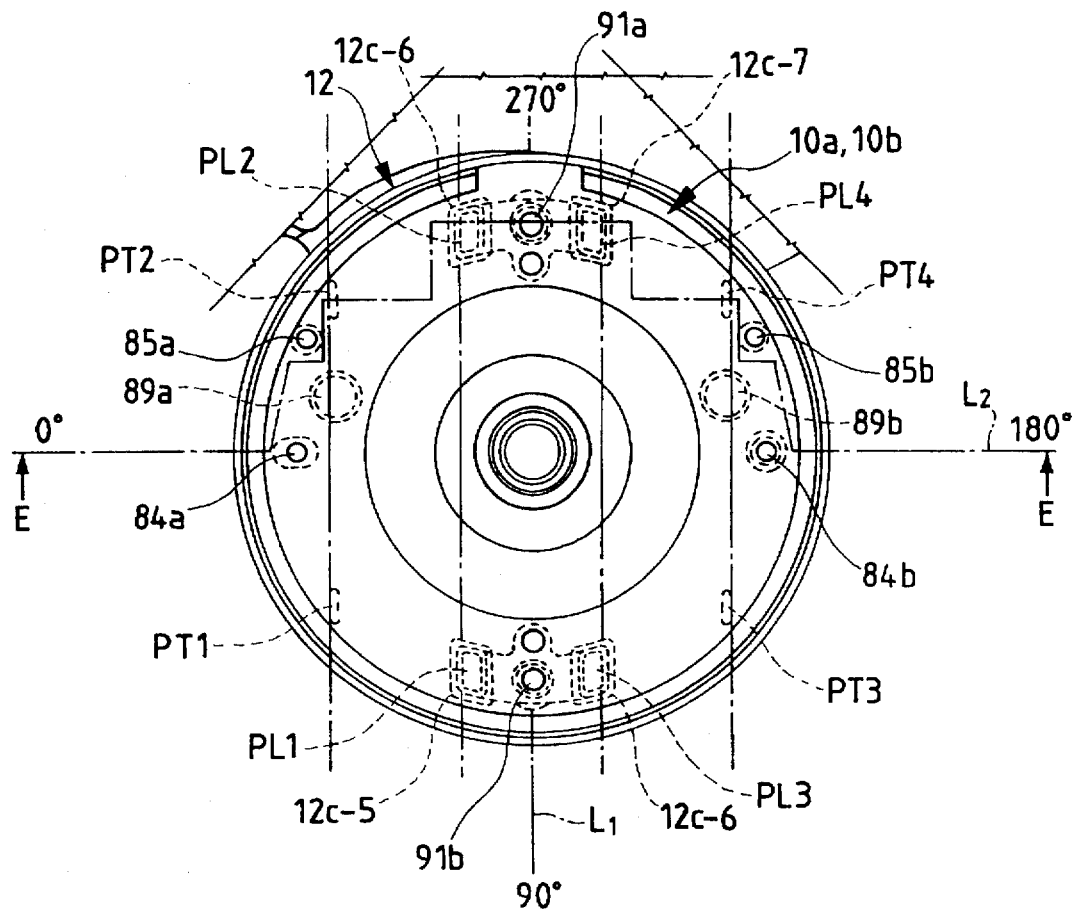
FIG. 35(a) a top view showing a drum positioning mechanism of the sixth embodiment.
Figure 35B:
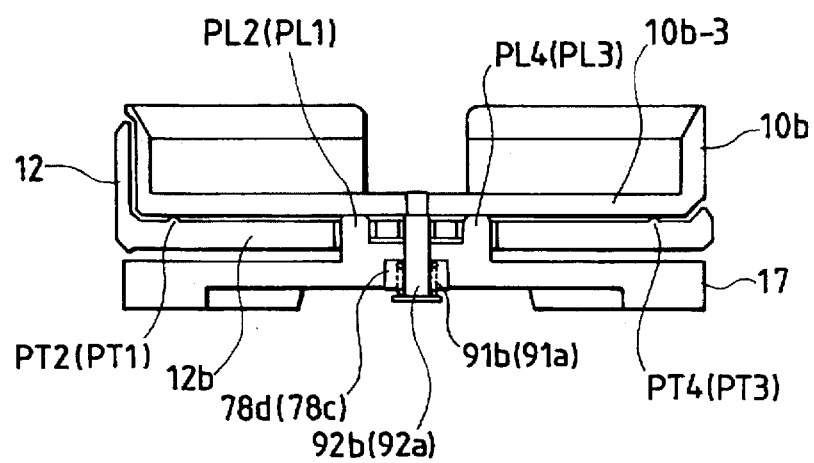
FIG. 35(b) is a vertical cross sectional view taken along the line E—E in FIG. 35(a)

The arrangements of axes of rotation about which the upper and lower drums 10a and 10b are rotated clockwise or counterclockwise along with the lead ring 12 will be described below with reference to FIGS. 35(a) and 35(b).

The drum base 17 has formed on its peripheral upper surface pivots PL1, PL2, PL3, and PL4 at the same level. The pivots PL1 and PL3 are, as shown in FIG. 35(a), diametrically opposed to the pivots PL2 and PL4 across the line L2, while the pivots PL1 and PL2 are diametrically opposed to the pivots PL3 and PL4 across the line L1. The pivots PL1 and PL2 defines a first axis of rotation, while the pivots PL3 and PL4 define a second axis of rotation.

The pivots PL1 to PL4 pass through bores 12c-5 to 12c-8 formed in the bottom portion 12b of the lead ring 12 to be engageble with a lower surface of the bottom portion 10b-3 of the lower drum 10b. In the normal playback mode, the pivots PL1 to PL4 engage the bottom portion 10b-3 of the lower drum 10b. In the FF playback mode, the pivots PL3 and PL4 defining the second axis of rotation engage the bottom portion 10b-3. In the FB playback mode, the pivots PL1 and PL2 defining the first axis of rotation engage the bottom portion 10b-3.

The pivots PL1 to PL4 may alternatively be formed on the lower surface of the bottom portion 10b-3 of the lower drum 10b.

The lead ring 12 has formed on its peripheral upper surface pivots PT1, PT2, PT3, and PT4 at the same level. The pivots PT1 and PT3 are, as shown in FIG. 35(a), diametrically opposed to the pivots PT2 and PT4 across the line L2, while the pivots PT1 and PT2 are diametrically opposed to the pivots PT3 and PT4 across the line L1. The pivots PT1 and PT2 define a first axis of rotation, while the pivots PT3 and PT4 define a second axis of rotation. The pivots PT1 to PT4 are located outside the pivots PL1 to PL4 in a radial direction.

The pivots PT1 to PT4 are engageble with the lower surface of the bottom portion 10b-3 of the lower drum 10b. In the normal playback mode, the pivots PT1 to PT4 engage the bottom portion 10b-3 of the lower drum 10b. In the FF playback mode, the pivots PT3 and PT4 defining the second axis of rotation engage the bottom portion 10b-3. In the FB playback mode, the pivots PT1 and PT2 defining the first axis of rotation engage the bottom portion 10b-3.

The pivots PT1 to PT4 may alternatively be formed on the lower surface of the bottom portion 10b-3 of the lower drum 10b.

The structure of the drive mechanism 150 turning the screws 84a and 84b for inclining the lower drum 10b and the screws 85a and 85b for inclining the lead ring 12, will be discussed with reference to FIGS. 37 and 38, in the following discussion, although the screw 84a is, as mentioned above, turned by the screw-driving gear 142 through the gear coupling 141, as the screw 85a may be viewed as being equivalent to the screw-driving gear 142, only the screw 85a is illustrated and referred to for convenience.

A support base 151 having mounted thereon the drive mechanism 150 is secured on a lower surface of the drum base 17.

A first pulley 153 is installed on an output shaft of a motor 152 mounted on the support base 151 and connected through a belt 154 to a worm 157 mounted on a shaft 156 having disposed thereon a second pulley 155. The worm 157 meshes with a first helical gear 158 which meshes with a second helical gear 159. The first helical gear 158 rotates the gear 84a1 of the screw 84a meshing with the large gear 160a of the gear set 160 and the gear 85a-1 of the screw 85a meshing with the small gear 160b of the gear set 160. The second helical gear 159 rotates the gear 84b-1 of the screw 84b meshing with the large gear 161a of the gear set 161 and the gear 85b-1 of the screw 85b meshing with the small gear 161b of the gear set 161 in a direction opposite the rotation of the screws 84a and 85a.

The gear set 161 connected to the second helical gear 159 turns a reset gear 162 through a gear train. The speed of the reset gear 162 is decelerated so that the reset gear 62 rotates in a range from +180° to −180°.

The screws 84a and 84b which mesh with the large gears 160a and 161a of the gear sets 160 and 161, respectively, incline the drum assembly 100 at the overall drum inclination correction angle $\theta$, as shown in FIG. 38, according to the number of rotations of the motor 152.

The screws 85a and 85b for the track correction which mesh with the small gears 160b and 161b of the gear sets 160 and 161, respectively, provide the lead correction angle $\theta2$ which is the difference between the overall drum inclination correction angle $\theta$ and the track correction angle $\theta1$ according to the number of rotations of the motor 152.

Note that the overall drum inclination correction angle $\theta$ and the lead correction angle $\theta2$ both have a dead zone in which the inclination correction is not performed even though the motor 152 is turned on. Specifically, within the dead zone, the magnetic recording/reproducing apparatus is in the normal playback mode in which the screws 84a and 84b and the screws 85a and 85b are out of engagement with the lower drum 10b and the pivots PL1 to PL4 on the drum base 17 and the pivots PT1 to PT4 on the lead ring 12 all support the bottom portion 10b-3 of the lower drum 10b.

The second pulley 155 has three fan-shaped shading plates 155a connected to a photosensor 163 which measures the number of rotations of an output shaft of the motor 152 and transforms it into pulse signals which are, in turn, inputted to a pulse counter PC for determining whether the upper and lower drums 10a and 10b and the lead ring 12 have been rotated through a target angle or not. The pulse counter PC is disposed outside the drum assembly 100. Note that the speed of the motor 152 may alternatively be measured by using FG pulses from the motor 152.

The reset gear 162 has mounted thereon a semicircular shading plate 162a. During the normal playback mode, a photosensor 164 detects an edge of the shading plate 162a to reset the pulse counter PC.

The operation of the drum assembly 100 will be described below with reference to FIGS. 38 to 40.

Figure 39A:
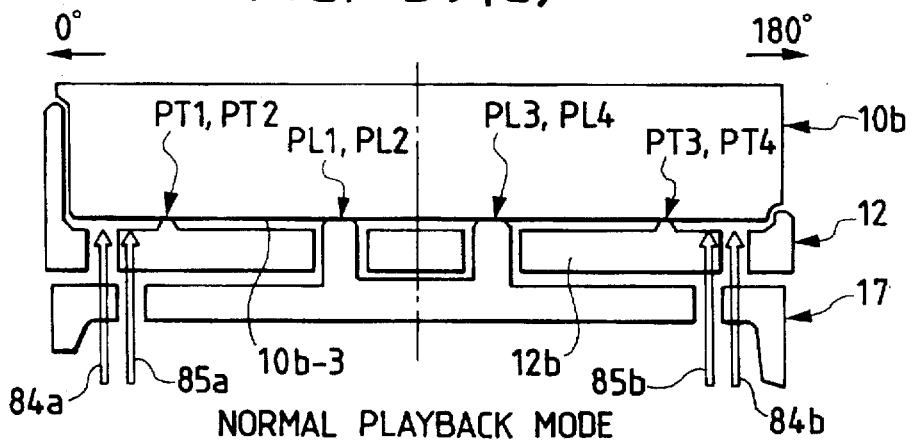
FIGS. 39(a) to 39(c) show inclination of a lower drum and a lead ring in normal playback, FF playback, and FB playback modes, respectively.

FIG. 39(a) shows the drum assembly 100 in the recording and normal playback modes. For instance, in the normal playback mode, the upper and lower drums 10a and 10b and the lead ring 12 are substantially oriented parallel to the drum base 17. Specifically, the pivots PL1 to PL4 formed on the drum base 17 and the pivots PT1 to PT4 formed on the lead ring 12 all engage the bottom portion 10b-3 of the lower drum 10b. The screws 84a and 84b in the drum base 17 are out of engagement with the positioning pins 87a and 87b, as shown in FIG. 32, fitted into the bottom portion 10b-3 of the lower drum 10b. The screws 85a and 85b in the lead ring 12 are also out of engagement with the positioning pins 88a and 88b, as shown in FIG. 34(b), fitted into the bottom portion 10b-3 of the lower drum 10b.

The lower drum 10b is urged by the strong compression springs 91a and 91b toward the drum base 17. The lead ring 12 is also urged by the weak compression springs 89a and 89b toward the lower drum 10b. Thus, both the lower drum 10b and the lead ring 12 are oriented in given basic positions. In other words, the vertical center lines of the lower drum 10b and the lead ring 12 coincide with each other at right angles to the drum base 17. Therefore, when a magnetic tape recorded in a normal record mode travels at a given speed (e.g., 33.35 mm/sec. in a standard VHS VTR) corresponding to the normal playback mode with a lower edge thereof being guided by the lead L of the lead ring 12, a head path of the magnetic heads Ha and Hb coincides with tracks recorded on the magnetic tape.

The above mentioned attitude control for the upper and lower drums 10a and 10b and the lead ring 12 in the normal playback mode may also be performed in the recording mode wherein the magnetic tape traveling at the normal speed is recorded.

Figure 39B:
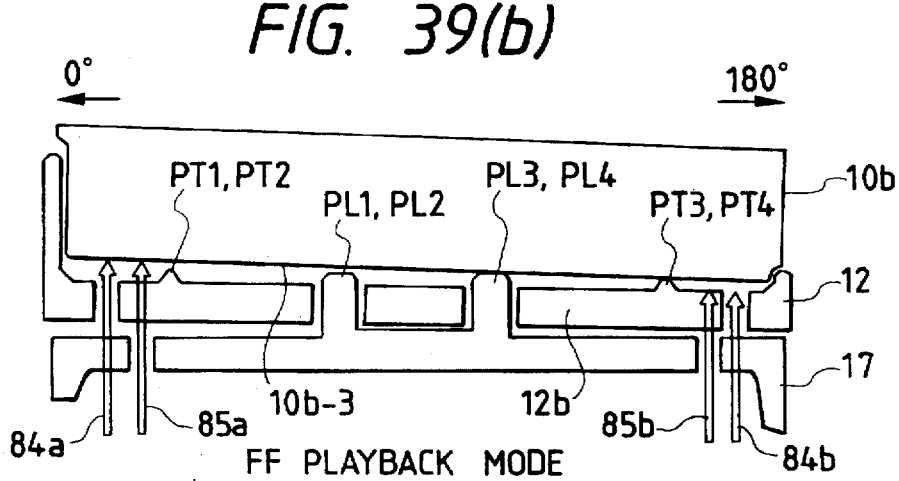

FIG. 39(b) shows the attitude control for the drum assembly 100 when the magnetic tape traveling at a speed different from the normal speed is recorded or reproduced. For example, when the FF playback mode is entered from the normal playback mode, the motor 152 is turned on to move the screws 84a and 85a arranged on the 0° side upward according to a speed corresponding to a tape travel speed. The screws 84b and 85b arranged on the 180° side are simultaneously moved downward into disengagement from the lower drum 10b.

The upward movement of the screw 84a causes the pins 87a to be lifted up to bring the lower drum 10b into disengagement from the pivots PL1 and PL2 in engagement with the pivots PL3 and PL4. This rotates the upper and lower drums 10a and 10b along with the lead ring 12 in the clockwise direction about the second axis of rotation defined by the pivots PL3 and PL4 against the spring forces of the compression springs 91a and 91b.

Therefore, the upper and lower drums 10a and 10b and the lead ring 12 are oriented at the overall drum inclination correction angle $\theta$ relative to the drum base 17 so that the tape-entering portions of the tape-wrapped surfaces 10a-1 and 10b-1 are shifted upward, while the tape leaving portions thereof are shifted downward. The overall drum inclination correction angle $\theta$ is determined along a curve, as shown in FIG. 38, according to the tape travel speed.

The screw 85a is moved upward concurrently with the upward movement of the screw 84a to engage the pin 88a, as shown in FIG. 34(b). This will cause a reaction force to be produced from the pin 88a so that the bottom portion 10b-3 of the lower drum 10b is brought into disengagement from the pivots PT1 and PT2 formed on the lead ring 12 in engagement with the pivots PT3 and PT4. This rotates the lead ring 12 counterclockwise about the second axis of rotation defined by the pivots PT3 and PT4 through the track correction angle $\theta1$, as shown in FIGS. 38 and 40, to be moved downward from the lower drum 10b.

As will be apparent from the above, the track correction is achieved by rotating the lead ring 12 in a direction opposite the rotation of the drum assembly 100 through the overall drum inclination correction angle $\theta$ to shift the head path of the magnetic heads Ha and Hb to agree with the tracks recorded on the magnetic tape in the FF playback mode. This simultaneously establishes the lead correction to orient the lead L at the lead correction angle $\theta2$ (=$\theta$−$\theta1$) relative to the drum base 17.

The rotation of the drum assembly 100 by the track correction, as mentioned above, will cause the lower edge of the magnetic tape on the tape-entering side to be brought into disengagement from the lead L of the lead ring 12 and the lower edge on the tape-leaving side to be pressed against the lead L. This problem is overcome by the lead correction so that the lead L coincides with the lower edge of the magnetic tape over the tape-wrapped surfaces 10a-1 and 10b-1 of the upper and lower drums 10a and 10b.

Figure 39C:
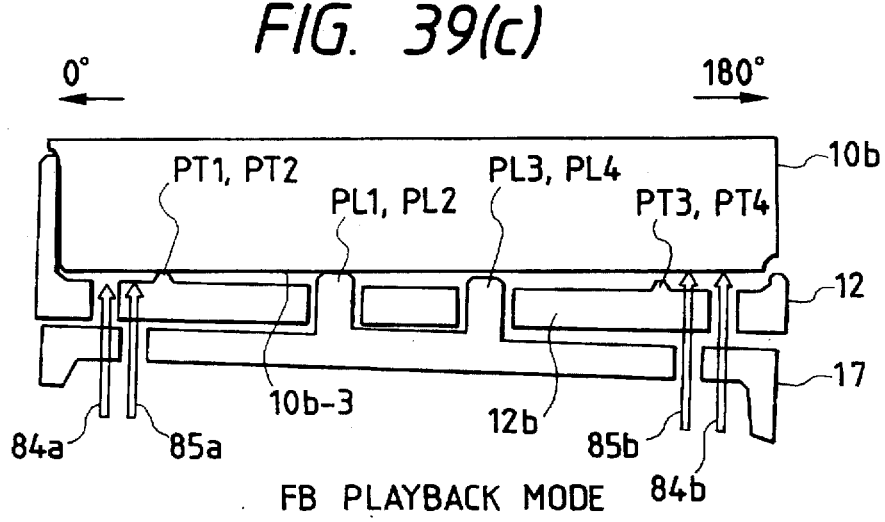

FIG. 39(c) shows the attitude control for the drum assembly 100 when the magnetic tape traveling at a speed different from the normal speed in a direction opposite that in the FF playback mode, is recorded or reproduced. For example, when the FB playback mode is entered from the normal playback mode, the motor 152 is rotated in a direction opposite that in the FF playback mode to move the screws 84b and 85b arranged on the 180° side upward according to a speed corresponding to a tape travel speed in the FB playback mode. The screws 84a and 85a arranged on the 0° side are then moved downward into disengagement from the lower drum 10b.

The upward movement of the screw 84b causes the pins 87b to be lifted up to bring the lower drum 10b into disengagement from the pivots PL3 and PL4 in engagement with the pivots PL1 and PL2. This rotates the upper and lower drums 10a and 10b along with the lead ring 12 counterclockwise through the overall drum inclination correction angle θ about the first axis of rotation defined by the pivots PL1 and PL2 against the spring forces of the compression springs 91a and 91b.

The screw 85b is moved upward concurrently with the upward movement of the screw 84b to engage the pin 88b, as shown in FIG. 34(b). This will cause a reaction force to be produced from the pin 88b so that the bottom portion 10b-3 of the lower drum 10b is brought into disengagement from the pivots PT3 and PT4 formed on the lead ring 12 in engagement with the pivots PT1 and PT2. This rotates the lead ring 12 counterclockwise about the first axis of rotation defined by the pivots PT1 and PT2 through the track correction angle θ1, as shown in FIGS. 38 and 40, to be moved downward from the lower drum 10b. This simultaneously achieves the lead correction to orient the lead L of the lead ring at the lead correction angle θ2 relative to the drum base 17.

FIG. 40 shows the relation among the overall drum inclination correction angle θ, the track correction angle θ1, and the lead correction angle θ2.

The overall drum inclination correction angle θ is, as apparent from the above discussion, provided by rotating the screw 84a or 84b engaging the drum base 17 to incline the drum assembly 100 (i.e., the upper and lower drums 10a and 10b and the lead ring 12) relative to the drum base 17.

The track correction angle θ1 is provided by rotating the screw 85a or 85b engaging the lead ring 12 for correcting an angle between the lead L of the lead ring 12 and the head path of the magnetic heads Ha and Hb, and is to incline the lead ring 12 in a direction opposite that of the inclination of the drum assembly 100 through the overall drum inclination correction angle θ.

The lead correction angle θ2 is to incline the lead ring 12 to have lower edge portions of the magnetic tape on the tape-entering side (i.e., near 0°) and the tape-leaving side (i.e., near 180°) follow the lead L while maintaining the track correction for the drum assembly 100. The lead correction angle θ2 is, as already mentioned, obtained by subtracting the track correction angle θ1 from the overall drum inclination correction angle θ (i.e., θ2=θ−θ1). Note that the overall drum inclination correction angle θ is greater than the track correction angle θ1 (i.e., θ>θ1), which is determined by a gear ratio of the screw-driving gear 160 to 161.

The above sixth embodiment may be used with VTRs which do not require the FB playback mode. In this case, It is possible to simplify the structure of the drive mechanism 150. Additionally, it is advisable that the first and second axes of rotation on the lead ring 12 and the drum base 17 be defined substantially parallel to the line L1 extending from 90° to 270°.

While the present invention has been disclosed in terms of the preferred embodiment in order to facilitate a better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A magnetic recording and/or reproducing apparatus comprising:

tape guide drum including an upper drum and a lower drum supported by a drum shaft, the upper drum having mounted thereon a magnetic head which is rotatable about the drum shaft along a given head path for recording and/or reproducing information data on and from a magnetic tape in first and second operation modes, the first operation mode being such that the information data is recorded and/or reproduced on and from the magnetic tape traveling at a normal speed, the second operation mode being such that the information data is recorded and/or reproduced on and from the magnetic tape traveling at a given speed different from the normal speed;

a lead guiding a reference edge of the magnetic tape wrapped about a given tape-wrapped surface of said tape guide drum and traveling in a given direction;

a drum base supporting said tape guide drum and said lead coaxially with each other;

head locus plane correcting means for correcting an angle of a head locus plane defined by the head path of the magnetic head relative to said lead according to the given speed of the magnetic tape in the second operation mode to orient the head locus plane at a given angle to the reference edge of the magnetic tape;

lead correcting means for correcting an angle of said lead relative to said drum base to bring said lead into engagement with a portion of the reference edge of the magnetic tape over the given tape-wrapped surface of said tape guide drum;

first holding means for holding the head locus plane of the magnetic head in a given basic position relative to said lead during the first operation mode;

second position holding means for holding said lead at a given basic position relative to said drum base during the first operation mode;

wherein the lower drum of said tape guide drum includes an annular portion and a bottom portion, the annular portion having formed thereon a tape-wrapped surface and a small diameter portion having a smaller diameter than that of the tape-wrapped surface, and further comprising a lead ring including an annular portion having a greater diameter than that of the tape-wrapped surface of the lower drum and the bottom portion, the annular portion of said lead ring receiving therein the small diameter portion of the lower drum with a given clearance to define at an edge thereof said lead, said lead ring being rotatably supported by the drum shaft coaxially with the upper and lower drums;

wherein said head locus plane correcting means includes first and second pivots formed with protrusions disposed on one of the lower drum and said lead ring disposed between said lead ring and the lower drum, defining a first axis of rotation about which the lower drum is tilted relative to said lead ring, first urging means for urging the lower drum to rotate about the first axis of rotation, and first rotating means for rotating the lower drum about the first axis of rotation against activities of said first urging means, said lead correction means including third and fourth pivots formed with protrusions disposed on one of said drum base and said lead ring disposed between said drum base and said lead ring, defining a second axis of rotation about which said lead ring is tilted to said drum base, second urging means for urging said lead ring to rotate about the second axis of rotation, and second rotating means for rotating the lead ring about the second axis of rotation against activities of said second urging means, said first position holding means including the first and second pivots, a first spacer formed with a protrusion on one of the lower drum and said lead ring disposed between said lower drum and said lead ring at a location away from a line extending from the first pivot to the second pivot to form a given gap therebetween, said second position holding means including the third and fourth pivots, a second spacer formed with a protrusion disposed on one of said drum base and said lead ring disposed between said lead ring and said drum base at a location away from a line extending from the third pivot to the fourth pivot to form a given gap therebetween, and third urging means for urging said tape guide drum toward said drum base.

2. A magnetic recording and/or reproducing apparatus as set forth in claim 1, wherein said first rotating means includes a first screw which engages a first tapped hole formed in the bottom portion of said lead ring to urge at its end the bottom portion of said lower drum, and the second rotating means includes a second screw which engages a second tapped hole formed in said drum base to urge at its end the bottom portion of said lead ring.

3. A magnetic recording and/or reproducing apparatus comprising:

tape guide drum including an upper drum and a lower drum supported by a drum shaft, the upper drum having mounted thereon a magnetic head which is rotatable about the drum shaft along a given head path for recording and/or reproducing information data on and from a magnetic tape in first and second operation modes, the first operation mode being such that the information data is recorded and/or reproduced on and from the magnetic tape traveling at a normal speed, the second operation mode being such that the information data is recorded and/or reproduced on and from the magnetic tape traveling at a given speed different from the normal speed;

a lead guiding a reference edge of the magnetic tape wrapped about a given tape-wrapped surface of said tape guide drum and traveling in a given direction;

a drum base supporting said tape guide drum and said lead coaxially with each other;

head locus plane correcting means for correcting an angle of a head locus plane defined by the head path of the magnetic head relative to said lead according to the given speed of the magnetic tape in the second operation mode to orient the head locus plane at a given angle to the reference edge of the magnetic tape;

lead correcting means for correcting an angle of said lead relative to said drum base to bring said lead into engagement with a portion of the reference edge of the magnetic tape over the given tape-wrapped surface of said tape guide drum;

first holding means for holding the head locus plane of the magnetic head in a given basic position relative to said lead during the first operation mode;

second position holding means for holding said lead at a given basic position relative to said drum base during the first operation mode;

wherein the lower drum of said tape guide drum includes an annular portion and a bottom portion, the annular portion having formed thereon the tape-wrapped surface and a small diameter portion having a smaller diameter than that of the tape-wrapped surface, and further comprising a lead ring including an annular portion having a greater diameter than that of the tape-wrapped surface of the lower drum and the bottom portion, the annular portion of said lead ring receiving therein the small diameter portion of the lower drum with a given clearance to define at an edge thereof said lead, said lead ring being rotatably supported by the drum shaft coaxially with the upper and lower drums;

wherein said head locus plane correcting means includes first, second, and third pivots formed with protrusions disposed on one of the lower drum and said lead ring disposed between said lead ring and said lower drum, defining first and second axes of rotation about which said lower drum is tilted to said lead ring, first urging means for urging said lead ring toward said lower drum, first rotating means for rotating said lower drum about the first axis of rotation defined by the first and second pivots against activities of said first and second rotating means for rotating said lower drum about the second axis of rotation deformed by the first and third pivots against the activities of said rest urging means, said lead correction means including fourth, fifth, and sixth pivots formed with protrusions disposed on one of the lower drum and said drum base disposed between said lower drum and said drum base through the bottom portion of said lead ring, defining third and fourth axes of rotation about which the lower drum is rotated relative to said drum base, second urging means for urging said tape guide drum toward said drum base, a third rotating means for rotating said lower drum about the third axis of rotation defined by the fourth and fifth pivots against activities of said second urging means, and fourth rotating means for rotating said lower drum about the fourth axis of rotation defined by the fourth and sixth pivots against the activities of said second urging means, said first position holding means including the first, second, and third pivots and said first urging means, said second position holding means including the fourth, fifth, and sixth pivots and said second urging means.

4. A magnetic recording and/or reproducing apparatus as set forth in claim 3, wherein said first and second rotating means include first and second screws which engage first and second tapped holes formed in the bottom portion of said lead ring to urge at their ends the bottom portion of said lower drum, and said third and fourth rotating means include third and fourth screws which engage third and fourth tapped hole formed in said drum base to urge at their ends the bottom portion of said lead ring.

5. A magnetic recording and/or reproducing apparatus as set forth in claim 3, wherein said first and second rotating means include first and second screws which engage first and second tapped holes formed in said drum base and which pass at their ends through the bottom portion of said lead ring to urge the bottom portion of said lower drum, and said third and fourth rotating means include third and fourth screws which engage third and fourth tapped hole formed in said drum base and which drawn the bottom portion of said lead ring toward said drum base.

6. A magnetic recording and/or reproducing apparatus comprising:

tape guide drum including an upper drum and a lower drum supported by a drum shaft, the upper drum having mounted thereon a magnetic head which is rotatable about the drum shaft along a given head path for recording and/or reproducing information data on and from a magnetic tape in first and second operation modes, the first operation mode being such that the information data is recorded and/or reproduced on and from the magnetic tape traveling at a normal speed, the second operation mode being such that the information data is recorded and/or reproduced on and from the magnetic tape traveling at a given speed different from the normal speed;

a lead guiding a reference edge of the magnetic tape wrapped about a given tape-wrapped surface of said tape guide drum and traveling in a given direction;

a drum base supporting said tape guide drum and said lead coaxially with each other;

head locus plane correcting means for correcting an angle of a head locus plane deformed by the head path of the magnetic head relative to said lead according to the given speed of the magnetic tape in the second operation mode to orient the head locus plane at a given angle to the reference edge of the magnetic tape;

lead correcting means for correcting an angle of said lead relative to said drum base to bring said lead into engagement with a portion of the reference edge of the magnetic tape over the given tape-wrapped surface of said tape guide drum;

first holding means for holding the head locus plane of the magnetic head in a given basic position relative to said lead during the first operation mode;

second position holding means for holding said lead at a given basic position relative to said drum base during the first operation mode;

wherein said lower drum has formed thereon a tape wrapped surface and an edge portion projecting from the tape-wrapped surface to define said lead, and further comprising an intermediate member which is supported by the drum shaft coaxially with said upper drum and engages an inner wall of said lower drum with a given clearance, said lower drum having a central portion coaxially;

wherein said head locus plane correcting means includes first, second, and third pivots formed with protrusions disposed on one of the lower drum and said intermediate member disposed between said lower drum and said intermediate member, defining first and second axes of rotation about which said intermediate member rotated relative to said lower drum, first urging means for urging said lower drum toward said intermediate member, first rotating means for rotating said intermediate member about the first axis of rotation defined by the first and second pivots against activities of said first urging means, and second rotating means for rotating said intermediate member about the second axis of rotation defined by the first and third pivots against the activities of said first urging means, said lead correction means including fourth, fifth, and sixth pivots formed with protrusions disposed on one of said intermediate member and said drum base disposed between said drum base and said intermediate member through the bottom portion of said lower drum, defining third and fourth axes of rotation about which the intermediate member is rotated relative to said drum base, second urging means for urging said tape guide drum toward said drum base, a third rotating means for rotating said intermediate member about the third axis of rotation defined by the fourth and fifth pivots against activities of said second urging means, and fourth rotating means for rotating said intermediate member about the fourth axis of rotation defined by the fourth and sixth pivots against the activities of said second urging means, said first position including the first, second, and third pivots and said first urging means, said second position holding means including the fourth, fifth, and sixth pivots and said second urging means.

7. A magnetic recording and/or reproducing apparatus as set forth in claim 6, wherein said first and second rotating means include first and second screws which engage first and second tapped holes formed in the bottom portion of said lower drum to urge at their ends said intermediate member, and said third and fourth rotating means include third and fourth screws which engage third and fourth tapped hole formed in said drum base to urge at their ends the bottom portion of said lower drum.

8. A magnetic recording and/or reproducing apparatus comprising:

an upper drum rotatable about a drum shaft and having mounted thereon a magnetic head which is rotatable along a given head path to record and/or reproduce information data on and from a magnetic tape in first and second operation modes, the first operation mode being such that the information data is recorded and/or reproduced on and from the magnetic tape traveling at a normal speed, the second operation mode being such that the information data is recorded and/or reproduced on and from the magnetic tape traveling at a given speed different from the normal speed;

a lower drum supported by the drum shaft coaxially with said upper drum, said lower drum including a bottom portion and an annular portion which has formed thereon a tape-wrapped surface and a small-diameter surface formed below the tape-wrapped surface having a smaller diameter than that of the tape-wrapped surface;

a lead ring including an annular portion having a greater diameter than that of the tape-wrapped surface of the lower drum and a bottom portion, the annular portion of said lead ring receiving therein the small-diameter portion of the lower drum with a given clearance to define a lead guiding movement of a reference edge of the magnetic tape;

a drum base supporting said lower drum;

head locus plane correcting means for correcting an angle of a head locus plane defined by the head path of the magnetic head relative to said lead according to the given speed of the magnetic tape in the second operation mode to orient the head locus plane at a given angle to the reference edge of the magnetic tape; and lead correcting means for correcting an angle of said lead relative to said drum base to bring said lead into engagement with a portion of the reference edge of the magnetic tape over the given tape-wrapped surface of said lower drum, wherein said head locus plane correcting means includes first, second, and third pivots formed with protrusions disposed on one of said lead ring and said lower drum disposed between said lead ring and said lower drum, defining first and second axes of rotation about which said lower drum is rotated relative to said lead ring, first urging means for urging said lead ring toward said lower drum, first rotating means for rotating said lower drum about the first axis of rotation defined by the first and second pivots against activities of said first rotating means for rotating said lower drum about the second axis of rotation defined by the first and third pivots against the activities of said first urging means, said lead correction means including fourth, fifth, and sixth pivots formed with protrusions disposed on one of said lower drum and said drum base disposed between said lower drum and said drum base through the bottom portion of said lead ring, defining third and fourth axes of rotation about which the lower drum is rotated relative to said drum base, second urging means for urging said upper and lower drums toward said drum base, a third rotating means for rotating said lower drum about the third axis of rotation defined by the fourth and fifth pivots against activities of said second urging means, and fourth rotating means for rotating said lower drum about the fourth axis of rotation defined by the fourth and sixth pivots against the activities of said second urging means.

9. A magnetic recording and/or reproducing apparatus as set forth in claim 8, wherein the second and third pivots are arranged outside the fifth and sixth pivots in a radial direction with respect to a line extending perpendicular to the drum shaft through a central portion of the tape-wrapped surface of said lower drum.

10. A magnetic recording and/or reproducing apparatus comprising:

an upper drum rotatable about a drum shaft and having mounted thereon a magnetic head which is rotatable along a given head path to record and/or reproduce information data on and from a magnetic tape in first and second operation modes, the first operation mode being such that the information data is recorded and/or reproduced on and from the magnetic tape traveling at a normal speed, the second operation mode being such that the information data is recorded and/or reproduced on and from the magnetic tape traveling at a given speed different from the normal speed;

a lower drum including a bottom portion and an annular portion thereon a tape-wrapped surface and a lead under the tape-wrapped surface for guiding movement of a reference edge of the magnetic tape;

an intermediate member supported by the drum shaft coaxially with said upper drum and engaging an inner wall of said lower drum;

a drum base supporting said intermediate member;

head path correcting means for correcting an angle of the head path of the magnetic head relative to said lead according to the given speed of the magnetic tape in the second operation mode to have the head path coincide with the slant tracks formed on the magnetic tape; and lead correcting means for correcting an angle of said lead relative to said drum base to bring said lead into engagement with a portion of the reference edge of the magnetic tape over the given tape-wrapped surface of said lower drum, wherein said head path correcting means includes first, second, and third pivots formed with protrusions disposed on one of said intermediate member and said lower drum disposed between said lower drum and said intermediate member, defining first and second axes of rotation about which said intermediate member rotated relative to said lower drum, first urging means for urging said lower drum toward said intermediate member, first rotating means for rotating said intermediate member about the first axis of rotation defined by the first and second pivots against activities of said first urging means, and second rotating means for rotating said intermediate member about the second axis of rotation defined by the first and third pivots against the activities of said first urging means, and wherein said lead correction means includes fourth, fifth, and sixth pivots formed with protrusions disposed on one of said intermediate member and said drum base disposed between said drum base and said intermediate member through the bottom portion of said lower drum, defining third and fourth axes of rotation about which the intermediate member is rotated relative to said drum base, second urging means for urging said upper drum and said intermediate member toward said drum base, a third rotating means for rotating said intermediate member about the third axis of rotation defined by the fourth and fifth pivots against activities of said second urging means, and fourth rotating means for rotating said intermediate member about the fourth axis of rotation deformed by the fourth and sixth pivots against the activities of said second urging means.

11. A magnetic recording and/or reproducing apparatus as set forth in claim 10, wherein the second and third pivots are arranged outside the fifth and sixth pivots in a radial direction with respect to a line extending perpendicular to the drum shaft through a central portion of the tape-wrapped surface of said lower drum.

12. A magnetic recording and/or reproducing apparatus comprising:

an upper drum supported by a drum shaft, said upper drum having mounted thereon a magnetic head which is rotatable about the drum shaft along a given head path for recording and reproducing information data on and from a magnetic tape in first and second operation modes, the first operation mode being such that the information data is recorded and/or reproduced from the magnetic tape traveling at a normal speed, the second operation mode being such that the information data is recorded and/or reproduced on and from the magnetic tape traveling at a given speed different from the normal speed;

a lower drum supported by the drum shaft coaxially with said upper drum, said lower drum having formed thereon a tape-wrapped surface and a small-diameter surface, the tape-wrapped surface having a first end portion and a second end portion opposite the first end portion in a tape traveling direction, the small-diameter surface having a diameter smaller than that of the tape-wrapped surface formed beneath the tape-wrapped surface;

a lead ring including an annular portion into which the small diameter portion of said lower drum is fitted with a given clearance, said lead ring having formed thereon a lead for guiding a reference edge portion of the magnetic tape traveling along the tape-wrapped surface of said lower drum;

a drum base supporting said upper and lower drums and said lead ring;

first inclining means for inclining said upper and lower drums and said lead ring relative to said drum base through a first angle in a first direction in the second operation mode; and second inclining means for inclining said lead ring through a second angle in a second direction opposite said first direction in the second operation orient a head locus plane defined by the head path of the magnetic head at the second angle to the lead ring and to orient the lead ring at a third angle that is a difference between the first angle and the second angle relative to said drum base to bring said lead into engagement with a portion of the reference edge of the magnetic tape over the given tape-wrapped surface of said lower drum, wherein said first inclining means includes first, second, third, and fourth pivots formed with protrusions disposed on one of said drum base and said lower drum through a bottom of said lead ring, first urging means for urging said lower drum toward said drum base, first rotating means for rotating said upper and lower drums and said lead ring about a first axis of rotation defined by the first and second pivots against activities of said first urging means, and second rotating means for rotating said upper and lower drums and said lead ring about a second axis of rotation defined by the third and fourth pivots against the activities of said first urging means, and wherein said second inclining means includes fifth, sixth, seventh, and eight pivots formed with protrusions disposed on one of said lead ring and said lower drum, second urging means for urging said lead ring toward said lower drum, third rotating means for rotating said lead ring about a third axis of rotation defined by the fifth and sixth pivots against activities of said second urging means, and fourth rotating means for rotating said lead ring about a fourth axis of rotation defined by the seventh and eighth pivots against the activities of said second urging means.

13. A magnetic recording and/or reproducing apparatus as set forth in claim 12, further comprising first position holding means for holding the head locus plane of the head path of the magnetic head in a given basic position relative to said lead during the first operation mode and second position holding means for holding said lead at a given basic position relative to said drum base during the first operation mode, and wherein the fifth to eight pivots are arranged outside the first to fourth pivots in a radial direction.

* * * * *

UNITED STATES PATENT AND TRADEMARK OFFICE
CERTIFICATE OF CORRECTION

PATENT NO. : 5,742,456
DATED : April 21, 1998
INVENTOR(S): Hisao Kinjo et al.

It is certified that error appears in the above-identified patent and that said Letters Patent is hereby corrected as shown below:

On the face of the patent, after section [76], add the following section:

--[73] Assignee: Victor Company of Japan, Ltd., Yokohama, Japan--

Signed and Sealed this

Ninth Day of March, 1999

Attest:

Q. TODD DICKINSON

Attesting Officer

Acting Commissioner of Patents and Trademarks